(12) United States Patent
Takahashi et al.

(10) Patent No.: US 12,519,923 B2
(45) Date of Patent: Jan. 6, 2026

(54) DISPLAY TERMINAL, COMMUNICATION SYSTEM, DISPLAY METHOD, AND COMMUNICATION METHOD

(71) Applicants: Takuya Takahashi, Kanagawa (JP); Daisuke Saitoh, Kanagawa (JP)

(72) Inventors: Takuya Takahashi, Kanagawa (JP); Daisuke Saitoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 278 days.

(21) Appl. No.: 18/210,665

(22) Filed: Jun. 16, 2023

(65) Prior Publication Data

US 2024/0007610 A1    Jan. 4, 2024

(30) Foreign Application Priority Data

Jun. 17, 2022  (JP) ................................. 2022-098304
Mar. 27, 2023  (JP) ................................. 2023-050521

(51) Int. Cl.
*H04N 13/361* (2018.01)
*H04N 13/111* (2018.01)
*H04N 13/194* (2018.01)

(52) U.S. Cl.
CPC ......... *H04N 13/361* (2018.05); *H04N 13/111* (2018.05); *H04N 13/194* (2018.05)

(58) Field of Classification Search
CPC .. H04N 13/361; H04N 13/194; H04N 13/111; H04N 21/21805; H04N 21/2353; H04N 21/4788; H04N 23/661; H04N 23/698
See application file for complete search history.

(56) References Cited

U.S. PATENT DOCUMENTS

| | | | | |
|---|---|---|---|---|
| 2018/0373483 A1* | 12/2018 | Inamoto | ............... | H04N 23/698 |
| 2019/0306486 A1* | 10/2019 | Nakajima | ............ | H04N 13/189 |
| 2020/0296284 A1* | 9/2020 | Aikawa | ................. | H04N 23/661 |
| 2023/0308622 A1* | 9/2023 | Sawada | .................. | H04N 23/55 |

FOREIGN PATENT DOCUMENTS

EP  3 232 331 A1  10/2017
JP  2019-121857   7/2019

OTHER PUBLICATIONS

EESR issued Aug. 22, 2023, in corresponding European Application No. 23179315.9, 7pp.

* cited by examiner

*Primary Examiner* — Kathleen V Nguyen
(74) *Attorney, Agent, or Firm* — XSENSUS LLP

(57) ABSTRACT

A display terminal includes circuitry to receive an operation for displaying a playback of a wide-angle view image related to a moving image recorded at a time of streaming of the moving image. The wide-angle view image has a wide viewing angle. The circuitry displays, on a display, a display area representing a predetermined area of the wide-angle view image based on viewpoint information for specifying the predetermined area, in response to receiving the operation. The predetermined area is displayed by a communication terminal at the time of streaming of the moving image.

13 Claims, 45 Drawing Sheets

HEMISPHERICAL IMAGE (FRONT)

HEMISPHERICAL IMAGE (BACK)

CAPTURED IMAGE (EQUIRECTANGULAR PROJECTION IMAGE EC)

FIG. 8A
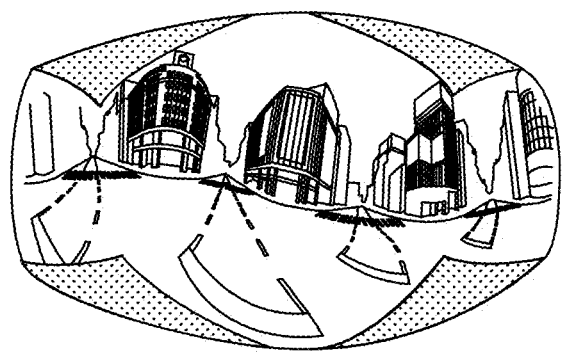
EQUIRECTANGULAR
PROJECTION IMAGE EC
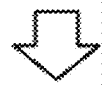
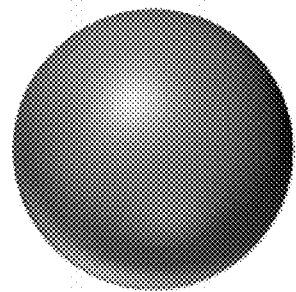
FIG. 8B
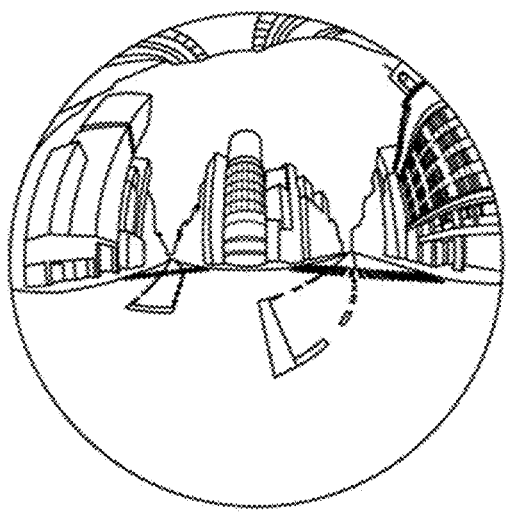
SPHERICAL IMAGE CE

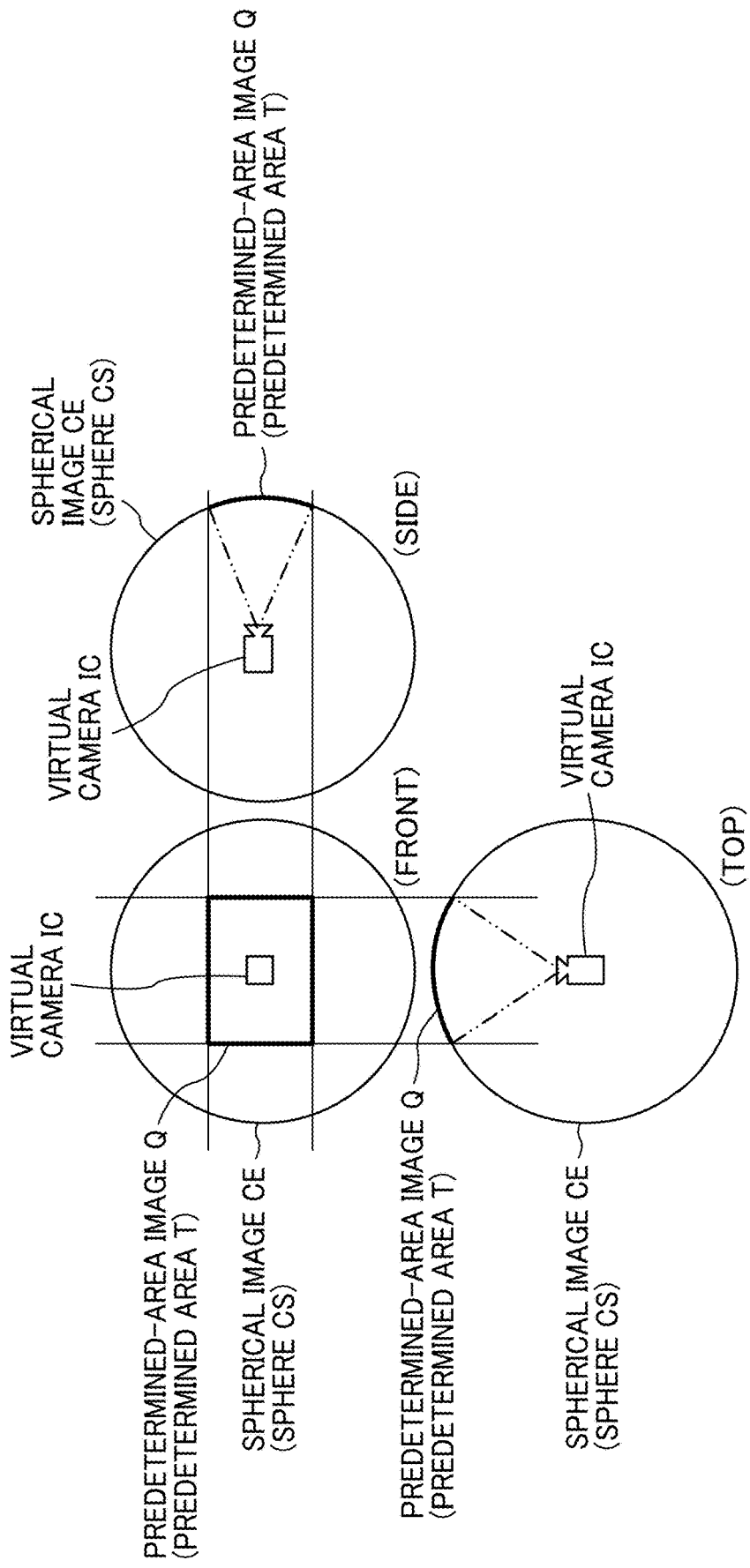

FIG. 14A

| WIDE-ANGLE VIEW IMAGE DATA ID | DATA NAME | IMAGING START DATE AND TIME INFORMATION | IMAGING REQUEST USER INFORMATION | IMAGE CAPTURING DEVICE INFORMATION | VIRTUAL ROOM ID AT THE TIME OF IMAGE CAPTURING | STORAGE LOCATION INFORMATION OF WIDE-ANGLE VIEW IMAGE DATA | PARTICIPANT ID |
|---|---|---|---|---|---|---|---|
| 111 | XXX BUILDING CONSTRUCTION | 2021/10/12 9:00 | User110 | T111 | AAA | https://··· | User121, User122 |
| 222 | YYY EVENT GROUP SHOT | 2021/10/12 10:00 | User210 | T222 | BBB | https://··· | User221, User222 |
| 333 | ZZZ SURGERY | 2021/10/15 11:00 | User310 | T333 | CCC | https://··· | User321, User322 |
| 444 | ··· | | | | | ··· | ··· |

FIG. 14B

| WIDE-ANGLE VIEW IMAGE DATA ID | DATA NAME | IMAGING START DATE AND TIME INFORMATION | IMAGING REQUEST USER INFORMATION | IMAGE CAPTURING DEVICE INFORMATION | VIRTUAL ROOM ID AT THE TIME OF IMAGE CAPTURING | STORAGE LOCATION INFORMATION OF WIDE-ANGLE VIEW IMAGE DATA | PARTICIPANT ID |
|---|---|---|---|---|---|---|---|
| 111 | XXX BUILDING (1) | 2021/10/12 9:00 | User110 | T111 | AAA | https://··· | User121, User122 |
| 222 | XXX BUILDING (2) | 2021/10/12 10:00 | User210 | T222 | AAA | https://··· | User221, User222 |
| 333 | ZZZ SURGERY | 2021/10/15 11:00 | User310 | T333 | CCC | https://··· | User321, User322 |
| 444 | ··· | | | | | ··· | ··· |

FIG. 15A

| ITEM | DEFINITION | EXAMPLE OF VALUE |
|---|---|---|
| VIRTUAL ROOM ID | IDENTIFICATION INFORMATION FOR IDENTIFYING VIRTUAL ROOM | AAA |
| VIRTUAL ROOM NAME | NAME WITH WHICH USER IDENTIFIES VIRTUAL ROOM | A CONSTRUCTION SITE |
| DEVICE INFORMATION (DEVICE ID) | DEVICE IDENTIFICATION INFORMATION ASSOCIATED WITH VIRTUAL ROOM | T111 |
| ENTRY USER | USER WHO IS CURRENTLY IN VIRTUAL ROOM AND CAN VIEW WIDE-ANGLE VIEW IMAGE | User111(IP ADDRESS OF TERMINAL DEVICE) User222(IP ADDRESS OF TERMINAL DEVICE) User333(IP ADDRESS OF TERMINAL DEVICE) |
| STORAGE | INFORMATION ON STORAGE ASSOCIATED WITH VIRTUAL ROOM | ADDRESS INFORMATION OF XX STORAGE INFORMATION ON FOLDER ON XX STORAGE |

FIG. 15B

| ITEM | DEFINITION | EXAMPLE OF VALUE |
|---|---|---|
| TENANT ID | IDENTIFICATION INFORMATION FOR IDENTIFYING TENANT | T001 |
| TENANT NAME | NAME WITH WHICH USER IDENTIFIES TENANT | XX COMPANY |
| TENANT REGISTRATION VIRTUAL ROOM ID | IDENTIFICATION INFORMATION OF VIRTUAL ROOM REGISTERED FOR TENANT | R001(A CONSTRUCTION SITE) R002(B CONSTRUCTION SITE) R003(C CONSTRUCTION SITE) |
| TENANT REGISTRATION DEVICE | INFORMATION ON DEVICE REGISTERED FOR TENANT | ・IMAGE CAPTURING DEVICE ID NAME,DESCRIPTION,VIRTUAL ROOM ID ・VR GOGGLES ID ...... ・SMART GLASSES ID ...... |

FIG. 16

| WIDE-ANGLE VIEW IMAGE DATA ID | PARTICIPANT ID | VIEWING START DATE AND TIME INFORMATION | STORAGE LOCATION INFORMATION OF VIEWPOINT INFORMATION |
|---|---|---|---|
| 111 | User120 | 2021/10/12 9:00 | https://… |
| 111 | User121 | 2021/10/12 9:05 | https://… |
| 111 | User122 | 2021/10/15 9:10 | https://… |
| ⋮ | ⋮ | ⋮ | ⋮ |

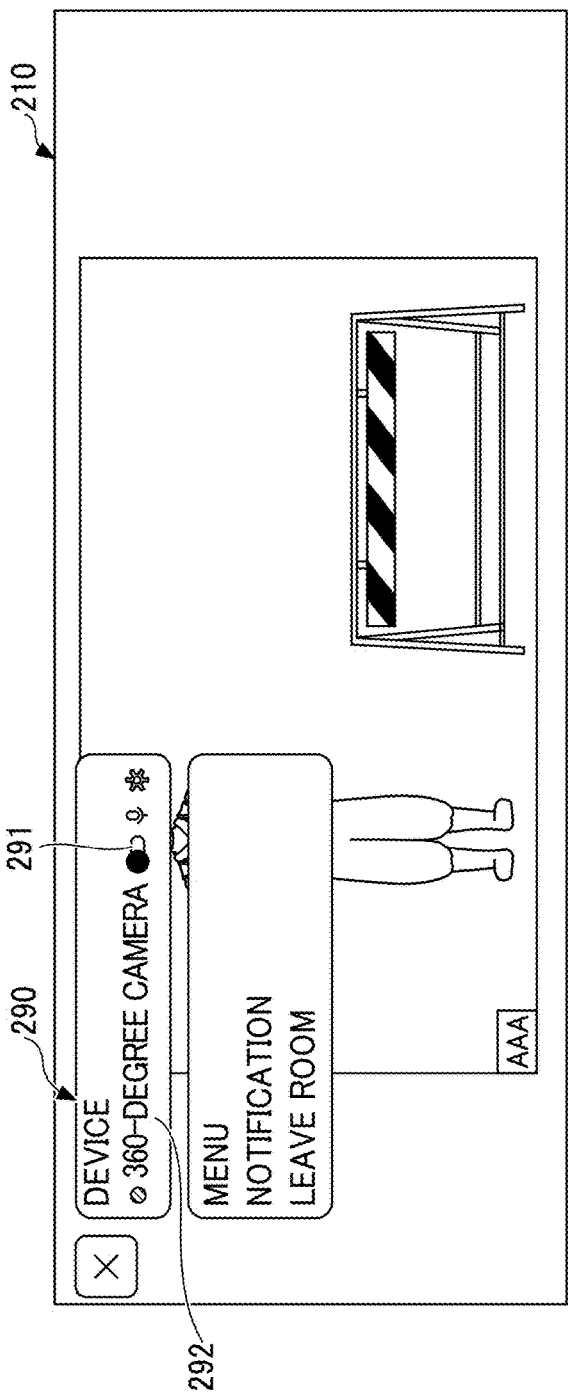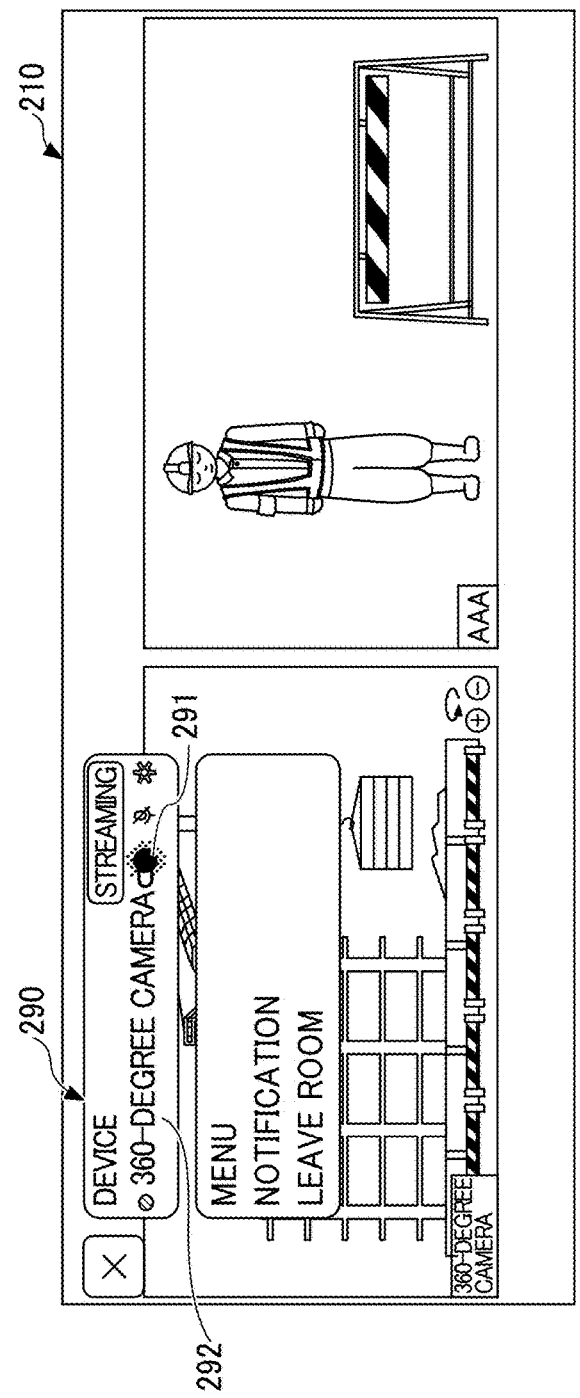
FIG. 25A
FIG. 25B

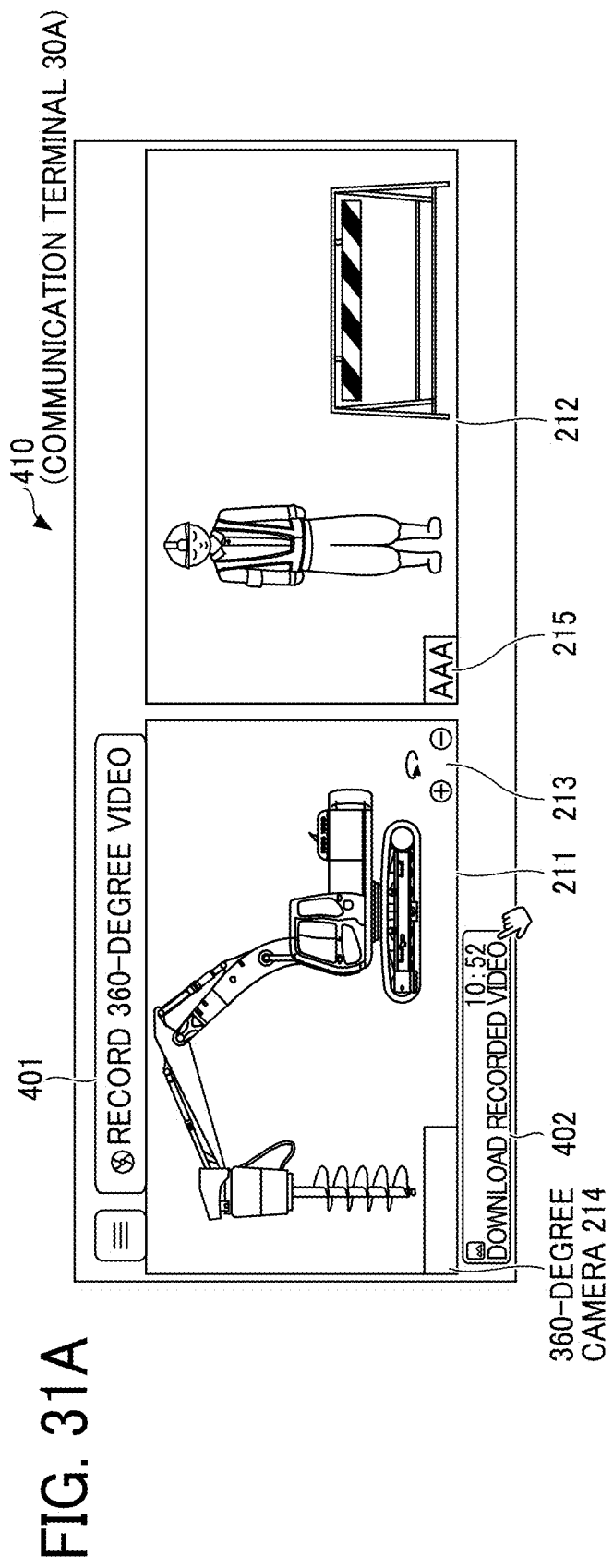

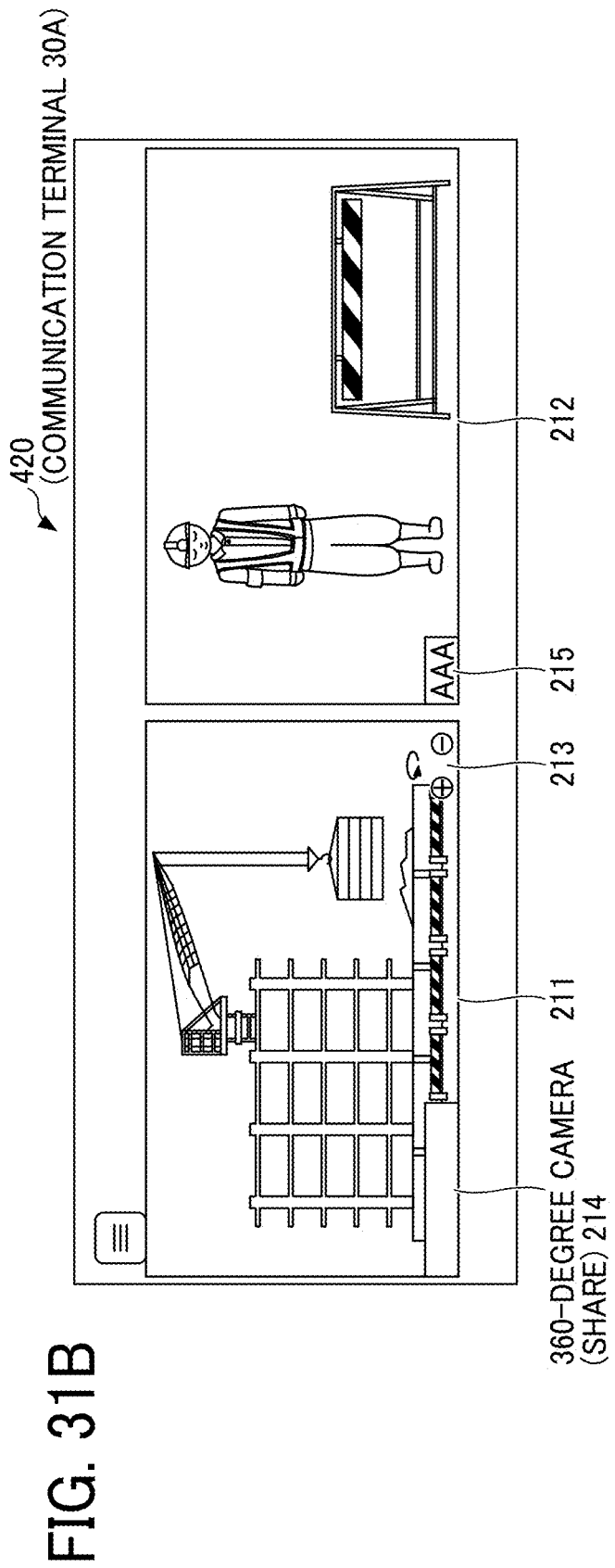

DISPLAY TERMINAL, COMMUNICATION SYSTEM, DISPLAY METHOD, AND COMMUNICATION METHOD

CROSS-REFERENCE TO RELATED APPLICATIONS

This patent application is based on and claims priority pursuant to 35 U.S.C. § 119(a) to Japanese Patent Application Nos. 2022-098304, filed on Jun. 17, 2022, and 2023-050521, filed on Mar. 27, 2023, in the Japan Patent Office, the entire disclosure of which is hereby incorporated by reference herein.

BACKGROUND

Technical Field

Embodiments of the present disclosure relate to a display terminal, a communication system, a display method, and a communication method.

Related Art

Known communication systems transmit images and audio from one site to one or more other sites in real time to allow users at remote sites to engage in remote communication using the images and the audio.

As such an image, an image having a wind-field image that is captured with a wide image capturing range and that has a wide viewing angle is known. The wide image capturing range includes a range that is failed to be checked with a normal angle of view. In the following, such a wide-field image may be referred to as a wide-angle view image. The wide-angle view image includes, for example, a 360-degree image (also referred to as a spherical image, an omnidirectional image, or an all-round image) in which the entire circumference of 360 degrees is captured. According to a user operation performed with respect to a communication terminal, a virtual viewpoint for a predetermined area in the wide-angle view image displayed on a display screen of the communication terminal is changed, and another predetermined area in the wide-angle view image after changing the virtual viewpoint can be viewed.

In a related art, a technique of cutting out a more preferable predetermined area from a wide-angle view image without performing a complicated operation is known.

Further, when a wide-angle view image related to a moving image is streamed to predetermined sites, a user at each predetermined site can view the wide-angle view image while individually changing a desired predetermined area in the wide-angle view image. Further, when a wide-angle view image related to a moving image obtained by capturing an image of a work site is recorded when the wide-angle view image is being streamed to a predetermined site, a playback of the recorded wide-angle view image can be displayed and viewed by the user afterward. If the user who views the wide-angle view image that has been recorded can grasp which predetermined area of the wide-angle view image has been displayed on a specific communication terminal at a specific site at the time of recording, the user can grasp which predetermined area is watched carefully at the specific site. This may be useful for the user for his or her follow-up thinking or action.

SUMMARY

According to an embodiment of the disclosure, a display terminal includes circuitry to receive an operation for displaying a playback of a wide-angle view image related to a moving image recorded at a time of streaming of the moving image. The wide-angle view image has a wide viewing angle. The circuitry displays, on a display, a display area representing a predetermined area of the wide-angle view image based on viewpoint information for specifying the predetermined area, in response to receiving the operation. The predetermined area is displayed by a communication terminal at the time of streaming of the moving image.

According to an embodiment of the disclosure, a communication system includes an information processing system, a communication terminal, and a display terminal. The communication terminal displays a predetermined-area image representing a predetermined area of a wide-angle view image having a wide viewing angle related to a moving image recorded at a time of streaming of the moving image performed by the information processing system, and transmits, to the information processing system, viewpoint information for specifying the predetermined area. The information processing system transmits the viewpoint information to the display terminal. The display terminal displays, on a display, a display area representing the predetermined area of the wide-angle view image displayed by the communication terminal at the time of streaming, based on the viewpoint information.

According to an embodiment of the disclosure, a display method includes receiving an operation for displaying a playback of a wide-angle view image related to a moving image recorded at a time of streaming of the moving image. The wide-angle view image has a wide viewing angle. The display method further includes displaying, on a display, a display area representing a predetermined area of the wide-angle view image based on viewpoint information for specifying the predetermined area of response to receiving the operation. The predetermined area is displayed by a communication terminal at the time of streaming of the moving image.

According to an embodiment of the disclosure, a communication method is performed by a communication system including an information processing system that performs streaming of a moving image, a communication terminal that receives and displays the moving image streamed, and a display terminal that display a playback of the moving image recorded at a time of streaming of the moving image. The communication method includes displaying a predetermined-area image representing a predetermined area of a wide-angle view image having a wide viewing angle related to the moving image recorded at the time of streaming performed by the information processing system, and transmitting, to the information processing system, viewpoint information for specifying the predetermined area, which are performed by the communication terminal. The communication method includes transmitting the viewpoint information to the display terminal, performed by the information processing system. The communication method includes displaying, on a display, a display area representing the predetermined area of the wide-angle view image displayed by the communication terminal at the time of streaming based on the viewpoint information, performed by the display terminal.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 8A is a diagram illustrating an example of how the equirectangular projection image is mapped to a surface of a sphere, according to the exemplary embodiment of the disclosure;

FIG. 8B is a diagram illustrating a spherical image, according to the exemplary embodiment of the disclosure;

FIG. 9 is an illustration of relative positions of a virtual camera and a predetermined area in a case where the spherical image is represented as a surface area of a three-dimensional solid sphere, according to the exemplary embodiment of the disclosure;

FIG. 14A and FIG. 14B are diagrams illustrating image management information stored in an image management information storage unit according to the exemplary embodiment of the disclosure;

FIG. 15A is a diagram illustrating an example of virtual room information stored in a virtual room information storage unit according to the exemplary embodiment of the disclosure;

FIG. 15B is a diagram illustrating an example of tenant information stored in a tenant information storage unit according to the exemplary embodiment of the disclosure;

FIG. 16 is a diagram illustrating viewpoint-related information stored in a viewpoint-related information storage unit according to the exemplary embodiment of the disclosure;

FIGS. 25A and 25B are diagrams each illustrating an example of a wide-angle view image transmission control dialog displayed by the communication terminal, according to the exemplary embodiment of the disclosure;

FIG. 31A is a diagram illustrating an example of an image viewing screen displayed before receiving a user operation of pressing a download button, according to the exemplary embodiment of the disclosure;

FIG. 31B is a diagram illustrating an example of an image viewing screen displayed after receiving a user operation of pressing the download button, according to the exemplary embodiment of the disclosure;

Figure 1:
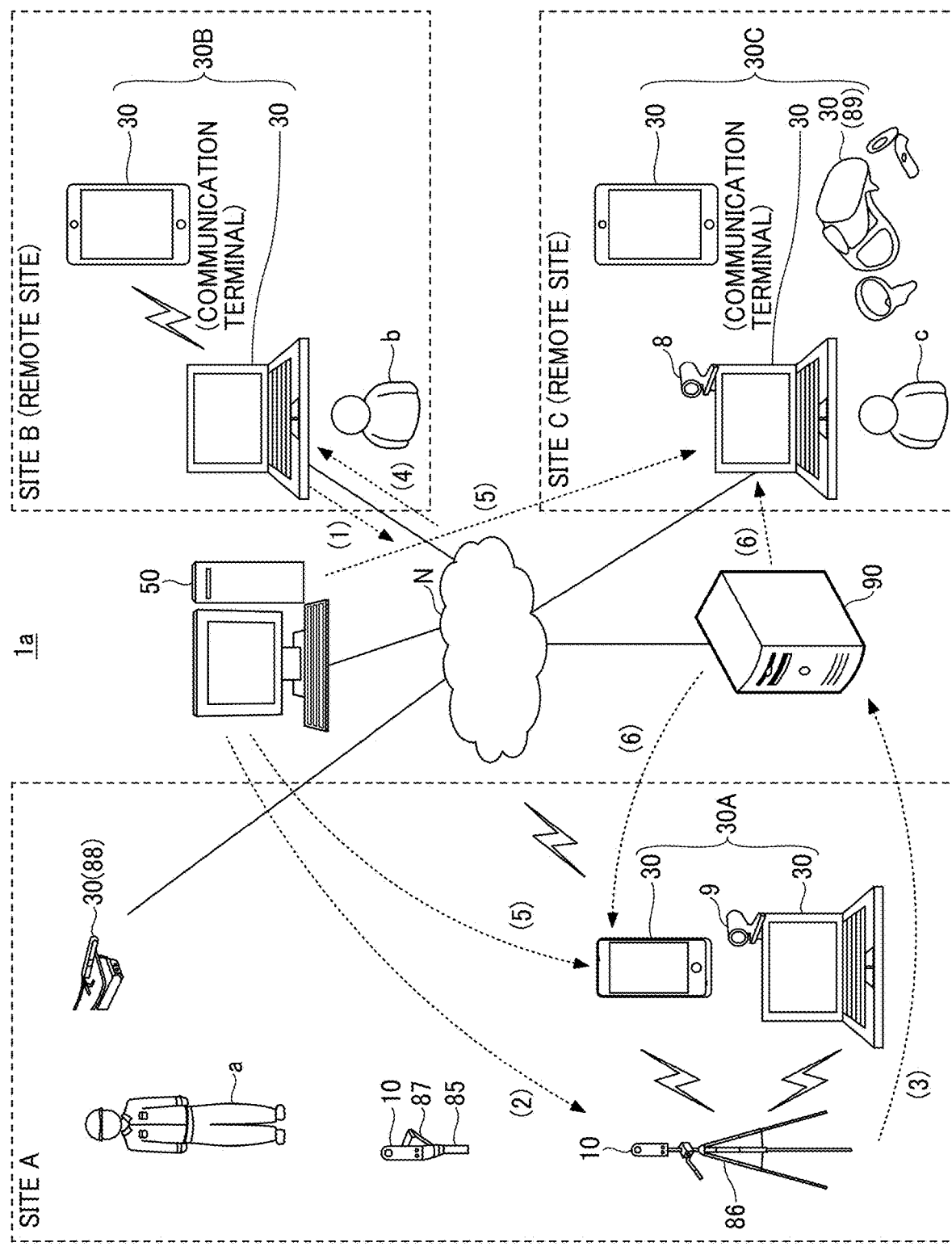
FIG. 1 is a diagram illustrating an example of remote communication using a wide-angle view image according to an exemplary embodiment of the disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of an information processing system and an image transmission method performed by the information processing system are described with reference to the drawings.

Example of Remote Communication

FIG. 1 is a diagram illustrating an example of remote communication using a wide-angle view image in the example of FIG. 1, three sites A to C communicate with each other via an information processing system 50. The number of sites is merely an example, and may be two sites, four sites, or more than four sites.

The site A is, for example, a construction site. The sites B and C may be anywhere as long as the wide-angle view image can be transmitted by communication, such as for example, an office. In the site A, an image capturing device 10 is placed. The image capturing device 10 captures an image of a subject and generates a wide-angle view image referred to as, for example, a spherical image or a wide-angle view image with a wide angle of 180 to 360 degrees in the vertical direction or the horizontal direction. Such an image of wide-angle is simply referred to as a "wide-angle view image." In the sites A to C, various communication terminals 30A to 30C for viewing the wide-angle view image are placed. In the following description, one or more communication terminals 30A may be collectively referred to as a communication terminal 30A or communication terminals 30A. The same applies to one or more communication terminals 30B and one or more communication terminals 30C. In the following description, any one or more of the communication terminals 30A to 30C may be referred to as a "communication terminal 30."

In the construction site, various constructions are carried out by workers at respective places. While the image capturing device 10 images the entire construction site to generate a wide-angle view image in which the construction site is reflected, if there is a construction work or a specific work that each of users a to C at the sites A to C desires to focus on, each user at the sites A to C can check the construction work or the specific work by changing a virtual viewpoint, or a virtual point of view, as desired. The viewpoint, or the point of view, in this case is the center of or a range of a predetermined area, which is a part of the entire wide-angle view image, displayed on a display screen of a display.

The image capturing device 10 is attached to a tripod 86, or attached to an arm 85 via a gimbal 87, for example. A relay device (in FIG. 1, the communication terminal 30A also serves as the relay device) is set up at the construction site, and the communication terminal 30A transmits the wide-angle view image received from the image capturing device 10 in a wired or wireless manner to the information processing system 50. The communication terminals 30A can also be terminals for viewing the wide-angle view image. A camera 9 is connected to the communication terminal 30, and a standard-angle view image captured by the camera 9 can also be transmitted to the information processing system 50. The camera 9 may be built in the communication terminal 30. The camera 9 may capture a wide-angle view image in addition to or in alternative to the standard-angle view image. In addition, the user a (which may be, for example, a worker) may wear a smart glasses 88, and a standard-angle view image generated by the smart glasses 88 capturing a standard-angle view image may be transmitted to the information processing system 50. The smart glasses 88 may capture a wide-angle view image in addition to or in alternative to the standard-angle view image. The smart glasses 88 are an information terminal that displays information acquired via the Internet on a display while securing a field of view. The smart glasses 88 may be placed in any site.

In the site B, the communication terminals 30B such as for example a personal computer (PC) and a smartphone are placed. The communication terminal 30B may be any device that can communicate with the information processing system 50, and may be such as for example a tablet terminal, a personal digital assistant (PDA), an electronic whiteboard, or a projector. A camera may be built in or connected to the communication terminal 30B.

In addition, the communication terminal 30C such as for example a PC, a smartphone, or a virtual reality (VR) goggles 89, is placed in the site C, and in the example of FIG. 1, a camera 8 is built in or connected to the communication terminal 30C. The VR goggles 89 are an information terminal that displays an artificial world implemented by a computer or a spherical image, according to the direction in which the neck or the body of the user moves. The VR goggles 89 may be implemented by setting goggles for VR on a smartphone such as an external VR scope. The external VR scope is a VR scope having a lens made of plastic attached to a main body and is assembled to set a smartphone to easily enjoy a VR. The camera 8 may be for a wide-angle view or a standard-angle view. The communication terminal 30C may be any device that can communicate with the information processing system 50, and may be such as for example a tablet terminal, a PDA, an electronic whiteboard, or a projector. The VR goggles 89 may be placed in any site.

In the present embodiment, communication between the image capturing device 10 and each communication terminal 30 is managed in a communication group called a "virtual room." The image capturing device 10 is associated with a virtual room, and the communication terminal 30 (a user who operates the communication terminal 30) enters the virtual room and receives the wide-angle view image transmitted by the image capturing device 10, so that the user can view the wide-angle view image. The smart glasses 88 and the VR goggles 89 can also be associated with the virtual room. The cameras 8 and 9 enter the virtual room in substantially the same manner as the communication terminal 30.

Each of the users a to c in the corresponding one of the sites A to C can change the viewpoint in the wide-angle view image as desired using the corresponding communication terminal 30. Accordingly, a case where the users a to c who view the wide-angle view image in real time are viewing with viewpoints different from each other may occur, and this can cause difficulty in communication between the users a to c. To deal with such a case, in the present embodiment, information of a virtual viewpoint set in the communication terminal 30 at one of the sites can be shared with the communication terminals 30 at the other sites. Sharing a viewpoint is described below. In the following, a case in which a viewpoint designated by the user b at the site B is shared with the user a at the site A and the user c at the site C is described.

(1) The communication terminals 30A to 30C share a wide-angle view image (an example of a first wide-angle view image) generated by the image capturing device 10 capturing an image. When the user b requests for a wide-angle view image while viewing at a viewpoint with the communication terminal 30B, the communication terminal 30B (an example of a first communication terminal) transmits viewpoint information and an image capturing request to the information processing system 50.

(2) In response to the image capturing request, the information processing system 50 specifies the viewpoint information and requests the image capturing device 10 to capture an image (which may be a still image or a moving image).

(3) The imaging capturing device 10 captures an image in response to the image capturing request, and stores a wide-angle view image (an example of a second wide-angle view image) and the viewpoint information in association with a Uniform Resource Locator (URL) (an example of storage location information) The storage location is notified from the information processing system 50. In the example of FIG. 1, the storage location is on storage 90. The wide-angle view image stored in the storage 90 can be downloaded and displayed by any communication terminal 30.

(4) The information processing system 50 transmits the URL to the communication terminal 30B.

(5) The information processing system 50 transmits the URL to the communication terminals 30A and 30C (examples of second communication terminals) that have been entered in the same virtual room automatically or in response to a request from the user b, so that are currently in the same virtual room.

(6) Each of the communication terminals 30A and 30C accesses the URL to receive the viewpoint information and the wide-angle view image, and sets and displays in a manner that the viewpoint in the wide-angle view image specified by the viewpoint information coincide with the center of the image section. The viewpoint does not necessarily coincide with the center, and the viewpoint may be set to be included in a range near the center of the image section for displaying.

The same applies to a case where the viewpoint of the user a at the site A is shared by the user b at the site B and the user c at the site C and a case where the viewpoint of the user at the site C is shared by the user a at the site A and the user b at the site B.

As described above, in a communication system 1*a* according to the present embodiment, when a wide-angle view image is distributed, or streamed, the viewpoint information is shared, without instructing movement of a viewpoint with respect to a wide-angle view image that is generated by capturing an image in a manner that a predetermined area of interest is displayed at each site, and this allows the users to communicate easily with each other.

The image capturing device 10 may transmit the wide-angle view image to the information processing system 50 in (3), and the information processing system 50 may transmit the wide-angle view image to the communication terminals 30A to 30C in (4).

The example in which the image capturing device 10 is placed in a construction site is described above with reference to FIG. 1. The present embodiment is also applicable to VR education, event streaming, remote customer service, and remote medical care, for example. In an example of VR education, the image capturing device 10 is placed in a site such as a laboratory, and a student can view a blackboard, an instrument, a sample, or an experiment result by changing a viewpoint as desired from a remote site. In an example of event streaming, the image capturing device 10 is placed at a location where an event is being held, and a participant in the event, such as an audience member, can view a state of the location from a remote site by online by changing a viewpoint as desired. The state of the location where the event is being held includes a performer, an entrant, a presenter, a video of a subject such as a product or an exhibit presented in the event, a video of a material presented in the event, and a video of a state of the location where the event is being held. The location where the event is held may be inside or outside, and the location includes a place for a sport, a concert, or a drama, for example. In an example of remote customer service in a case of applying to customer service of a travel agency, the image capturing device 10 is placed at a site that is a travel destination, and a customer can consider a travel itinerary by changing a viewpoint as desired from a remote site. In an example of remote medical care, the image capturing device 10 is placed in a medical site such as an operating room, and a doctor, a student, or a person concerned with a medical device, can view how a doctor or a nurse involved in medical care operates in the medical site, arrangement of instruments, a condition of a patient, or vital signs, by changing a viewpoint as desired from a remote site.

The site where an image is captured is not limited to the sites described above, and may a site that includes a space where the user (viewer) at another site to view the site desires to grasp the situation of the site, which is a remote site, such as a school, a factory, a warehouse, a construction site, a server room, or a store.

Terms

The "tenant" refers to a group of users associated with a contract unit when a contract is made to receive an image streaming service, or an image streaming service, from a service provider (an information processing system in the present embodiment), and is, for example, a company, an organization, or an individual, that has agreed with respect to the contract. Accordingly, the tenant can also be referred to as a user group. Although the user belongs to a tenant as an example, the user may individually subscribe to a service. In addition to users, image capturing devices, virtual rooms, and the like are registered for the tenant (user group).

The "site" refers to a place where an activity is performed. In the present embodiment, a meeting room is used as an example of a site. The meeting room is a room installed for the purpose of being used for meetings. A meeting may also be referred to as a conference, an assembly, or a gathering, for example.

The "device" refers to a device or an apparatus other than the general-purpose communication terminal 30 such as a PC or a smartphone, and is an image capturing device or a viewing device for a wide-angle view image. In the present embodiment, examples of device include the image capturing device 10, the smart glasses 88, and the VR goggles 89.

The "viewpoint information" is parameter information for specifying which predetermined area in the wide-angle view image is to be displayed on the display screen of the display. In the present embodiment, a "radius vector" a "polar angle" and an "azimuth angle" corresponding to the center of a wide-angle view image displayed on the display screen of the display are described as examples of viewpoint information. However, the viewpoint information may be specified by other parameter information such as coordinates of a diagonal vertex.

The wide-angle view image means an image having a wide viewing angle of which a range is wider than a display range that can be displayed at a time on a display screen (an area where the wide-angle view image is displayed) of a display by a predetermined display method. The wide-angle view image has, at the maximum, a display range corresponding to a field of view of 360 degrees (or 180 degrees) in the vertical direction and 360 degrees in the horizontal direction. The wide-angle view image also includes an image having a viewing angle less than 360 degrees in the vertical direction and less than 360 degrees in the horizontal direction as long as the wide viewing angle is wider than the display range that can be displayed on a display at a time. In addition, an image having a display range corresponding to a field of view of 160 degrees or more in each of the vertical direction and the horizontal direction is also included in the wide-angle view image. For example, an image having a display range wider than a range that can be visually recognized by a human at a time is also included in the wide-angle view image. In addition, an image that can be displayed on the display screen of the display at a time depending on a display method is also included in the wide-angle view image as long as the image has a wide viewing angle by switching or changing to a predetermined display method (for example, display mode, enlargement, reduction). In the present embodiment, a spherical image in an equirectangular format is described as an example of a wide-angle view image. However, an omnidirectional image, a hemispherical image, a 3-dimensional (3D) panoramic image, a 2-dimensional (2D) panoramic image, and a VR image are also included in the wide-angle view image. The wide-angle view image may be, for example, an image in a cube mapping format or a dome master format. In addition, the spherical image may be in a format other than the equirectangular format.

The "image captured with a normal angle of view" is an image that is not a wide-angle view image, and such an image is described as an image that is not a wide-angle view image (planar image) in the present embodiment.

The "communication group" is a group of users by who the wide-angle view image is shared, or to who the wide-angle view image is shared, or streamed. In a normal space, the communication group is described by the term "virtual room" in the sense that the wide-angle view image can be shared by the users when the users enter the same room. The "virtual" means being implemented by information processing via a network.

The users at each of the sites, which are remote locations, communicate remotely with each other, namely perform remote communication. The remote communication is a meeting accessible from remote sites. The meeting indicates a gathering of people for consultation or discussion, for example. Examples of the meeting include, but not limited to, serving a customer, a conference, an assembly, a gathering, a study session, a class, a seminar, and a presentation. The remote communication is not necessarily be bidirectional communication. Accordingly, the virtual room may be referred to as a virtual meeting room, or a virtual conference room.

Configuration of Communication System

Figure 2:
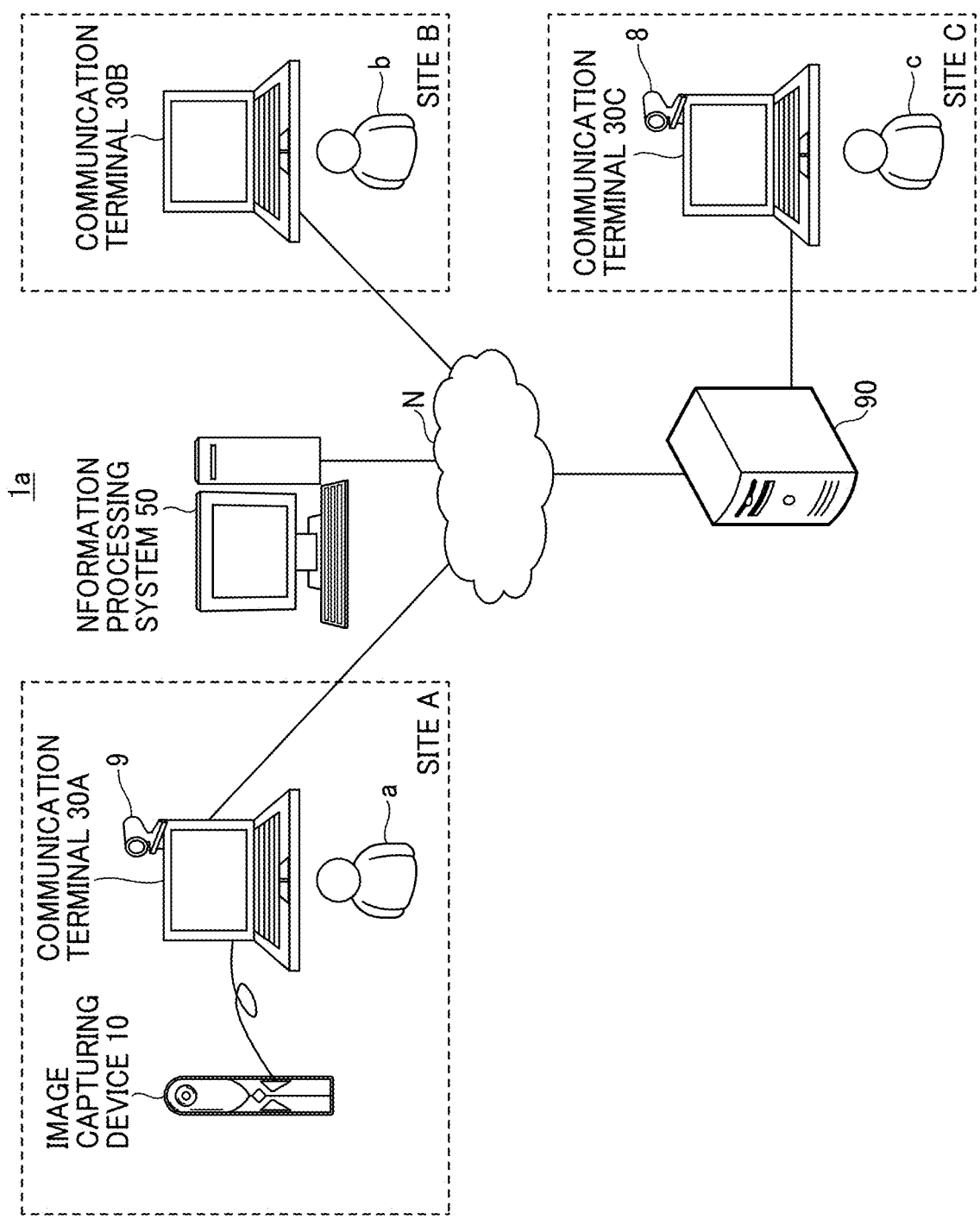
FIG. 2 is a diagram illustrating an example of a schematic configuration of a communication system according to the exemplary embodiment of the disclosure.

FIG. 2 is a diagram illustrating an example of a schematic configuration of the communication system 1a. In the example of FIG. 1, the communication system 1a of FIG. 2 is used for remote communication involving the site. The communication system 1a is a system that bidirectionally transmits and receives, among a plurality of sites, a wide-angle view image or a standard-angle view image captured by the image capturing device 10. The communication system 1a is a system with which an image streamed from a site is displayed at another site so that a user at the other site can view the image. As an example of the wide-angle view image, a spherical image captured by the image capturing device 10 is streamed. In the communication system 1a, for example, a wide-angle view image captured at one predetermined site can be viewed at another site that is a remote site.

As illustrated in FIG. 2, in the communication system 1a, the image capturing device 10, the communication terminal 30A, and the information processing system 50, which are placed in the site A, and the communication terminals 30B and 30C, which are placed in the plurality of sites (sites B and C), are connected for communication.

In a case where the image capturing device 10 has a communication function for directly connecting to a communication network N, the communication terminal 30A serving as a relay device (for example, a router) is not necessary. In such a case, the communication terminal 30A is connected to the communication network N without the image capturing devices 10. In a case where the communication terminal 30A is placed at the site A, the communication terminal 30A also serves as the relay device, and allows the user to view the wide-angle view image in substantially the same manner as the communication terminals 30B and 30C. The image capturing device 10 may be further placed at a site other than the site A, or a plurality of image capturing devices 10 may be placed at the site A.

Each communication terminal 30 and the information processing system 50 can communicate with each other via the communication network N. The communication network N includes the Internet, a mobile communication network, a local area network (LAN), for example. The communication network may include, in addition to a wired network, a wireless network in compliance with such as 3rd Generation (3G), 4th Generation (4G), 5th Generation (5G), Wireless Fidelity (WI-FI), Worldwide Interoperability for Microwave Access (WiMAX), Long Term Evolution (LTE), etc.

As will be described later, as an example of an image capturing device that captures a wide-angle view image, a digital camera that captures an image of a subject or scenery to obtain two original hemispherical images, and generates one spherical image is used as the image capturing device 10. The wide-angle view image obtained by the image capturing device 10 may be a moving image or a still image, or may be both a moving image and a still image in addition, the captured image may be a video including audio together with an image.

The communication terminal 30 is a computer such as a PC used by the user at each site. The communication terminal 30 displays an image obtained by imaging at the site, a wide-angle view image (still image or moving image) streamed from another site, and a standard-angle view image. The communication terminal 30 acquires the wide-angle view image captured by the image capturing device 10 via the communication network N, for example. Software for executing image processing, such as Open Graphics Library for Embedded Systems (OpenGL ES), is installed in the communication terminal 30, and image display based on the viewpoint information for specifying a partial area of a wide-angle view image can be performed. Note that OpenGL ES is an example of software that executes image processing, and other software may be used. In addition, even if software for executing image processing is not installed, image processing may be executed by software received from the outside, or image display may be performed by receiving a result of image processing executed by external software. In other words, the communication terminal 30 can display the predetermined area, which is a part of the wide-angle view image.

The communication terminal 30 can arbitrarily change a viewpoint with respect to a display range of a wide-angle view image in accordance with the operation of the user. By moving a virtual viewpoint in response to a user input operation (including a key input, a drag, and a scroll) on a touch panel, a direction button, a mouse, a keyboard, or a touch pad, the communication terminal 30 can change and display a range of field of view (predetermined area) based on the viewpoint information corresponding to the viewpoint after the movement. Further, in a case where the communication terminal 30 is a communication terminal worn by the user, such as VR goggles, posture information of the communication terminal 30 changed according to a change in the motion of the user wearing the communication terminal 30 may be detected, and the virtual viewpoint may be moved according to the detected posture information so that the range of field of view (predetermined area) is changed and displayed based on the viewpoint information corresponding to the viewpoint after the movement.

The communication terminal 30A operates for streaming the wide-angle view image acquired from the image capturing device 10 via a wired cable such as a universal serial bus (USB) cable connected to an input/output interface (I/F) 116, which is described later, to the communication terminals 30 at the other sites via the information processing system 50. The connection between the image capturing device 10 and the communication terminal 30A may be wireless connection using short-range wireless communication in alternative to the wired connection that uses a wired cable. A plurality of communication terminals 30A may be placed in the site A.

There is also a case where the user at the site A wears the smart glasses 88, and the smart glasses 88 are connected to the communication network N. In this case, an image captured by the smart glasses 88 is transmitted to the information processing system 50 via the communication network N, and the information processing system 50 can stream the image to the communication terminal 30 at each site.

The communication terminal 30B is placed at the site B where the user b is present, and the communication terminal 30C is placed at the site C where the user c is present. A plurality of communication terminals 30B and a plurality of communication terminals 30C may be placed at the sites B and C, respectively. The communication terminals 30B and 30C may be portable so that the users b and c can move with communication terminals 30B and 30C, respectively.

Each of the communication terminals 30A to 30C at the corresponding one of the sites A to C have the camera 8 or the camera 9 that is an example of an image capturing unit. The camera 8 or the camera 9 may be built in or externally attached to each of the communication terminals 30A to 30C. Accordingly, an image obtained by imaging at one of the sites using the camera 8 or the camera 9 of a corresponding one of the communication terminals 30A to 30C can be streamed to the other sites. In addition, a desired device may be placed in each of the sites A to C.

The arrangement of the terminals and devices (the communication terminals 30 and the image capturing devices) and the users illustrated in FIG. 2 is an example, and another example may be used. Examples of the communication terminal 30 are not limited to a PC, but include a tablet terminal, a smartphone, a PDA, a wearable terminal, such as smart glasses and VR goggles, a projector (PJ), an electronic whiteboard, which is a whiteboard that can perform mutual communication and has an electronic whiteboard function, and an autonomous driving robot. The communication terminal 30 may be a computer on which a web browser or an application dedicated to an image streaming service operates.

When including a display, the image capturing device 10 may display an image streamed from another site.

The information processing system 50 includes one or more information processing apparatuses. The information processing system 50 manages and controls communication between the image capturing device 10 and the communication terminals 30 among the sites, and manages the wide-angle view images transmitted or received. The information processing system 50 provides a platform with which a function used for providing an image streaming service for streaming a wide-angle view image is available. The platform may be made available to a service provider such as an individual or a company who desires to provide an image streaming service by contract. In the following description, in order to distinguish from a tenant that receives an image streaming service, a service provider that provides the image streaming service to a user using a contracted platform is referred to as a platform contractor.

Accordingly, the information processing system 50 may disclose an application programming interface (API) as a platform so that the platform contractor can provide various image streaming services using the API. The platform contractor develops software such as a screen to be displayed by the communication terminal 30 and an application for calling the API. The platform contractor does not have to develop a function provided by the API such as an image streaming function from the beginning.

The information processing system 50 may be configured by a single computer or a plurality of computers to which divided portions (functions) are arbitrarily allocated. All or a part of the functions of the information processing system 50 may be implemented by a server computer residing on a cloud network or a server computer residing on an on-premises network.

The storage 90 is a storage device that stores data such as a wide-angle view image. The storage 90 may be external storage separate from the information processing system 50 (may be cloud storage or on-premises storage), or may be storage included in the information processing system 50.

Hardware Configuration

Figure 3:
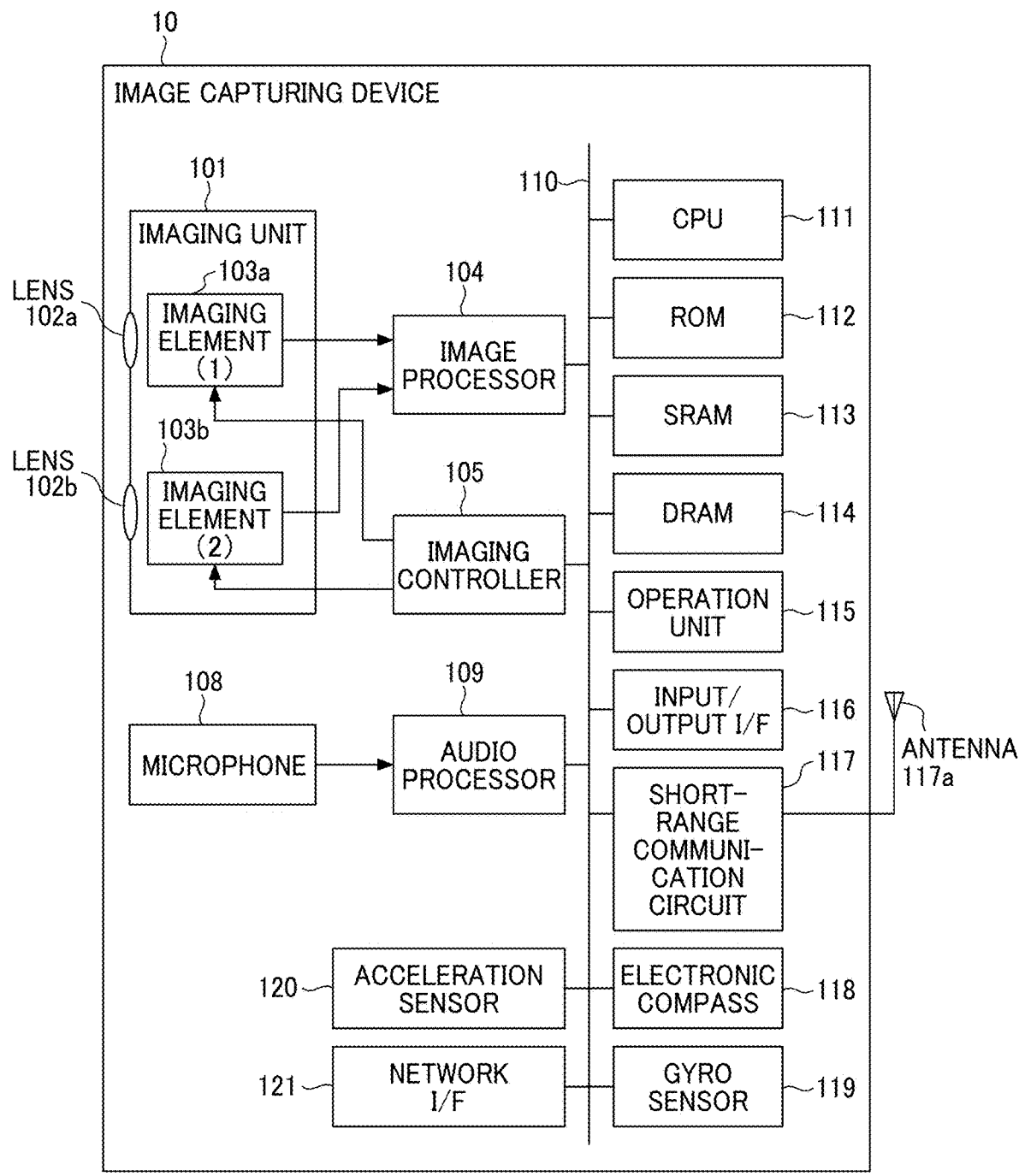
FIG. 3 is a block diagram illustrating an example of a hardware configuration of an image capturing device according to the exemplary embodiment of the disclosure.
Figure 4:
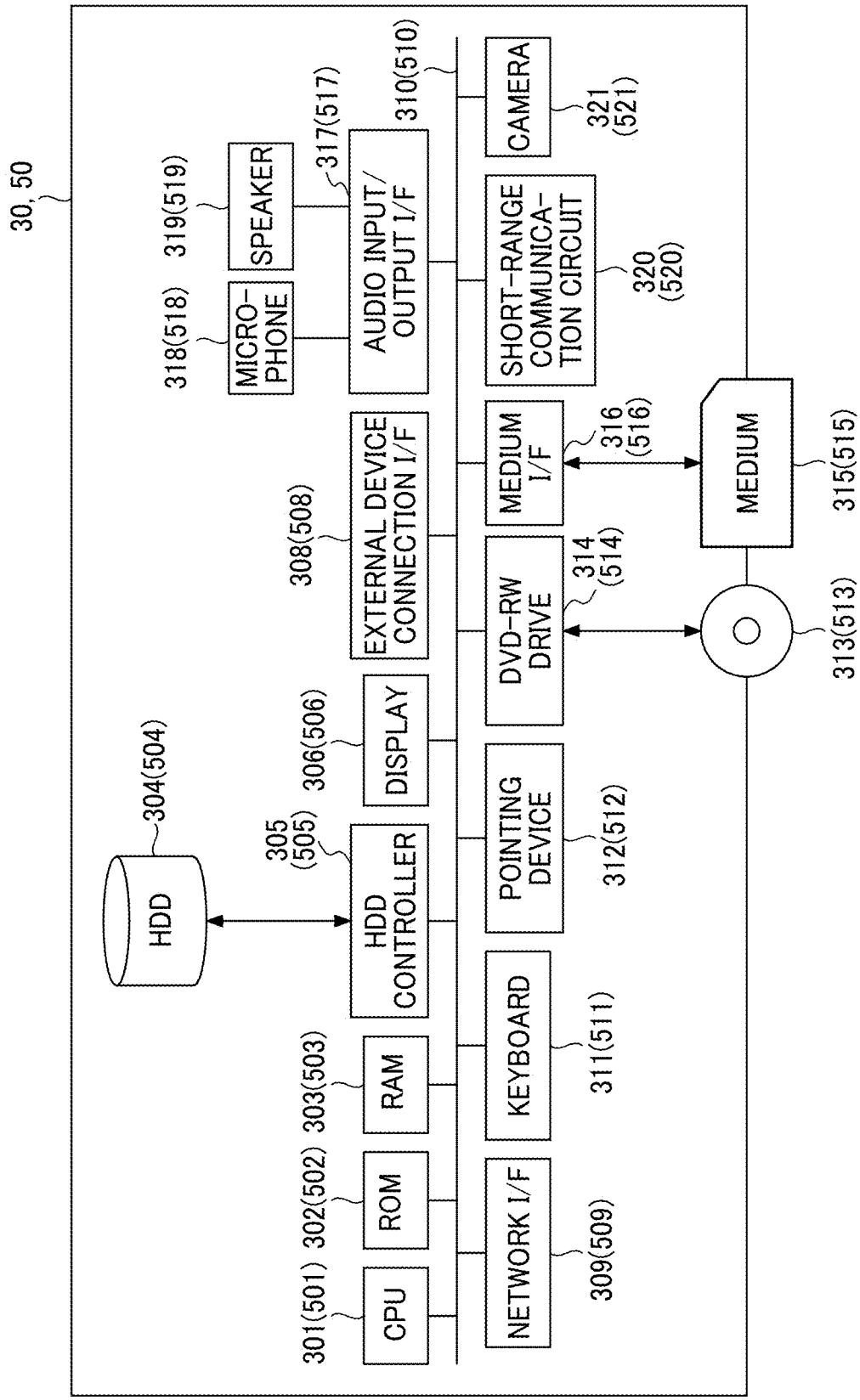
FIG. 4 is a block diagram illustrating an example of a hardware configuration of each of a communication terminal and an information processing system according to the exemplary embodiment of the disclosure.

Referring to FIG. 3 to FIG. 4, hardware configurations of each apparatus, device, and terminal of an image communication system according to the present embodiment are described below. In the hardware configurations illustrated in FIG. 3 and FIG. 4, certain hardware elements may be added or omitted as appropriate.

Hardware Configuration of Image Capturing Device

A hardware configuration of the image capturing device 10 according to the present embodiment is described with reference to FIG. 3. FIG. 3 is a block diagram illustrating an example of a hardware configuration of the image capturing device 10. In the following description of the present embodiment, the image capturing device 10 that is a spherical (omnidirectional) image capturing device having two imaging elements is used. However, the image capturing device 10 may have one imaging element or more than two imaging elements. In addition, the image capturing device 10 is not necessarily an image capturing device dedicated to omnidirectional image capturing. A general-purpose digital camera or a smartphone can be used by being attached with an external omnidirectional image capturing unit to implement substantially the same function as that of the image capturing device 10.

As illustrated in FIG. 3, the image capturing device 3 includes an imaging unit 101, an image processor 104, an imaging controller 105, a microphone 108, an audio processor 109, a central processing unit (CPU) 1.11, a read only memory (ROM) 112, a static random access memory (SRAM) 113, a dynamic random access memory (DRAM) 114, the operation unit 115, the input/output I/F 116, a short-range communication circuit 117, an antenna 117a for the short-range communication circuit 117, an electronic compass 118, a gyro sensor 119, an acceleration sensor 120, and a network I/F 121.

The imaging unit 101 includes two wide-angle lenses (so-called fish-eye lenses) 102a and 102b (collectively referred to as lens 102 unless they need to be distinguished from each other), each having an angle of view of equal to or greater than 180 degrees so as to form a hemispherical image. The imaging unit 101 further includes the two imaging elements 103a and 103b corresponding to the lenses 102a and 102b respectively. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers. The configuration in which the imaging unit 101 includes two wide-angle lenses is merely an example, and one wide-angle lens may be included, or three or more wide-angle lenses may be included.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an internee integrated circuit (12C) bus. The image processor 104, the imaging controller 105, and the audio processor 109 are each connected to the CPU 111 via a bus 110. Furthermore, the ROM 112, the SRAM 113, the DRAM 114, the operation unit 115, the input/output I/F 116, the short-range communication circuit 117, the electronic compass 118, the gyro sensor 119, the acceleration sensor 120, and the network I/F 121 are also connected to the bus 110.

The image processor 104 acquires image data from each of the imaging elements 103a and 103b via the parallel I/F bus and performs predetermined processing on each image data. Then the image processor 104 combines the image data to generate data of an equirectangular projection image (an example of wide-angle view image), which is described later.

The image controller 105 functions as a master device while each of the imaging elements 103a and 103b functions as a slave device, and the image controller 105 sets commands in the group of registers of each of the imaging elements 103a and 103b through the I2C bus. The imaging controller. 105 receives various commands from the CPU 111. In addition, the image controller 105 obtains status data of the group of registers of each of the imaging elements 103a and 103b through the I2C bus and transmits the status data to the CPU 111.

The image controller 105 instructs the imaging elements 103a and 103b to output the image data at a time when the shutter button of the operation unit 115 is pressed. In some cases, the image capturing device 10 displays a preview image on a display (e.g., a display of an external terminal such as a smartphone that performs short-range communication with the image capturing device 10 through the short-range communication circuit 117) or displays a moving image. In case of displaying moving image, the image data is continuously output from the imaging elements 103a and 103b at a predetermined frame rate (frames per minute).

Furthermore, the image controller 105 operates in conjunction with the CPU 111 to synchronize the output timings of image data between the imaging elements 103a and 103b. In the present embodiment, the image capturing device 10 does not include a display unit (display). However, in some embodiments, the image capturing device 10 may include a display. The microphone 108 converts sound into audio data (signals).

The audio processor 109 obtains the audio data from the microphone 108 through an I/F bus and performs predetermined processing on the audio data.

The CPU 111 controls entire operation of the image capturing device 10, for example, by performing predetermined processing.

The ROM 112 stores various programs for execution by the CPU 111. Each of the SRAM 113 and the DRAM 114 operates as a work memory to store programs to be executed by the CPU 111 or data being currently processed. More specifically, in one example, the DRAM 114 stores image data currently processed by the image processor 104 and data of the equirectangular projection image on which processing has been performed.

The operation unit 115 collectively refers to various operation keys, a power switch, the shutter button, and a touch panel having functions of both displaying information and receiving input from a user, which can be used in combination. The user operates the operation unit 115 to input various image capturing (image capturing) modes or image capturing (image capturing) conditions.

The input/output I/F 116 collectively refers to an interface circuit such as a USB I/F for an external medium such as a secure digital (SD) card or a personal computer. The input/output I/F 116 supports at least one of wired and wireless communications. The data of the equirectangular projection image, which is stored in the DRAM 114, is stored in the external medium via the input/output I/F 116 or transmitted to an external terminal (apparatus) via the input/output I/F 116, as appropriate.

The short-range communication circuit 117 communicates with an external terminal (apparatus) via the antenna 117a of the image capturing device 10 by short-range wireless communication such as near field communication (NFC), BLUETOOTH (registered trademark), or. Wi-Fi. The short-range communication circuit 117 transmits the data of equirectangular projection image to an external terminal (apparatus).

The electronic compass 118 calculates an orientation of the image capturing device 10 from the Earth's magnetism to output orientation information. The orientation information is an example of related information, which is metadata described in compliance with Exif. This information is used for image processing such as image correction of a captured image. The related information also includes an imaging data and time, that indicates date and time when the image is captured, and a data size of the image data.

The gyro sensor 119 detects a change in tilt of the image capturing device 10 (roll, pitch, yaw) with movement of the image capturing device 10. The change in tilt is one example of related information (metadata) described in compliance with Exif. This information is used for image processing such as image correction of a captured image.

The acceleration sensor 120 detects acceleration in three axial directions. The image capturing device 10 calculates position (an angle with respect to the direction of gravity) of the image capturing device 10, based on the acceleration detected by the acceleration sensor 120. With the acceleration sensor 120, the image capturing device 10 corrects tilt of image with high accuracy.

The network I/F 121 is an interface for performing data communication, via such as a router, using the communication network N such as the Internet. In addition, the hardware configuration of the image capturing device 10 is not limited to the above, and may be any configuration as long as the functional configuration of the image capturing device 10 can be implemented. In addition, at least a part of the hardware configuration may be on the communication network N.

Hardware Configuration of Communication Terminal

FIG. 4 is a block diagram illustrating an example of a hardware configuration of each of the communication terminal 30 and the information processing system 50. First, the communication terminal 30 is described. Each hardware element of the communication terminal 30 is denoted by a reference numeral in 300 series. The communication terminal 30 is implemented by a computer and includes, as illustrated in FIG. 4, a CPU 301, a ROM 302, a RAM 303, a hard disk (HD) 304, a hard disk drive (HDD) controller 305, a display 306, an external device connection I/F 308, network I/F 309, a bus line 310, a keyboard 311, a pointing device 312, a digital versatile disc rewxitable (DVD-RW) drive 314, a medium I/F 316, an audio input/output I/F 317, a microphone 318, a speaker 319, a short-range communication circuit 320, and a camera 321.

The CPU 301 controls entire operation of the communication terminal 30. The ROM 302 stores a control program for driving the CPU 301 such as an initial program loader (IPL). The RAM 303 is used as a work area for the CPU 301. The HDD 304 stores various data such as a control program and data. The HDD controller 305 controls reading or writing of various data from or to the HDD 304 under the control of the CPU 301.

The display 306 displays various information such as a cursor, menu, window, characters, or image. In one example, the display 306 is a touch panel display provided with an input device. The display 306 is an example of a display unit. The display unit includes not only a display provided to the communication terminal 30 but also a display externally attached to the communication terminal 30, a display of another communication terminal externally attached to the communication terminal 30, or a screen (including a subject to be displayed by projection mapping) projected by a projector.

The external device connection I/F 308 is an interface for connecting to various external devices. Examples of the external devices include, but are not limited to, a USB memory and a printer. The network I/F 309 is an interface that transmits or receives data via the communication network N. The bus line 310 is an address bus or a data bus, which electrically connects the hardware elements in FIG. 4 such as the CPU 301. Each of the HDD 304 and the HDD controller 305 may be a solid state drive (SSD) or an SSD controller.

The keyboard 311 is an example of an input device including a plurality of keys for inputting characters, numerical values, various instructions, and the like. The pointing device 312 is an example of an input device that allows a user to select or execute a specific instruction, select a target for processing, or move a cursor being displayed. The input device (input means) is not limited to the keyboard 311 and the pointing device 312, and may be a touch panel, a voice input device, or the like. The DVD-RW drive 314 reads or writes various data from or to a DVD-RW 313, which is an example of a removable storage medium. In alternative to the DVD-RW 313, any recording medium may be used such as a DVD recordable (DVD-R) and a BLU-RAY (Registered Trademark) disk. The medium I/F 316 controls reading or writing (storage) of data to a storage medium 315 such as a flash memory. The microphone 318 is an example of audio collecting device, which is a built-in type, to input audio. The audio input/output I/F 317 is a circuit for controlling input and output of sound signals between the microphone 318 and the speaker 319 under the control of the CPU 301. The short-range communication circuit 320 communicates with an external terminal (apparatus) by short-range wireless communication such as NFC, BLUETOOTH, or Wi-Fi. The camera 321 is an example of an imaging device, which is a built-in type, to capture an image of a subject to obtain image data. Note that each of the microphone 318, the speaker 319, or the camera 321 may be an external device in alternative to the built-in device of the communication terminal 30.

In addition, the hardware configuration of the communication terminal 30 is not limited to the above, and may be any configuration as long as the functional configuration of the communication terminal 30 can be implemented. In addition, at least a part of the hardware configuration may be on the communication network N.

Hardware Configuration of Information Processing System

As illustrated in FIG. 4, the hardware elements of the information processing system 50 are denoted by reference numerals in 500 series. The information processing system 50 is implemented by a computer and has substantially the same configuration as that of the communication terminal 30 as illustrated in FIG. 4, and thus the description of hardware configuration is omitted.

In addition, the hardware configuration of the information processing system 50 is not limited to the above, and may be any configuration as long as the functional configuration of the information processing system 50 can be implemented. In addition, at least a part of the hardware configuration may be on a network.

Further, any one of the above-described control programs may be recorded in a file in a format installable or executable on a computer-readable recording medium for distribution. Examples of the recording medium include a compact disc recordable (CD-R), a DVD, a BLU-RAY Disc, an SD card, and a USB memory.

In addition, such recording medium may be provided in the form of a program product to users within a certain country or outside that country. For example, the communication terminal 30 executes the control program to implement a method of displaying an image according to the present disclosure.

Wide-Angle View Image and Viewpoint Information

A method of generating a wide-angle view image (spherical image) is described with reference to FIGS. 5 to 12.

Figure 5A:
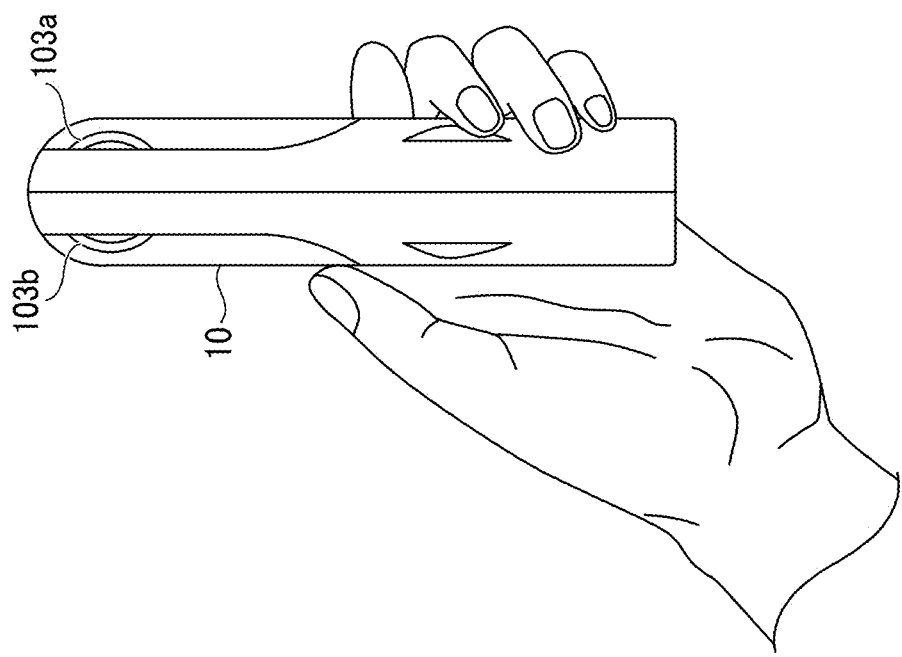
FIG. 5A is a left side view of the image capturing device according to the exemplary embodiment of the disclosure.
Figure 5B:
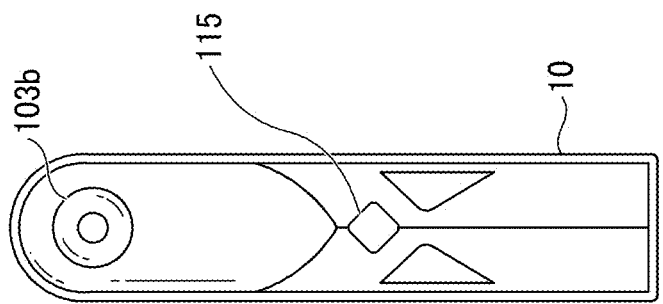
FIG. 5B is a front view of the image capturing device according to the exemplary embodiment of the disclosure.
Figure 5C:
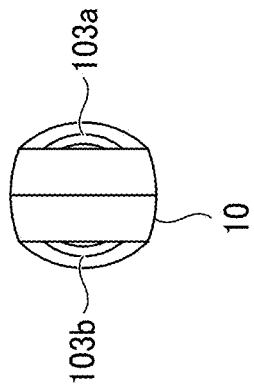
FIG. 5C is a plan view of the image capturing device according to the exemplary embodiment of the disclosure.

First, referring to FIGS. 5A to 5C, an external view of an image capturing device 10 is described according to the present embodiment. The image capturing device 10 is a digital camera for obtaining a captured image to be a 360-degree spherical image. FIG. 5A, FIG. 5B, and FIG. 5C are a left side view, a front view, and a plan view, respectively, of the image capturing device 10. The illustrated external view of the image capturing device 10 is merely an example, and the external view may be different.

As illustrated in FIG. 5A, the image capturing device 10 is palm-sized, but the illustrated shape is merely an example and another shape may also be applicable. As illustrated in FIGS. 5A to 5C, the imaging element 103a is provided on a front side (anterior side) of an upper section of the image capturing device 10, and the imaging element 103b is provided on a back side (rear side) thereof. These imaging elements (image sensors) 103a and 103b are used in combination with optical members (e.g., lenses 102a and 102b, described below), each being configured to capture a hemispherical image having an angle of view of 180 degrees or wider. As illustrated in FIG. 5B, the operation unit 115 such as a shutter button is provided on the rear side, which is opposite of the front side, of the image capturing device 10. As described above, the number of imaging elements is not limited to two, but may be one or more than two.

Figure 6:
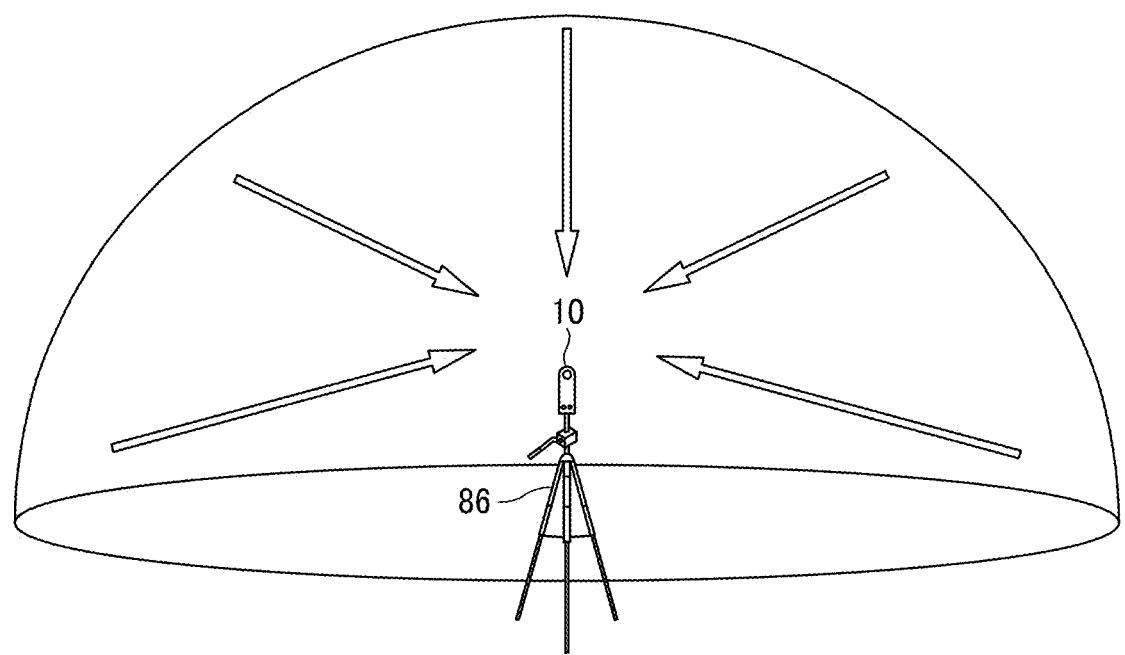
FIG. 6 is a diagram illustrating a picture of how the image capturing device is used, according to the exemplary embodiment of the disclosure.

Next, referring to FIG. 6, a description is given of a situation where the image capturing device 10 is used. FIG. 6 is a diagram illustrating a picture of how the image capturing device is used, according to the present embodiment. As illustrated in FIG. 6, for example, the image capturing device 10 is used for capturing a subject surrounding the image capturing device 10. The imaging elements 103a and 103b illustrated in FIG. 5 capture the subject surrounding the image capturing device 10 to obtain two hemispherical images.

Figure 7A:
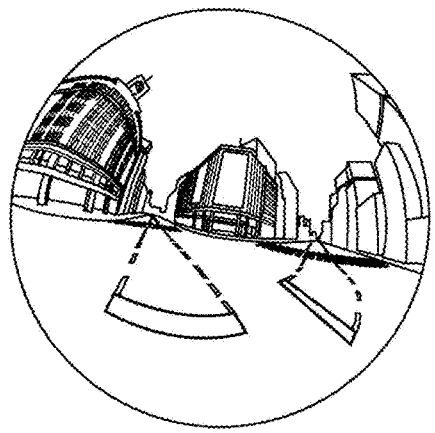
FIG. 7A is a diagram illustrating a hemispherical image (front side) captured by the image capturing device according to the exemplary embodiment of the disclosure.
Figure 7B:
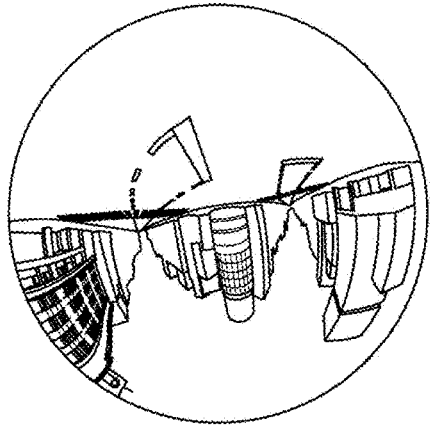
FIG. 7B is a diagram illustrating a hemispherical image (back side) captured by the image capturing device according to the exemplary embodiment of the disclosure.
Figure 7C:
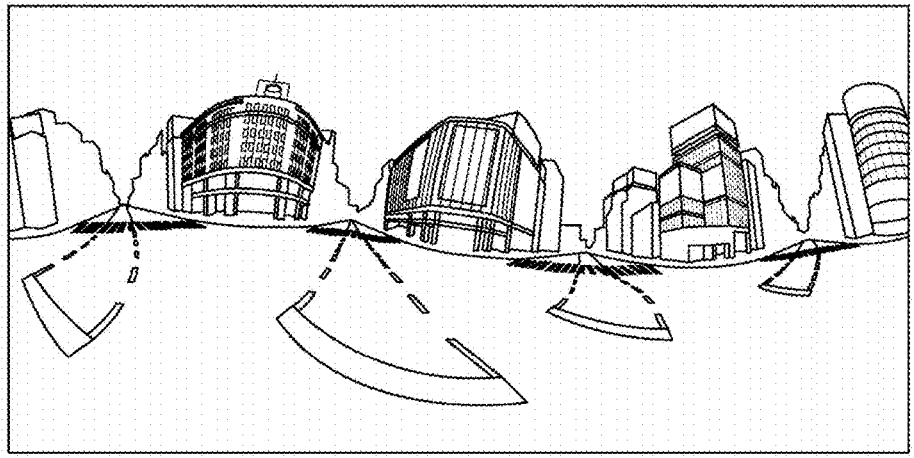
FIG. 7C is a diagram illustrating an image represented by an equirectangular projection method according to the exemplary embodiment of the disclosure.

Referring to FIGS. 7A to 7C and FIGS. 8A and 8B, an overview of an operation of generating a spherical image from the images captured by the image capturing device 10. FIG. 7A is a diagram illustrating a hemispherical image (front side) captured by the image capturing device 10. FIG. 7B is a diagram illustrating a hemispherical image (back side) captured by the image capturing device 10. FIG. 7C is a diagram illustrating an image represented by an equirectangular projection method, which may be referred to as an "equirectangular projection image" (or equidistant cylindrical projection image). FIG. 8A is a diagram illustrating an example of how the equirectangular projection, image is mapped to a surface of a sphere according to the present embodiment. FIG. 8B is a diagram illustrating a spherical image according to the present embodiment. The "equirectangular projection image" is a spherical image in an equirectangular format as an example of the wide-angle view image described above.

As illustrated in FIG. 7A, an image captured by the imaging element 103a is a curved hemispherical image (front side) taken through the lens 102a. Further, as illustrated in FIG. 7B, an image captured by the imaging element 103b is a curved hemispherical image (back side) taken through the lens 102b. The image capturing device 10 combines the hemispherical image (front side) and the hemispherical image (back side), which are reversed by 180-degree from each other, to generate the equirectangular projection image EC as illustrated in FIG. 7C.

The image capturing device 10 uses OpenGL ES to map an equirectangular projection image EC in a manner that the sphere surface is covered as illustrated in FIG. 8A, to generate a spherical image (spherical panoramic image) CE as illustrated in FIG. 8B. In other words, the spherical image CE is represented as an image corresponding to the equirectangular projection image EC of which a surface faces toward the center of the sphere. OpenGL ES is a graphic library used for visualizing 2D data and 3D data. Note that OpenGL ES is an example of software that executes image processing, and other software may be used to generate the spherical image CE. The spherical image CE may be a still image or a moving image. Although the example in which the image capturing device 10 generates the spherical image is described above, the information processing system 50 or the communication terminal 30 may perform the image processing or a part of the image processing in substantially the same manner.

As described above, since the spherical image CE is an image attached to the sphere surface to cover the sphere surface, a part of the image may look distorted when viewed from the user, giving a feeling of discomfort to human. The image capturing device 10 or the communication terminal 30 displays an image of a predetermined area T that is a part of the spherical image CE as a flat image having fewer curves, so that prevents the image giving the feeling of discomfort to the human. Hereinafter, a description is given of displaying a predetermined-area image Q with reference to FIG. 9 and FIGS. 10A and 10B.

Figure 10A:
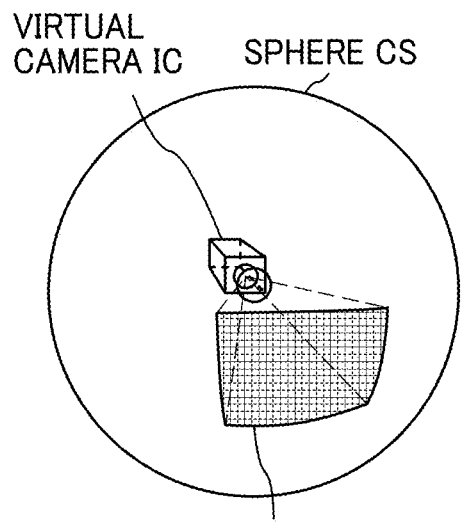
FIG. 10A is a perspective view of FIG. 9.
Figure 10B:
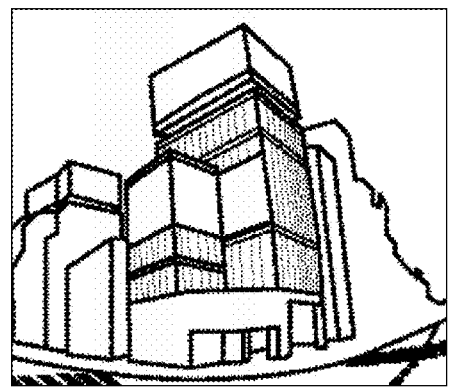
FIG. 10B is a diagram illustrating a predetermined-area image of FIG. 10A being displayed on a display, according to the exemplary embodiment of the disclosure.
Figure 10C:
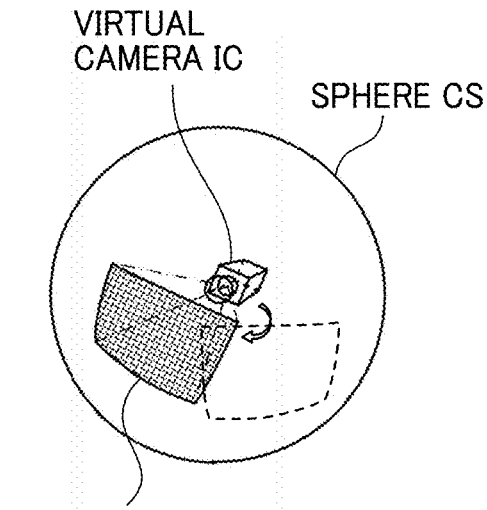
FIG. 10C is a view illustrating a predetermined area after a viewpoint of the virtual camera in FIG. 10A is changed, according to the exemplary embodiment of the disclosure.
Figure 10D:
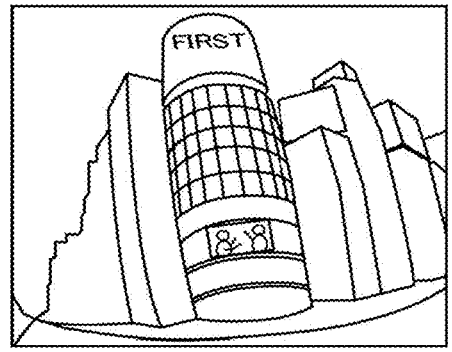
FIG. 10D is a diagram illustrating the predetermined-area image of FIG. 10C being displayed on a display, according to the exemplary embodiment of the disclosure.

FIG. 9 is an illustration of relative positions of a virtual camera IC and the predetermined area T when the spherical image is represented as a three-dimensional solid sphere, according to the present embodiment. The virtual camera IC corresponds to a position of virtual viewpoint of a user who is viewing the spherical image CE represented as a surface area of a three-dimensional solid sphere. FIG. 10A is a perspective view of FIG. 9. FIG. 10B is a diagram illustrating the predetermined-area image of FIG. 10A being displayed on a display. FIG. 10C is a view illustrating a predetermined area after the viewpoint of the virtual camera IC in FIG. 10A is changed. FIG. 10D is a diagram illustrating the predetermined-area image of FIG. 10C being displayed on a display.

Assuming that the spherical image CE having been generated is a surface area of the solid sphere CS, the virtual camera IC is inside of the spherical image CE as illustrated in FIG. 9. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE. In addition, zooming in the predetermined area T can also be determined by bringing the virtual camera IC closer to or away from the spherical image CE. The predetermined-area image Q is an image of the predetermined area T, in the spherical image CE. The predetermined area T is defined by the angle of view α and a distance f from the virtual camera IC to the spherical image CE (see FIG. 11).

The predetermined-area image Q, which is an image of the predetermined area T illustrated in FIG. 10A, is displayed on a predetermined display as an image of an imaging area of the virtual camera IC, as illustrated in FIG. 10B. The image illustrated in FIG. 10B is the predetermined-area image represented by the predetermined-area information that is set by default. In the following description of the embodiment, an imaging direction (ea, aa) and an angle of view α of the virtual camera IC are used. In another example, the predetermined area T is identified by positional coordinate of an imaging area (X, Y. Z) of the virtual camera IC, i.e., the predetermined area T, rather than the angle of view α and the distance f.

When the virtual viewpoint of the virtual camera IC is moved (changed) from the state illustrated in FIG. 10A to the right (left in the drawing) as illustrated in FIG. 10C, the predetermined area T in the spherical image CE is moved to a predetermined area T', accordingly. Accordingly, the predetermined-area image Q displayed on the predetermined display is changed to a predetermined-area image Q'. As a result, the image displayed on the display changes from the image illustrated in FIG. 10B to the image illustrated in FIG. 10D.

Figure 11:
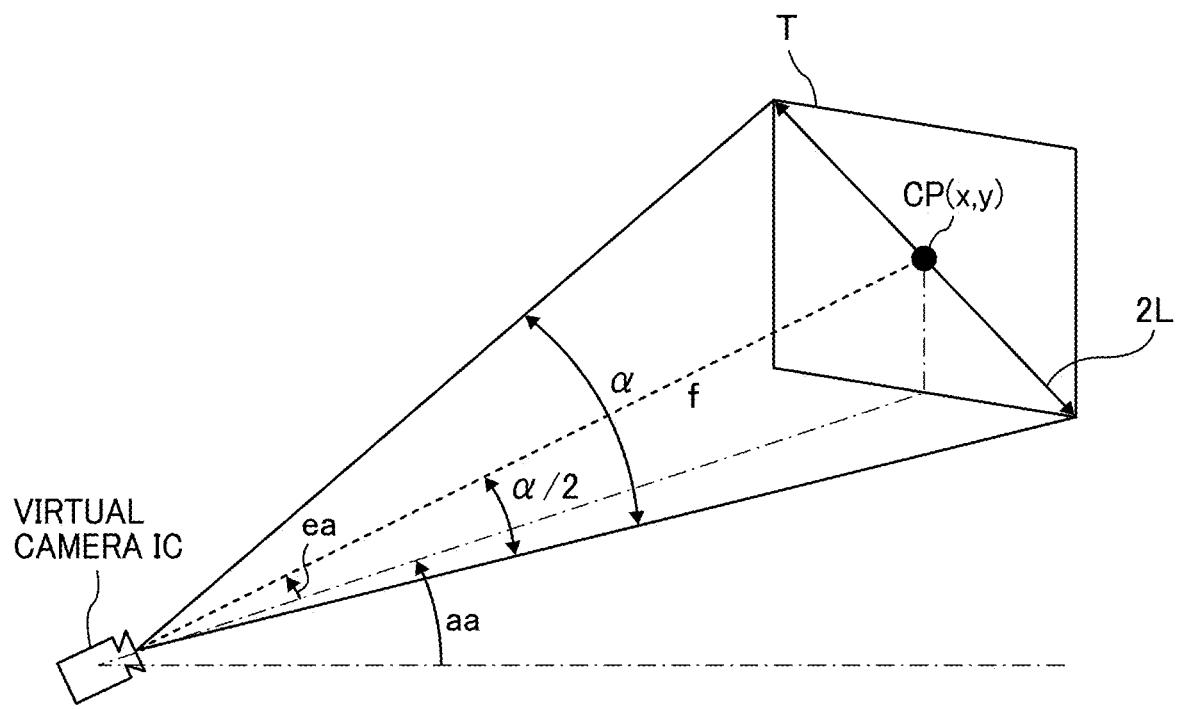
FIG. 11 is a diagram illustrating a relation between predetermined-area information and a predetermined-area image, according to the exemplary embodiment of the disclosure.

Referring to FIG. 11, a relation between the predetermined-area information and the image of the predetermined area T is described according to the present embodiment. FIG. 11 is a view illustrating a relation between the predetermined-area information and the image of the predetermined area T according to the present embodiment. As illustrated in FIG. 11, "ea" denotes an elevation angle, "aa" denotes an azimuth angle, and "α" denotes an angle of view, respectively, of the virtual camera IC. The position of the virtual camera IC is adjusted, such that the point of gaze of the virtual camera IC, indicated by the imaging direction (ea, aa), matches the center point CP (x, y) of the predetermined area T as the imaging area of the virtual camera IC. As illustrated in FIG. 11, when it is assumed that a diagonal angle of the predetermined area T specified by the angle of view α of the virtual camera IC is a, the center point CP (x, y) provides the parameters (x, y) of the predetermined-area information. The predetermined-area image Q is an image of the predetermined area T in the spherical image CE, and "f" denotes the distance between the virtual camera IC and the center point CP (x, y). "L" is a distance between the center point CP (x, y) and a given vertex of the predetermined area T (2L is a diagonal line). In FIG. 11, a trigonometric function formula generally expressed by the following formula 1 is satisfied.

$$\frac{L}{f} = \tan\left(\frac{\alpha}{2}\right):$$ Formula 1

The image capturing device 10 described above is an example of an image capturing device that can obtain a wide-angle view image. In this disclosure, the spherical image is an example of a wide-angle view image. Here, the wide-angle view image is generally an image taken with a wide-angle lens, such as a lens that can capture a range wider than a range that the human eye can perceive.

Figure 12:
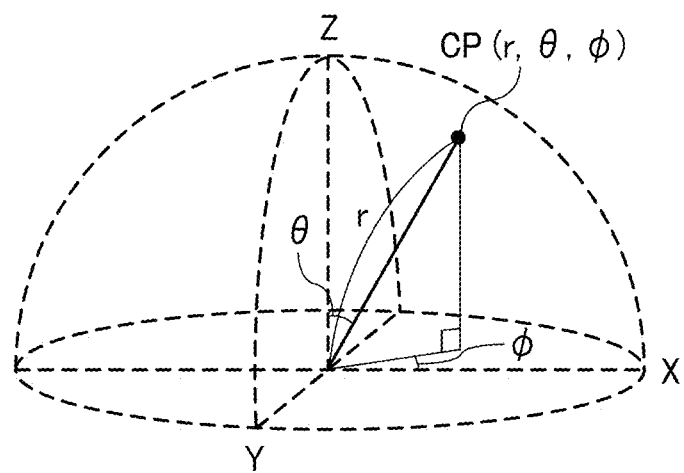
FIG. 12 is a view illustrating points in a three-dimensional Euclidean space defined in spherical coordinates, according to the exemplary embodiment of the disclosure.

FIG. 12 is a view illustrating the relation illustrated in FIG. 11 by points in a three-dimensional Euclidean space defined in spherical coordinates, according to embodiments; A positional coordinate (r, θ, φ) is given when the center point CP illustrated in FIG. 11 is represented by a spherical polar coordinate system. The positional coordinate (r, θ, φ) represents a radius vector, a polar angle, and an azimuth angle. The radius vector r is a distance from the origin of the three-dimensional virtual space including the spherical image to the center point CP. Accordingly, the radius vector r is equal to the distance "f" illustrated in FIG. 11. FIG. 12 illustrates the relation. In the following description of the embodiment, the positional coordinate (r, θ, φ) of the virtual camera IC is used as an example of viewpoint information. The viewpoint information may be parameter information that can specify the predetermined area T (predetermined-area image Q) displayed as an image of the imaging area of the virtual camera IC on the predetermined display illustrated in FIG. 10B and FIG. 10D as described above, and includes the coordinates of the diagonal vertices of the predetermined area T. In addition, the information indicating the angle of view α of the virtual camera IC and the information indicating the center point CP (x, y) described in FIG. 11 may be the viewpoint information. In addition, the information indicating the angle of view α of the virtual camera TC and the information indicating the azimuth angle as described in FIG. 11 may be the viewpoint information. The viewpoint information includes not only positional coordinate information based on spherical coordinates but also positional coordinate information based on orthogonal coordinates, a difference value of coordinates from initially set (default) predetermined-area information, for example. As illustrated in FIG. 11, the view-point information may be information other than the coordinate information such as an angle and a distance. Although the center point of the predetermined area T is used as a reference in FIGS. 11 and 12, the predetermined area T may be specified by parameter information using any one of the vertexes of the predetermined area T as a reference. Although the viewpoint information is described above by taking the case where the wide-angle view image is the spherical image as an example. However, in a case of another type of wide-angle view image, information specifying the predetermined area T in the wide-angle view image is viewpoint information.

In addition, the viewpoint information may include parameter information such as a height and a width of the predetermined area T and parameter information such as an enlargement ratio by zooming of the virtual camera IC. In addition, when the position of each pixel of the equirectangular projection image EC as illustrated in FIG. 7C is associated with the coordinates of the surface of the sphere (for example, coordinates with two axes of latitude and longitude), parameter information such as the direction and the angle of view of the virtual camera IC may be used as the viewpoint information, or information such as latitude and longitude may be included in the viewpoint information. As described above, the viewpoint information is not necessarily limited to information indicating a point.

Functions

Figure 13:
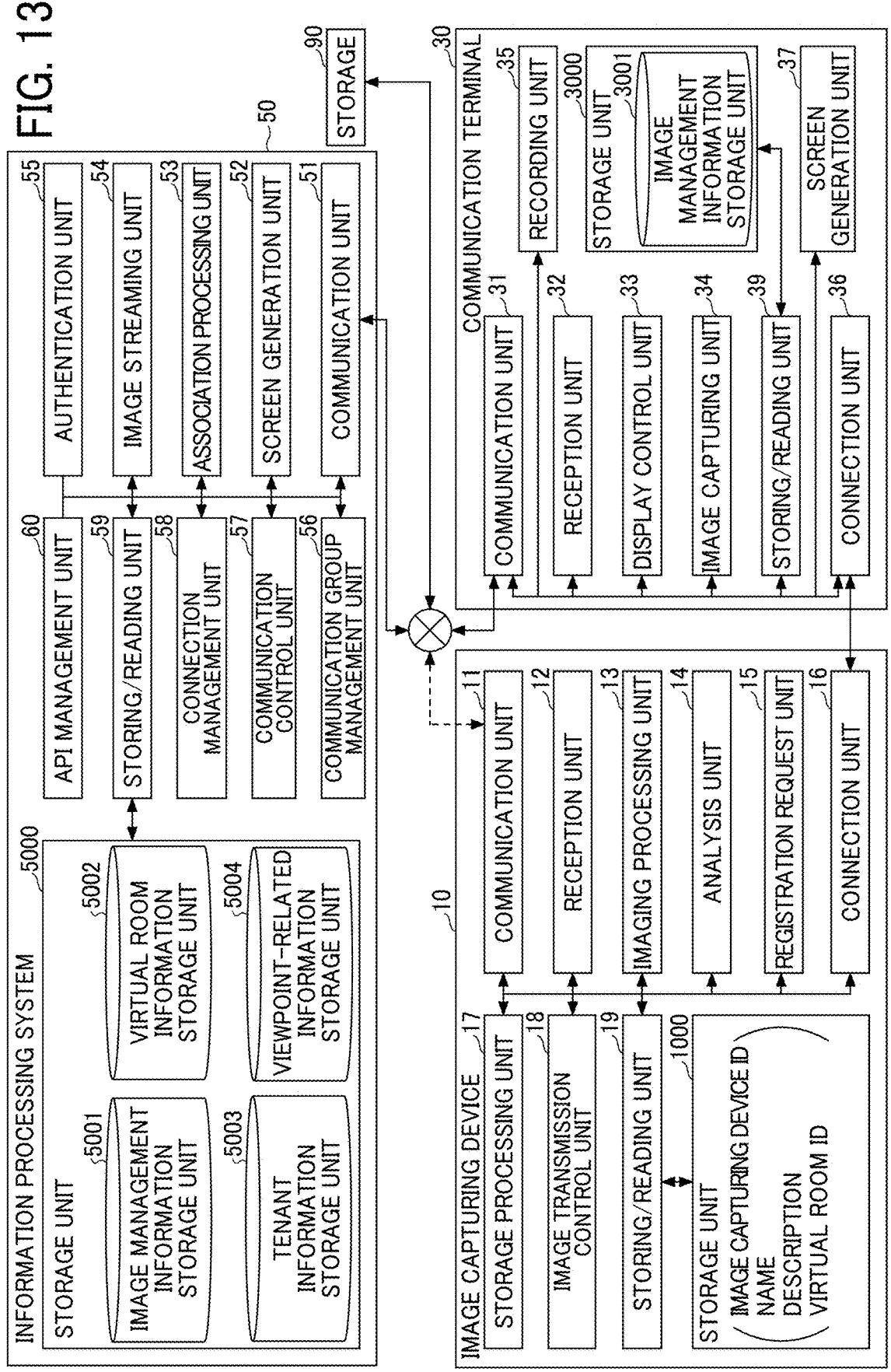
FIG. 13 is a block diagram illustrating an example of a functional configuration of the communication system according to the exemplary embodiment of the disclosure.

A functional configuration of the communication system 1a according to the present embodiment is described with reference to FIG. 13. FIG. 13 is a block diagram illustrating an example of the functional configuration of the communication system 1a according to the present embodiment.

FIG. 13 illustrates a terminal, an apparatus, and a server that relate to processes or operations described below among the terminals, apparatuses, and servers illustrated in FIG. 1.

Functional Configuration of Image Capturing Device

Referring to FIG. 13, a functional configuration of the image capturing device 10 is described according to the present embodiment. The image capturing device 10 includes a communication unit 11, a reception unit 12, an imaging processing unit 13, an analysis unit 14, a registration request unit 15, a connection unit 16, a storage processing unit 17, an image transmission control unit 18, and a storing/reading unit 19. Each of the above-mentioned units is a function that is implemented by or that is caused to function by operating any of the elements illustrated in FIG. 3 according to an instruction from the CPU 111 according to a program loaded to the SRAM 113 or the DRAM 114. The image capturing device 10 also includes a storage unit 1000 implemented by, for example, the ROM 112 illustrated in FIG. 3.

The communication unit 11 is implemented by processing of the CPU 111 with respect to the short-range communication circuit 117. The communication unit 11 is a function of connecting to the communication network N using wireless communication method such as Wi-Fi and transmitting and receiving various data or information to and from other devices. In the present embodiment, a mode in which the connection unit 16 transmits the wide-angle view image acquired by the imaging processing unit 13 to the information processing system 50 is described. However, the communication unit 11 may transmit the wide-angle view image to the information processing system 50.

The reception unit 12 is implemented by processing of the CPU 111 with respect to the operation unit 115, and has a function of receiving a user input operation performed by a user with the image capturing device 10. The reception unit 12 receives ON/OFF of a power supply, ON/OFF of a shutter button (start or stop of transmission of a wide-angle view image), a user input operation performed to a touch panel, a button, and the like.

The imaging processing unit 13 is implemented by processing of the CPU 111 with respect to the image processor 104, and captures an image of, for example, a subject or a landscape to acquire (generate) a captured image. The captured image acquired by the imaging processing unit 13 may be a moving image or a still image (may be both a moving image and a still image), or may include audio together with an image. The imaging processing unit 13 images, for example, a two-dimensional code (see FIG. 20B) displayed on the display 306 of the communication terminal 30. In addition, the imaging processing unit 13 may generate the wide-angle view image by executing the image processing described in FIG. 7 (FIGS. 7A to 7C) and 8 (FIGS. 8A and 8B) on the captured image.

The analysis unit 14 is implemented by processing of the CPU 111, and analyzes the two-dimensional code captured and acquired by the imaging processing unit 13 to extract information (a URL for registering the image capturing device for a tenant, a temporary identifier (ID), and a password) included in the two-dimensional code.

The registration request unit 15 is implemented by processing of the CPU 111, and transmits a request for registering the image capturing device 10 for a tenant in the information processing system 50 to the information processing system 50 via the communication unit 11, using the information included in the two-dimensional code read by the analysis unit 14.

The connection unit 16 is implemented by processing of the CPU 111 with respect to the input/output IF 116, and has a function of receiving power supply from the communication terminals 30A and performing data communication.

The storage processing unit 17 is implemented by processing of the CPU 111, and performs processing for storing a wide-angle view image captured in response to an image capturing request from a site in a URL (for example, the storage 90) notified from the information processing system 50.

The image transmission control unit 18 is implemented by processing of the CPU 111, and controls the transmission of the wide-angle view image to the information processing system 50. For example, the image transmission control unit 18 transmits the captured image acquired by the imaging processing unit 13 to the information processing system 50 periodically in the case of a still image, or at a predetermined frame per second (FPS) in the case of a moving image in response to a user operation. The image transmission control unit 18 also switches between the communication unit 11 and the connection unit 16.

The storing/reading unit 19 is implemented by processing of the CPU 111, and stores various types of information in the storage unit 1000 or reads various types of information from the storage unit 1000. The storage unit 1000 stores captured image data acquired by the imaging processing unit 13 and an image capturing device ID, for example. The captured image data stored in the storage unit 1000 may be deleted when a predetermined time has elapsed since the captured image data is acquired by the imaging processing unit 13, or the data transmitted to the information processing system 50 may be deleted.

On the image capturing device 10, an application (also referred to as a plug-in) for supporting the communication system 1a is installed. The application is used when the image capturing device 10 is associated with a virtual room or for receiving a control operation from the outside. A part of the functions illustrated in FIG. 13 (for example, the registration request unit 15) is implemented by using the application. The application for supporting the communication system 1a may be placed on the communication network N, and the substantially same function may be implemented by accessing the application using a web browser included in the image capturing device 10.

Functional Configuration of Communication Terminal

A functional configuration of the communication terminal 30 is described with reference to FIG. 13. The communication terminal 30 includes a communication unit 31, a reception unit 32, a display control unit 33, an image capturing unit 34, a recording unit 35, a storing/reading unit 39, a connection unit 36, and a screen generation unit 37. Each of the above-mentioned units is a function that is implemented by or that is caused to function by operating any of the elements illustrated in FIG. 4 according to an instruction from the CPU 301 according to a program, which may be a web browser or a dedicated application, loaded to the RAM 303. The communication terminal 30 further includes a storage unit 3000 implemented by the ROM 302 or the storage medium 315 illustrated in FIG. 4.

The communication unit 31 is implemented by processing of the CPU 301 with respect to the network I/F 309, and has a function of connecting to the communication network N and transmitting and receiving various types of information to and from other devices.

The reception unit 32 is implemented by processing of the CPU 301 with respect to the keyboard 311 and the pointing device 312, and has a function of receiving various types of selection or input operations performed with the communication terminal 30. The display control unit 33 has a function of causing the display 306 of the communication terminal 30 to display a wide-angle view image, a standard-angle view image, and various screens. The communication terminal 30 may include a touch panel or an interface for gesture or audio input, and in such a case, various selections or input operations may be received by touch input, gesture input, or voice input.

The display control unit 33 is implemented by processing of the CPU 301, and causes the display 306 to display the two-dimensional code transmitted from the information processing system 50, for example. The two-dimensional code is, for example, a QR CODE®, DataMatrix (DataCode), MaxiCode, or Portable Data File 417 (PDF417). The two-dimensional code may be a bar code.

The image capturing unit 34 is implemented by processing of the CPU 301 with respect to the camera 321, and captures an image of a subject and surroundings.

The recording unit 35 is implemented by processing of the CPU 301, records wide-angle view image data related to a moving image streamed from the information processing system 50 after the communication unit 31 receives the wide-angle view image data representing the moving image streamed, and stores the recorded data in the storage unit 3000 via the storing/reading unit 39.

The connection unit 36 is implemented by processing of the CPU 301 with respect to the short-range communication circuit 320, and has a function of supplying power to the image capturing device 10 and performing data communication.

The screen generation unit 37 is implemented by processing of the CPU 301 with a viewer application ("viewer app"), and generates (creates) a thumbnail image of the predetermined-area image indicated by the viewpoint information. Note that the viewer app does not necessarily have to be installed in advance, and the communication terminal may have a function equivalent to the screen generation unit 37 in advance, or the communication terminal may execute the function of the screen generation unit 37 by receiving a program having a function equivalent to the viewer app having the function of the screen generation unit 37 from the information processing system or another server when entering the virtual room. Further, the viewer app of the communication terminal may be implemented by a web browser.

The storing/reading unit 39 is implemented by processing of the CPU 301, and stores various types of information in the storage unit 3000 or reads various types of information from the storage unit 3000. An image management information storage unit 3001 is included in the storage unit 3000. The image management information storage unit 3001 is described later with the description of the information processing system 50.

Functional Configuration of Information Processing System

A functional configuration of the information processing system 50 is described below. The information processing system 50 includes a communication unit 51, a screen generation unit 52, an association processing unit 53, an image streaming unit 54, an authentication unit 55, a communication group management unit 56, a communication control unit 57, a connection management unit 58, a storing/reading unit 59, and an API management unit 60. Each of the above-mentioned units is a function that is implemented by or that is caused to function by operating any of the elements illustrated in FIG. 4 according to an instruction from the CPU 501 according to a program loaded to the RAM 503. The information processing system further includes a storage unit 5000 implemented by the ROM 502, the HDD 504, or the recording medium 515 illustrated in FIG. 4.

The communication unit 51 is implemented by processing of the CPU 501 with respect to the network I/F 509, and has a function of connecting to the communication network N and transmitting and receiving various types of information to and from other devices.

The screen generation unit 52 is implemented by processing of the CPU 501, and generates screen information to be displayed by the communication terminal 30. When the communication terminal 30 executes a web application, the screen information is created by. HyperText Markup Language (HTML), eXtensible Markup Language (XML), Cascade Style Sheet (CSS), JAVASCRIPT (registered trademark). When the communication terminal 30 executes a native application, the screen information is held by the communication terminal 30, and information to be displayed is transmitted in XML. The screen generation unit 52 generates screen information in which the wide-angle view image streamed by the image streaming unit 54 via the communication unit 51 is arranged.

The association processing unit 53 is implemented by processing of the CPU 501, and performs control related to association and sharing of viewpoint information of a wide-angle view image. When receiving viewpoint information and an image capturing request from the communication terminal 30, the association processing unit 53 performs processing of associating the viewpoint information with a wide-angle view image acquired by requesting the image capturing device 10 to perform image capturing. Further, the storing/reading unit 59 stores the wide-angle view image and the viewpoint information, which are associated with each other, in an image management information storage unit 5001. In addition, the association processing unit 53 transmits storage location information (for example, a URL) to the communication terminal 30 as information indicating a storage location where the wide-angle view image and the viewpoint information, which are associated with each other, are stored. The information processing system 50 does not need to receive the viewpoint information and the image capturing request from the communication terminal 30 at the same time, and may perform processing of associating the viewpoint information and the image capturing request after receiving the viewpoint information and the image capturing request separately. The URL is an example of the storage location information indicating the storage location, and another format such as a Uniform Resource Identifier (URI) may be used.

The image streaming unit 54 is implemented by processing of the CPU 501, and streams to the communication terminals 30 operated by the users who are in the virtual room, an image such as a wide-angle view image transmitted by the image capturing device 10 associated with the same virtual room via the communication unit 51. A standard-angle view image captured by a camera of the communication terminal 30 or the connected cameras 8 and 9 is also streamed in substantially the same manner. The image to be streamed includes a streaming video, a moving image, and a still image.

The authentication unit 55 is implemented by processing of the CPU 501, and is a function of performing authentication of a request source based on an authentication request received by the communication unit 51. For example, the authentication unit 55 authenticates a user based on whether authentication information (a user ID and a password) included in an authentication request received by the communication unit 51 matches authentication information held in advance. The authentication information may be a card number of an IC card, biometric authentication information such as a face, a fingerprint, or a voiceprint, a device ID, a passcode, an access token, a security key, or a ticket. The authentication unit 55 may use an external authentication system or an authentication method such as Open Authorization (OAuth) to perform authentication. The authentication unit 55 may authenticate not only a user but also a device such as an image capturing device.

The communication group management unit 56 is implemented by processing of the CPU 501, and manages entering of the communication terminals 30 and the users to a virtual room and the association of the devices, for example. When the authentication by the authentication unit 55 is successful, the communication group management unit 56 registers the user ID and the Internet protocol (IP) address of the communication terminal 30 in the virtual room information storage unit 5002 or associates the image capturing device 10 with the virtual room.

The communication control unit 57 is implemented by processing of the CPU 501, and manages start, establishment, and end of communication with the image capturing device 10 associated with each virtual room. In addition, the communication control unit 57 manages the start, establishment, and end of communication for streaming a wide-field-of-view image and audio in response to the communication terminal 30 entering or leaving the virtual room.

The connection management unit 58 is implemented by processing of the CPU 501, and manages communication (connection) established among the communication terminals 30 and the image capturing device 10 and the information processing system 50 in association with the virtual room.

The API management unit 60 is implemented by processing of the CPU 501, and manages an API used when the platform contractor provides the image streaming service of the wide-angle view image. When the API is used, the platform contractor may separately develop software for calling the API. The software to be developed may operate on a server or may operate on a client such as a communication terminal. Any function included in the information processing system 50 such as the image streaming unit 54, the association processing unit 53, and the communication control unit 57 can be provided as an API. In addition, a function added to the information processing system 50 can be provided later as an API. The communication terminal operated by the platform provider accesses the information processing system 50 and receives a disclosure setting for the API, so that the API management unit 60 can control the API based on the disclosure setting. In addition, the API management unit 60 may perform authentication processing for checking whether or not the software of the request source that requests the calling of the API is software developed by a valid platform contractor. In the authentication processing information registered and stored in advance as information on the platform contractor in the storage unit 5000 is compared with information transmitted from the software of the request source to check.

As an example of specific processing of the authentication processing, when the information processing system 50 receives the application ID issued in advance by the API management unit 60 to the software developed by the platform contractor from the software of the request source and the API management unit 60 can determine that the application ID is stored in the storage unit 5000, the API management unit 60 performs control to permit the API to be provided as valid software. On the other hand, when it is not determined that the software is valid, the API management unit 60 performs control not to permit the provision of the API.

The application ID is an example of authentication information for determining the validity, and the API management unit 60 may check the validity of the request source in advance using authentication information such as an access token, a ticket, a security key, a password, or a Personal Identification Number (PIN) code issued by the API management unit 60 of the information processing system or an external system. In the description of the present embodiment, a mode in which a function included in the information processing system 50 is used as an API is not described. The processing may be substantially the same, except that the software such as an application developed by the platform contractor uses a function included in the information processing system 50 after determination by the API management unit 60.

The storing/reading unit 59 is implemented by processing of the CPU 501, and stores various types of information in the storage unit 5000 or reads various types of information from the storage unit 5000.

Image Management Information Storage Unit 5001

The storage unit 5000 includes the image management information storage unit 5001. FIG. 14A is a conceptual diagram illustrating image management information stored in the image management information storage unit 5001 according to the present embodiment. The image management information storage unit 5001 stores the image management information as illustrated in FIG. 14A and FIG. 14B.

The image management information is information for managing a wide-angle view image captured in response to an image capturing request. When an imaging request is transmitted from the communication terminal 30 according to a user operation, one record of image management information is generated. Items of the image management information are described.

The wide-angle view image data ID is identification information for identifying data of the wide-angle view image.

The data ID is assigned by the information processing system 50. The "ID" is an abbreviation for "identifier" and indicates an identifier or identification information. The "ID" is any one of a name, a symbol, a character string, a numerical value, or a combination of at least two of these items, which is used to uniquely identifying a specific object among from a plurality of objects. In addition to the wide-angle view image, the data ID may be associated with an image captured with a normal angle of view by the image capturing device 10 associated with the virtual room.

The data name is a name of the wide-angle view image set by the user of the communication terminal 30. The data name can be set by the user or may be automatically set.

The imaging start date and time information is information for identifying an imaging start date and time for a captured image such as a wide-angle view image, such as a date and time when a user inputs an image capturing request to the communication terminal 30 or a date and time when the image capturing device 10 captures the captured image such as a wide-angle view image. The imaging start date and time information may be replaced with time stamp information for a captured image such as a wide-angle view image.

The imaging request user information is identification information (including a user. ID and a user name) for identifying a user who inputs an image capturing request to the communication terminal 30. Since the user inputs the image capturing request to the communication terminal 30 in a state of being in the virtual room, the user registered as the imaging request user information is specified by authentication with respect to the information processing system 50 or the virtual room. The imaging request user information is transmitted to the information processing system 50 together with the image capturing request. The image capturing request and the imaging request user information are not necessarily transmitted to the information processing system 50 at the same time, and may be transmitted to the information processing system 50 at different timings.

The image capturing device information is identification information (image capturing device ID) of the image capturing device 10 that has captured the wide-angle view image. The image capturing device ID is assigned by the information processing system 50 and shared with the image capturing device 10. Information unique to the image capturing device 10 such as a Media Access Control (MAC) address or a serial number may be used as the image capturing device ID. The image capturing device ID is transmitted to the information processing system 50 together with the wide-angle view image. The image capturing device ID and the wide-angle view image are not necessarily transmitted to the information processing system 50 at the same time, and may be transmitted to the information processing system 50 at different timings.

The virtual room ID at the time of image capturing is identification information for identifying a virtual room associated with the image capturing device 10.

The storage location information of the wide-angle view image data (storage location information) is information indicating a location where the wide-angle view image is stored, and is a URL, or a file path, for example. Further, the storage location identified by the storage location information may be information indicating a predetermined folder. The folder may be a folder associated with the virtual room at the time of image capturing. In addition, the folder may be associated with identification information (additional information such as a name) indicating one of or a combination of two or more of categories for sorting such as an imaging date and time, an image capturing device, an imaging request user, and a virtual room at the time of image capturing. Further, the storage location of the data may be identified by combining the storage location information for the data with information such as the data ID or the data name.

The participant ID is an example of user identification information for identifying a user who participates in the virtual room identified by the virtual room. ID at the time of image capturing.

FIG. 14B is a conceptual diagram illustrating image management information as a variation of FIG. 14A according to the present embodiment. In FIG. 14B, a wide-angle view image having the same virtual room ID at the time of image capturing is stored. As described above, the image management information may be sorted in units of virtual rooms.

Virtual Room Information Storage Unit 5002

The storage unit 5000 includes the virtual room information storage unit 5002. FIG. 15A is a conceptual diagram illustrating an example of virtual room information stored in the virtual room information storage unit 5002 according to the present embodiment. The virtual room information storage unit 5002 stores the virtual room information as illustrated in FIG. 15A. The virtual room information is information related to a virtual room, and is stored for each virtual room. Items of the virtual room information are described. In the description of the present embodiment, the virtual room is registered for a tenant. However, the virtual room is not necessarily registered for a tenant, and virtual room information that is information on a temporarily created virtual room or a virtual room that can be shared to be used is also stored in the virtual room information storage unit 5002.

The virtual room ID is identification information for identifying a virtual room. In the present embodiment, it is assumed that the user can generate a virtual room as desired.

The virtual room name is a name with which the user can identify the virtual room, and can be set by the user. The virtual room ID and the virtual room name may be the same information.

The device information is identification information (device ID) of a device including the image capturing device 10 associated with the virtual room.

The entry user is a user ID of a user who is currently in the virtual room. The user is a user who can view an image such as a wide-angle view image streamed for a person currently being in the virtual room. The entry method is described later. Further, the user ID may be associated with an Internet Protocol (IP) address of the communication terminal 30 operated by the user. The user ID may be stored in association with the user name.

Tenant Information Storage Unit 5003

The storage unit 5000 includes a tenant information storage unit 5003. FIG. 15B is a conceptual diagram illustrating tenant information stored in the tenant information storage unit 5003 according to the present embodiment. The tenant information storage unit 5003 stores the tenant information as illustrated in FIG. 15B. The tenant information is information related to a tenant (user group) and is stored for each tenant. Items of the tenant information are described. Various pieces of information such as user information other than the information illustrated in the drawing are registered in the tenant information, and FIG. 15B is a part of the information.

The tenant ID is identification information for identifying a tenant.

The tenant name is a name with which the user identifies a tenant. The tenant ID and the tenant name may be the same information.

The tenant registration virtual room ID is identification information of a virtual room registered for the tenant.

The tenant registration device is information related to a device registered for the tenant.

The tenant information storage unit; the tenant ID, the tenant name, the tenant registration virtual room ID, and the tenant registration device may be referred to as a user group information storage unit, a user group ID, a user group name, a user group registration virtual room ID, and a user group registration device, respectively.

Viewpoint-Related Information Storage Unit 5004

The storage unit 5000 includes a viewpoint-related information storage unit 5004. FIG. 16 is a conceptual diagram illustrating viewpoint-related information stored in the viewpoint-related information storage unit 5004 according to the present embodiment. As a record of viewpoint-related information, a wide-angle view image data ID, a participant ID, a viewing start date and time information, and a storage location information of the viewpoint information are associated with each other. The definitions the items of wide-angle view image data ID and participant ID are the same as the items having the same names in the image management information illustrated in FIGS. 14A and 14B.

The viewing start date and time information indicates a date and time at which viewing of a new predetermined-area image is started by changing from a default (initially set) predetermined-area image, which is in the wide-angle view image being streamed at the time of recording, viewed at each site. In alternative to the viewing start date and time, information indicating a playback elapsed time in one moving image may be used.

The storage location information of viewpoint information is information indicating a location where the viewpoint information for specifying a predetermined area viewed on the date and time indicated by the viewing start date and time information of the same record is stored, and is a URL or a file path, for example.

With the viewpoint-related information illustrated in FIG. 16, of which site and from when the communication terminal 30 (user) has changed the display from the predetermined wide-angle view image to a desired predetermined-area image to be viewed can be recorded.

Entry of Communication Terminal into Virtual Room

Figure 17A:
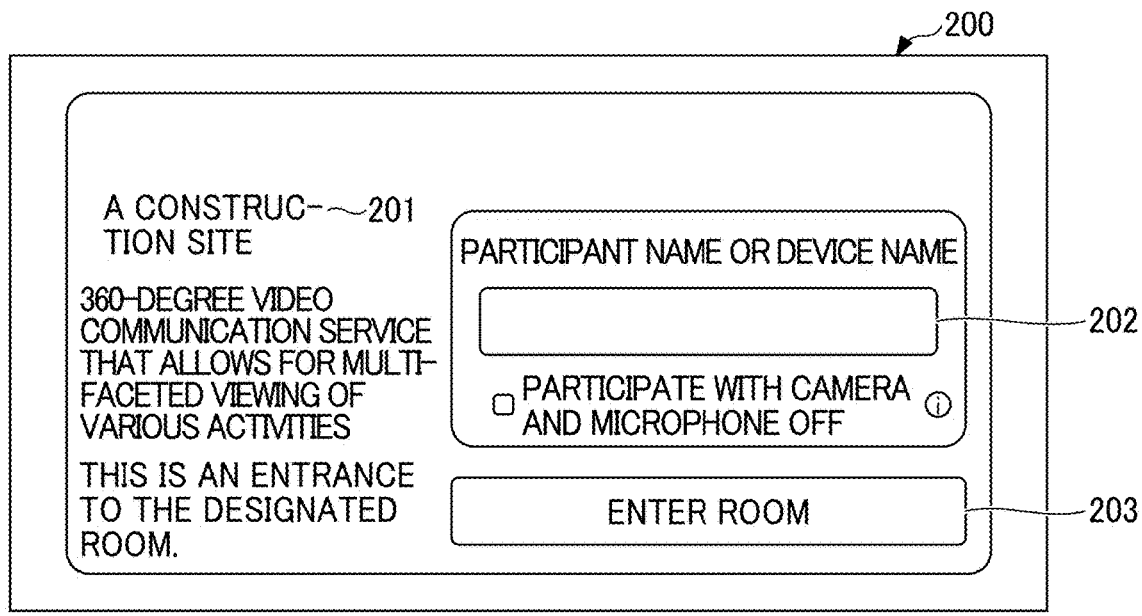
FIG. 17A is a diagram illustrating an example of an entering-room screen, which is a screen for entering a virtual room, according to the exemplary embodiment of the disclosure.
Figure 17B:
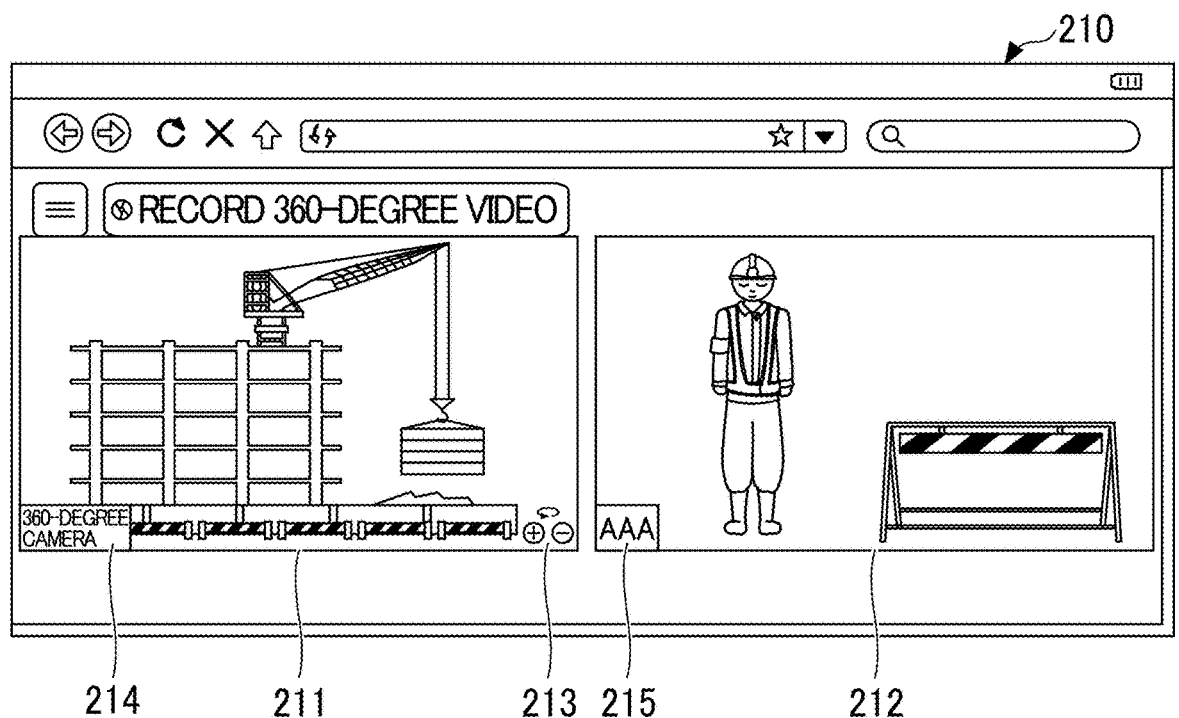
FIG. 17B is a diagram illustrating an example of an image viewing screen displayed by a communication terminal in response to a user operation of entering the virtual room, according to the exemplary embodiment of the disclosure.
Figure 18:
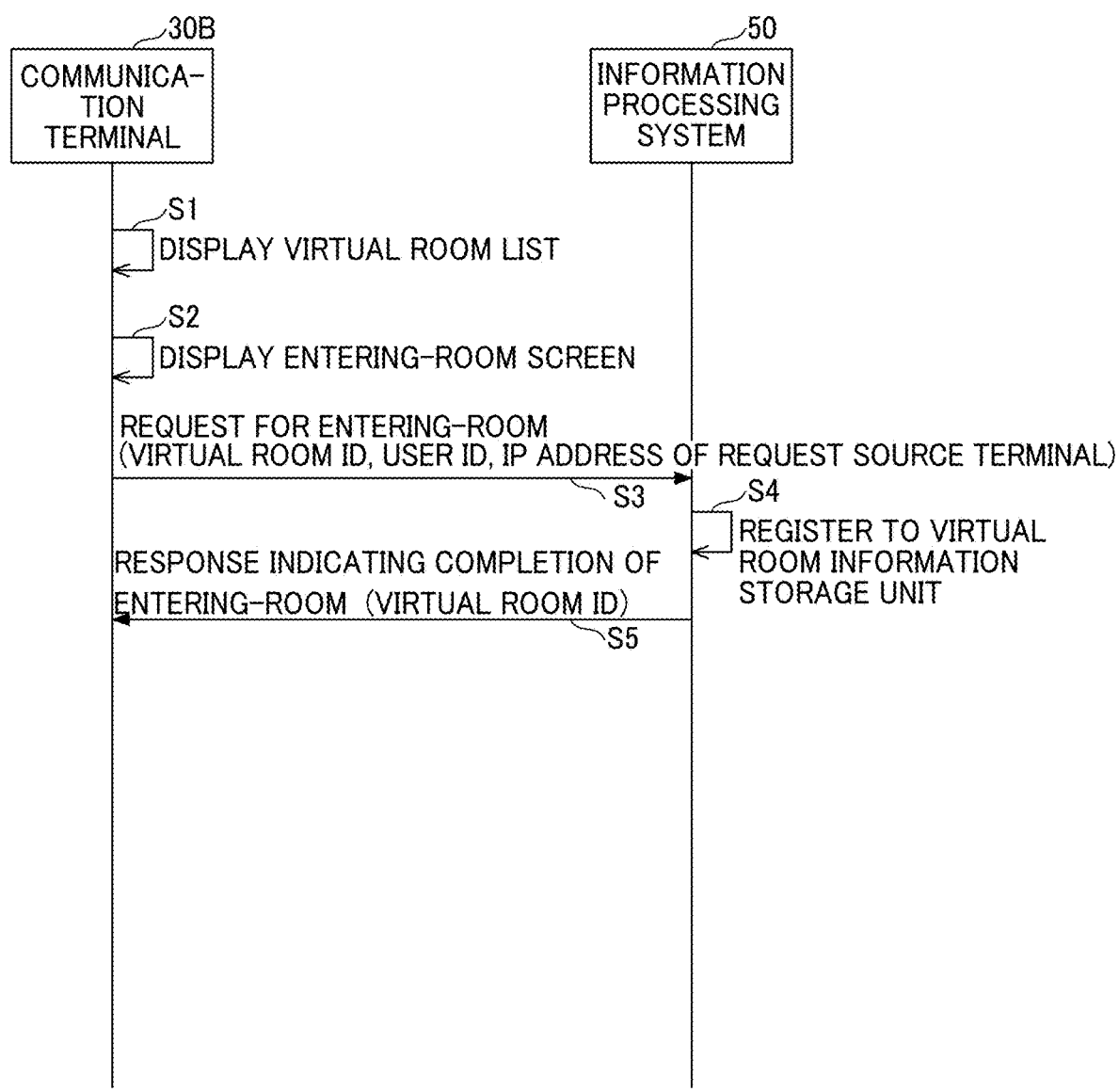
FIG. 18 is a sequence diagram illustrating an example of a process for entering the virtual room according to a user operation performed with the communication terminal according to the exemplary embodiment of the disclosure.

Referring to FIGS. 17A and 17B and FIG. 18, a process in which the user b enters a virtual room is described. It is assumed that the image capturing device 10 is already associated with the virtual room and the communication terminal 30A has transmitted a wide-angle view image and a standard-angle view image to the information processing system 50. Association of the image capturing device 10 with the virtual room is described with reference to FIG. 19 and drawings subsequent to FIG. 19. In the following description, the entry of the user b into the virtual room and the entry of the communication terminal 30B operated by the user b into the virtual room are not particularly distinguished from each other.

FIGS. 17A and 17B are diagrams each illustrating an example of a screen displayed by the communication terminal 30B when the user b enters the virtual room. FIG. 17A is a diagram illustrating an example of an entering-room screen 200, which is a screen for entering a virtual room. The user b has already logged in to the information processing system 50 prior to the display of the entering-room screen 200. By logging in, a tenant to which the user b belongs is identified. The virtual room is associated with the tenant. A list of virtual rooms associated with the tenant is displayed on the communication terminal 30B (see FIG. 22) according to a user operation of the user b, and a virtual room is selected according to a user operation of the user b from the list to enter the virtual room. The entering-room screen 200 of FIG. 17A is for the virtual room selected by the user b as described above. A temporarily created virtual room that is not associated with the tenant or a shared virtual room may be displayed on the screen of FIG. 17A.

Alternatively, the creator of the virtual room may request the information processing system 50 to issue a URL corresponding to the virtual room, and transmit the URL to the user b by mail. When the user b presses the URL displayed on the communication terminal 30B, the communication terminal 30B displays the entering-room screen 200 illustrated in FIG. 17A.

The entering-room screen 200 includes a virtual room name 201, a participant name input field 202, and an entry button 203. The value of the virtual room name 201 is the same as that stored in the virtual room information storage unit 5002. The participant name input field 202 is a field for inputting a user name to be displayed in the virtual room, and may be an appellation of the user b such as a nickname. When the user b logs in, the user name associated with the user ID of the user b may be specified, and the specified user name may be automatically displayed. The entry button 203 is a button for requesting to enter the virtual room according to a user operation of the user b in the example.

At the time of entering the virtual room, authentication for entering the virtual room may be requested separately from login to the tenant.

FIG. 17B illustrates an image viewing screen 210 displayed by the communication terminal 30B when the user b enters the virtual room. In the image viewing screen 210 illustrated in FIG. 17B, the image capturing device 10 has already started streaming of a wide-angle view image via the information processing system 50, and the communication terminal 30A has already started streaming of a standard-angle view image. Accordingly, the image viewing screen 210 has a first image section 211 and a second image section 212. The wide-angle view image is displayed in the first image section 211, and the standard-angle view image is displayed in the second image section 212. When there are three or more sites from which images are transmitted, the image viewing screen 210 is divided in accordance with the number of sites of transmission sources.

A wide-angle view image mark 213 is displayed in the first image section 211. The screen generation unit 52 of the information processing system 50 determines that the image to be displayed in the first image section 211 is a wide-angle view image and sets the wide-angle view image mark 213. The communication terminal 30B may determine and display the image. By viewing the wide-angle view image mark 213, the user b can know that the wide-angle view image of which the viewpoint can be changed is streamed. In the first image section 211, a device name 214 (transmitted from the image capturing device 10 together with the wide-angle view image) is displayed. The device name 214 is information set by the user a as described later (see FIGS. 20A and 20B).

A participant name 215 is displayed in the second image section 212. The participant name 215 is a user name, and a participant name of a user who has already entered the virtual room, namely the participant name that input to the participant name input field 202 is displayed. In the example, since the user a has already entered the virtual room, "AAA" input to the participant name input field 202 by the user a is displayed.

FIG. 18 is a sequence diagram illustrating an example of a process for entering of the user b (or the communication terminal 30B) to the virtual room.

S1: The user b at the site B performs an operation for displaying a virtual room list screen, which is a screen for displaying a list of virtual rooms. The screen may be referred to as a list screen. The communication terminal 30B accesses the information processing system 50 in advance in response to a user operation of the user b, and receives, from the information processing system 50, the virtual room information stored in the virtual room information storage unit 5002 for displaying the virtual room list screen. At this time, the communication terminal 30B may be authenticated by the authentication unit 55 of the information processing system 50 by transmitting authentication information used for login to the information processing system 50. The authentication information may be authentication information associated with the user b or authentication information associated with the communication terminal 30B. In such a case, the virtual room displayed on the list screen may be a virtual room registered for the tenant associated with the user b or a virtual room registered for the tenant associated with the communication terminal 30B. When the reception unit 32 receives the operation for displaying the list screen, the display control unit 33 of the communication terminal 30B displays a selection screen on the display 306.

S2: When the user b selects a virtual room selection button, the reception unit 32 of the communication terminal 30B receives the selection of the virtual room. The display control unit 33 of the communication terminal 30B displays the entering-room screen 200 illustrated in FIG. 17A on the display 306.

S3: The user b inputs items for entering the virtual room and presses the entry button 203. When the reception unit 32 receives the operation of pressing, the communication unit 31 of the communication terminal 30B transmits a request for entering-room, which is a request for entering the virtual room, to the information processing system 50. The request for entering-room includes information such as the virtual room ID indicating the virtual room selected in Step S2, the user ID of the user b authenticated by login, and the IP address of the communication terminals 30B, which is a request source terminal. Accordingly, the communication unit 51 of the information processing system 50 receives the request for entering-room.

S4: The communication group management unit 56 registers the user ID and the IP address authenticated by login in the virtual room information identified by the virtual room ID in the virtual room information storage unit 5002.

S5: Then, the communication unit 51 of the information processing system 50 transmits, to the communication terminal 30B, a response indicating that entering the virtual room has been successfully performed. Accordingly, the communication unit 31 of the communication terminal 30B receives the response indicating that entering the virtual room has been successfully performed. Subsequent to Step S5, the display control unit 33 of the communication terminal 30B receives the screen information generated by the screen generation unit 52 of the information processing system 50 and the information on the image streamed by the image streaming unit 54 of the information processing system 50, and displays the image viewing screen 210 illustrated in FIG. 17B based on the received information.

Associating Image Capturing Device with Room

Associating the image capturing device 10 with a virtual room is described with reference to FIGS. 19 to 26. In the following description of the present embodiment, associating the image capturing device 10 with a virtual room is described as being performed by the user a at the site A, however, this is just an example, and in alternative to a user, a system administrator or a tenant administrator may perform associating the image capturing device 10 with a virtual room, for example.

Figure 19:
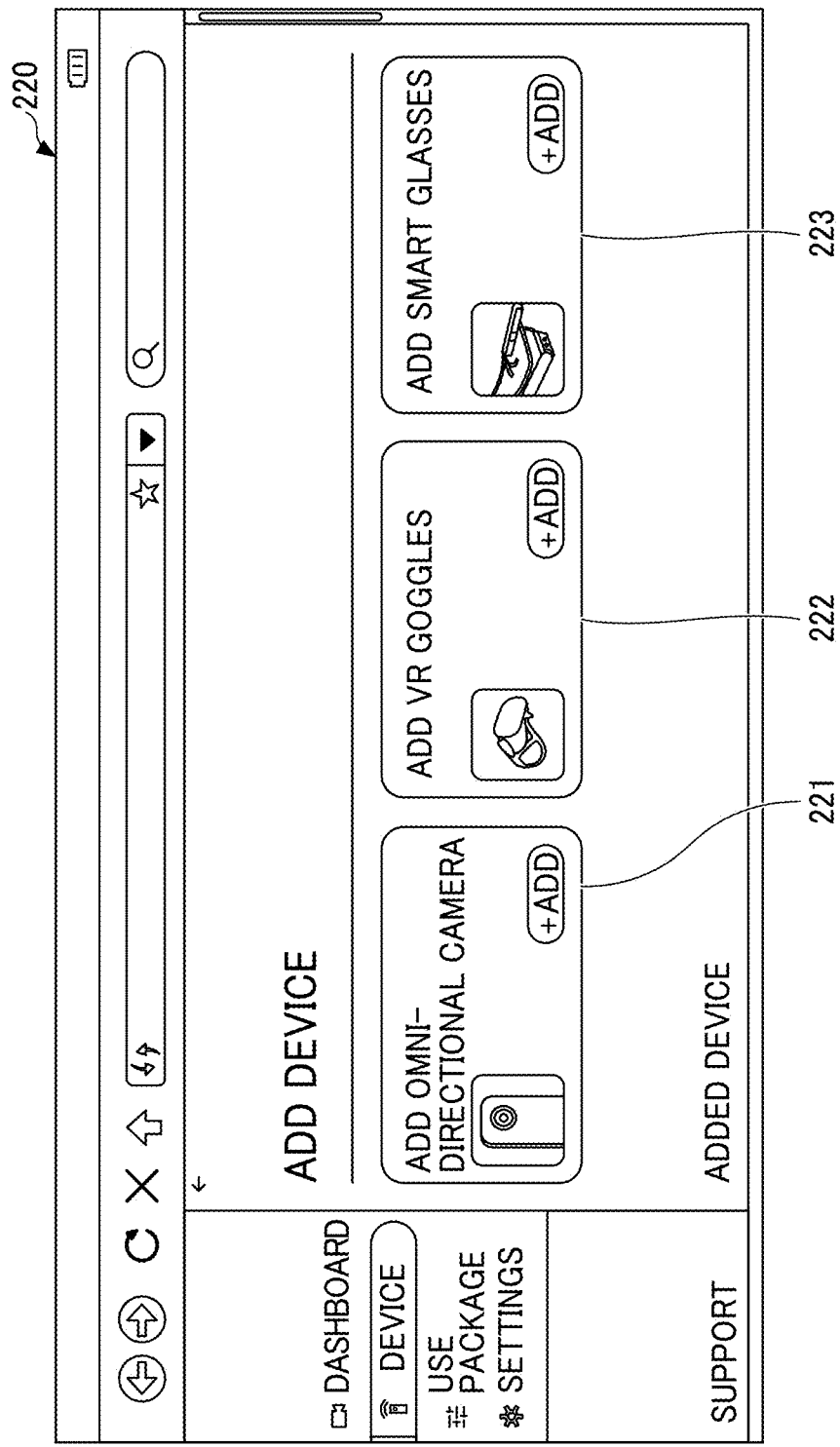
FIG. 19 is a diagram illustrating an example of a device registration screen displayed by the communication terminal according to the exemplary embodiment of the disclosure.

FIG. 19 is a diagram illustrating an example of a device registration screen 220 displayed by the communication terminal 30A. The user a has been authenticated by logging into the information processing system 50. By logging in, the tenant to which the user a belongs is identified. The user a requests the information processing system 50 to display the device registration screen 220, and the communication terminal 30A displays the device registration screen 220 received from the information processing system 50. On the device registration screen 220, first, a device is registered for the tenant.

The device registration screen 220 includes an image capturing device registration button 221, a VR goggles registration button 222, and a smart glasses registration button 223. A button is prepared for each type of device because there is a difference in the presence or absence of a camera or information used for registration, for example.

Since the device is registered for each type of device, the information processing system 50 can also grasp the type of device.

The image capturing device registration button 221 is a button for the user, in the example, the user a, to register the image capturing device 10, the VR goggle registration button 222 is a button for registering the VR goggles 89, and the smart glass registration button 223 is a button for registering the smart glasses 88.

Figure 20A:
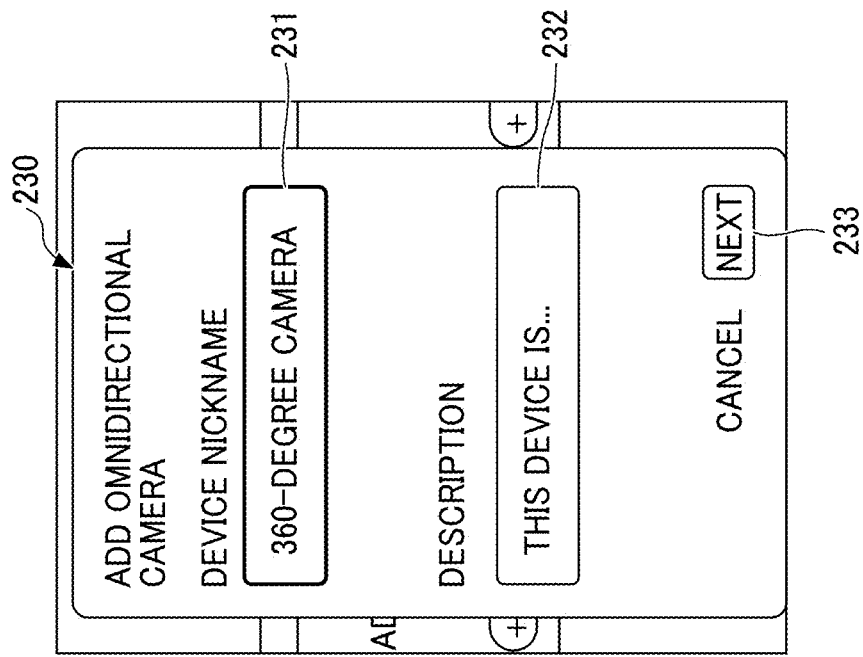
FIG. 20A is a diagram illustrating an example of an image capturing device registration dialog, according to the exemplary embodiment of the disclosure.
Figure 20B:
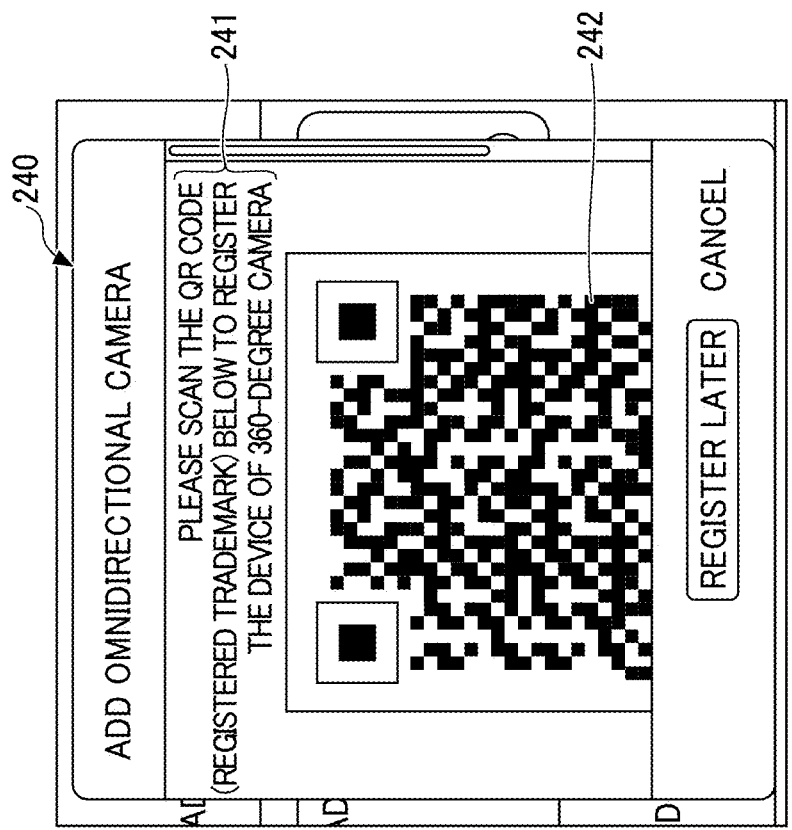
FIG. 20B is a diagram illustrating an example of a two-dimensional code, according to the exemplary embodiment of the disclosure.

FIGS. 20A and 20B are diagrams each illustrating an example of a screen displayed when the image capturing device registration button 221 is pressed. FIG. 20A is a diagram illustrating an example of an image capturing device registration dialog 230. The image capturing device registration dialog 230 includes a name field 231 of the image capturing device 10, a description field 232, and a next button 233. The user a sets a name in the name field 231 of the image capturing device 10 and sets a description in the description field 232 so that the image capturing device 10 to be registered is recognizable.

When the user a presses the next button 233, the communication terminal 30A requests a two-dimensional code to the information processing system 50, and the communication terminal 30A displays the two-dimensional code.

FIG. 20B is a diagram illustrating an example of a two-dimensional code screen 240 displayed by the communication terminal 30A. The two-dimensional code screen 240 illustrated in FIG. 20B is displayed in response to a user operation of pressing the next button 233 of FIG. 20A. The two-dimensional code screen 240 includes a message 241 indicating, for example, "Please scan the following two-dimensional code in order to register a device named XX (name input in the name field)." and a two-dimensional code 242. An image of the two-dimensional code 242 is captured with the image capturing device 10 to be registered, by an operation of the user a. The two-dimensional code 242 includes authentication information used for registration, such as a URL to which the image capturing device 10 connects for registration of the image capturing device 10, a temporary ID, and a password.

When the image of the two-dimensional code 242 is captured with the image capturing device 10 by the operation performed by the user a, the image capturing device 10 connects to the URL and is authenticated by the temporary ID and the password. When the authentication is successful, an official image capturing device ID is provided for replacement, and the name, the description, and the image capturing device ID of the image capturing device 10 are registered for the tenant. The image capturing device 10 also holds the image capturing device ID, the name, and the description. The image capturing device 10 registered to the tenant is associated with a virtual room in accordance with an operation of the user a, and this is described later. The two-dimensional code 242 is an example of code information. Alternatively, a code in another form, such as a barcode, may be used as long as being embedded with the same or similar information.

Figure 21:
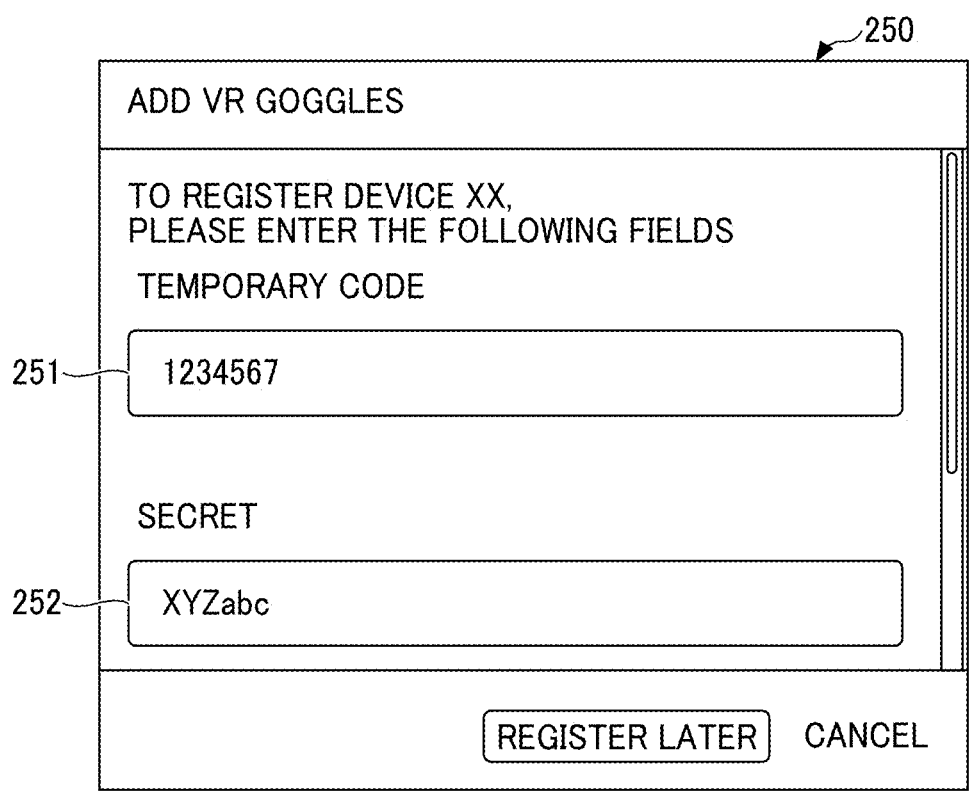
FIG. 21 is a diagram illustrating an example of a virtual reality (VR) goggle registration screen displayed when a VR goggle registration button is pressed, according to the exemplary embodiment of the disclosure.

An example of a method of registering a communication terminal such as the VR goggles 89 or the smart glasses 88 for the tenant is described with reference to FIG. 21. FIG. 21 is a diagram illustrating an example of a VR goggle registration screen 250 displayed when the VR goggle registration button 222 is pressed. The VR goggle registration screen 250 includes a temporary code input field 251 and a secret input field 252.

When the VR goggles 89 do not have a camera, the two-dimensional code is failed to be imaged. Accordingly, the user a may cause the VR goggles 89 to output (display) a temporary code (temporary ID) and a secret (password), and input the temporary code and the secret in the temporary code input field 251 and the secret input field 252. The communication terminal 30A transmits the temporary code and the secret to the information processing system 50 to register the VR goggles 89 for the tenant. The VR goggles 89 are connected to the information processing system 50 and are authenticated by transmitting the temporary code and the secret.

In response to successful authentication, an official VR goggle ID is provided for replacement, and the VR goggle ID is registered for the tenant. The VR goggles 89 also hold the VR goggle ID. The VR goggles 89 registered for the tenant are associated with a virtual room in accordance with an operation of the user a, which is described later.

The smart glasses 88 can be registered in substantially the same manner as the image capturing device 10 or the VR goggles 89, details of the smart glasses 88 are described later. The temporary code and the secret are examples of the authentication information, and other information may be used as the authentication information. The image capturing device ID, the VR goggles ID, and the smart glasses ID are each an example of the device ID, and thus can be referred to as the device ID. Accordingly, when a device other than the image capturing device 10, the VR goggles, and the smart glasses is registered, the device ID can be used for associating with the virtual room or the tenant in the substantially same manner as described above. The device ID may be identification information associated with the owner of the device.

Figure 22:
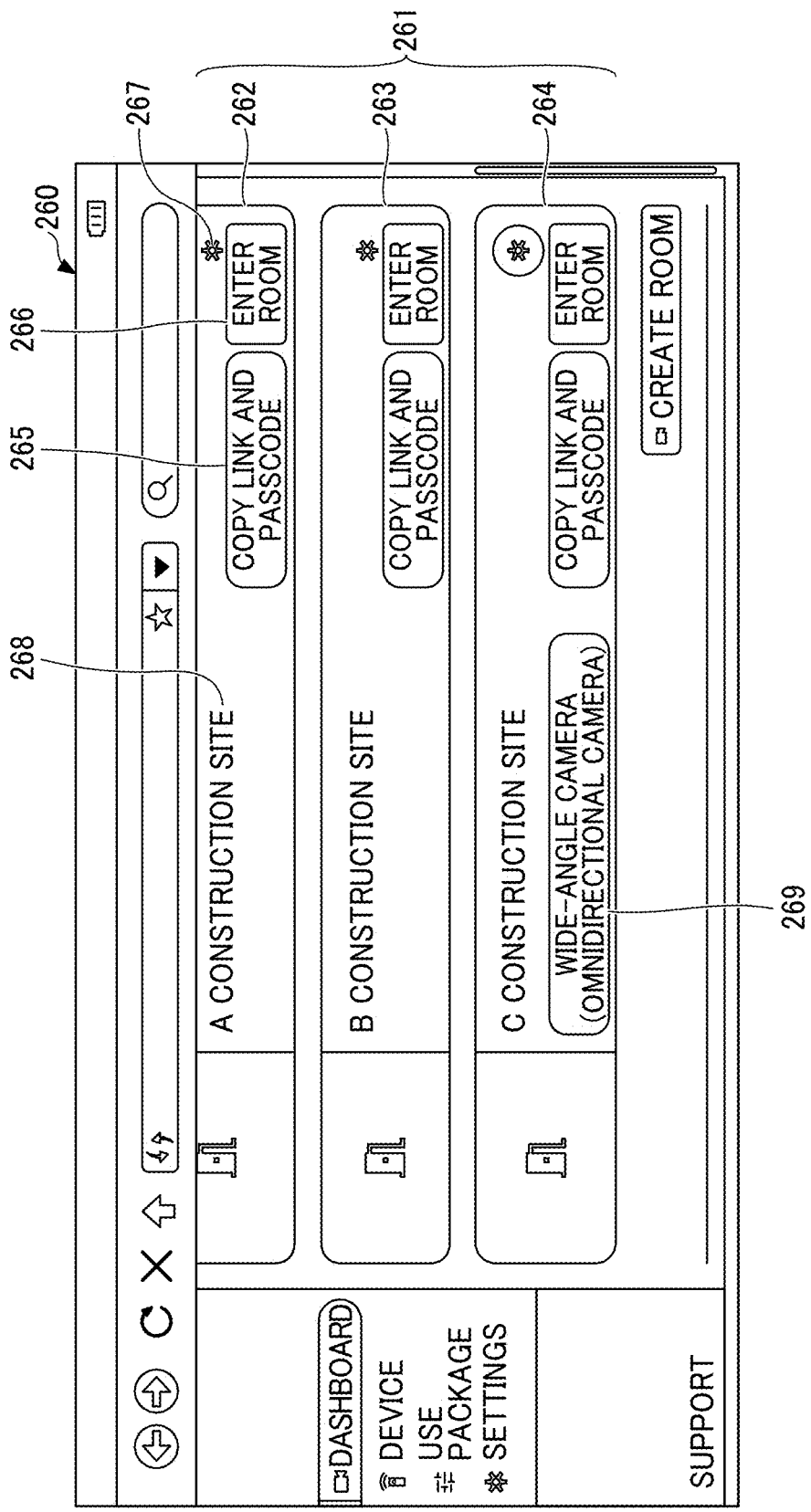
FIG. 22 is a diagram illustrating an example of a first virtual room association screen for associating the image capturing device with a virtual room, according to the exemplary embodiment of the disclosure.

FIG. 22 is a diagram illustrating an example of a first virtual room association screen 260 for associating the image capturing device 10 with the virtual room. The screen configurations of the VR goggles 89 and the smart glasses 88 may be the same. The first virtual room association screen 260 includes a virtual room list 261, which is a list of virtual rooms. The virtual room list 261 displays individual virtual room fields 262 to 264 based on the virtual rooms created for the tenants. Each of the individual virtual room fields 262 to 264 includes a link issue button 265, an entry button 266, a setting button 267, and a virtual room name 268. The link issue button 265 is a button for issuing a link to the virtual room (URL for invitation) and the passcode. The entry button 266 is a button to be operated by a user, in the example, the user a, to enter the virtual room. The setting button 267 is a button for associating the image capturing device 10 with the virtual room. The value of the virtual room name 268 is the same as that stored in the virtual room information storage unit 5002. Accordingly, the user a presses the setting button 267. When the setting button 267 is pressed, the communication terminal 30A displays a second virtual room association screen 270.

When a device has already been associated with the virtual room, a device name 269 of the device is displayed in the individual virtual room field (the individual virtual room field 264 in the drawing).

Figure 23:
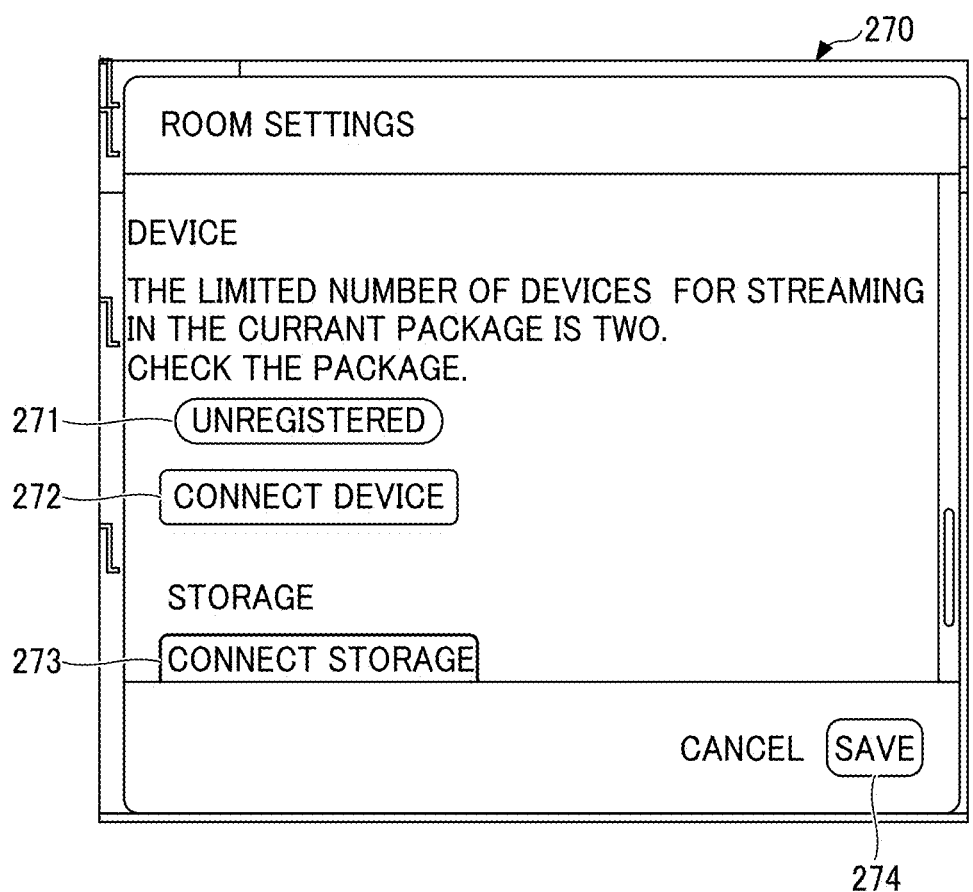
FIG. 23 is a diagram illustrating an example of a second virtual room association screen, according to the exemplary embodiment of the disclosure.

FIG. 23 is a diagram illustrating an example of the second virtual room association screen 270. The second virtual room association screen 270 is displayed in a pop-up manner on the first virtual room association screen 260. A screen transition from the first virtual room association screen 260 to the second virtual room association screen 270 does not go through the information processing system 50, but the screen transition can be performed through the information processing system 50.

The second virtual room association screen 270 includes a name 271 of the image capturing device 10 currently (already) associated with the virtual room (unregistered in the drawing, since the registration is not yet performed), a connection button 272, and a storage button 273. The connection button 272 is a button for displaying a list of devices registered for the tenant, as candidates for a device to be associated with the virtual room. The storage button 273 is a button for displaying a list of storage 90 to store a wide-angle view image of a normal angle view image captured by the image capturing device 10 associated with the virtual room. The list of storage 90 may include not only a list of storage 90 associated with the virtual room but also a list of specific storage locations such as folders on the storage 90. When the user selects a predetermined storage 90 or a specific storage location such as a folder on the storage 90, the storage 90 can be associated with the virtual room. The information related to the storage 90 (address information for accessing the storage 90 or a storage location such as a folder on the storage 90) associated as described above can be stored in association with the virtual room ID in the virtual room information storage unit 5002. When the connection button 272 is pressed, the communication terminal 30A displays a third virtual room association screen.

The communication terminal 30A transmits the virtual room ID to the information processing system 50, and acquires the device names (including the device IDs) registered for the tenant for which the virtual room is created and the device names (including the device IDs) associated with the virtual room.

Figure 24:
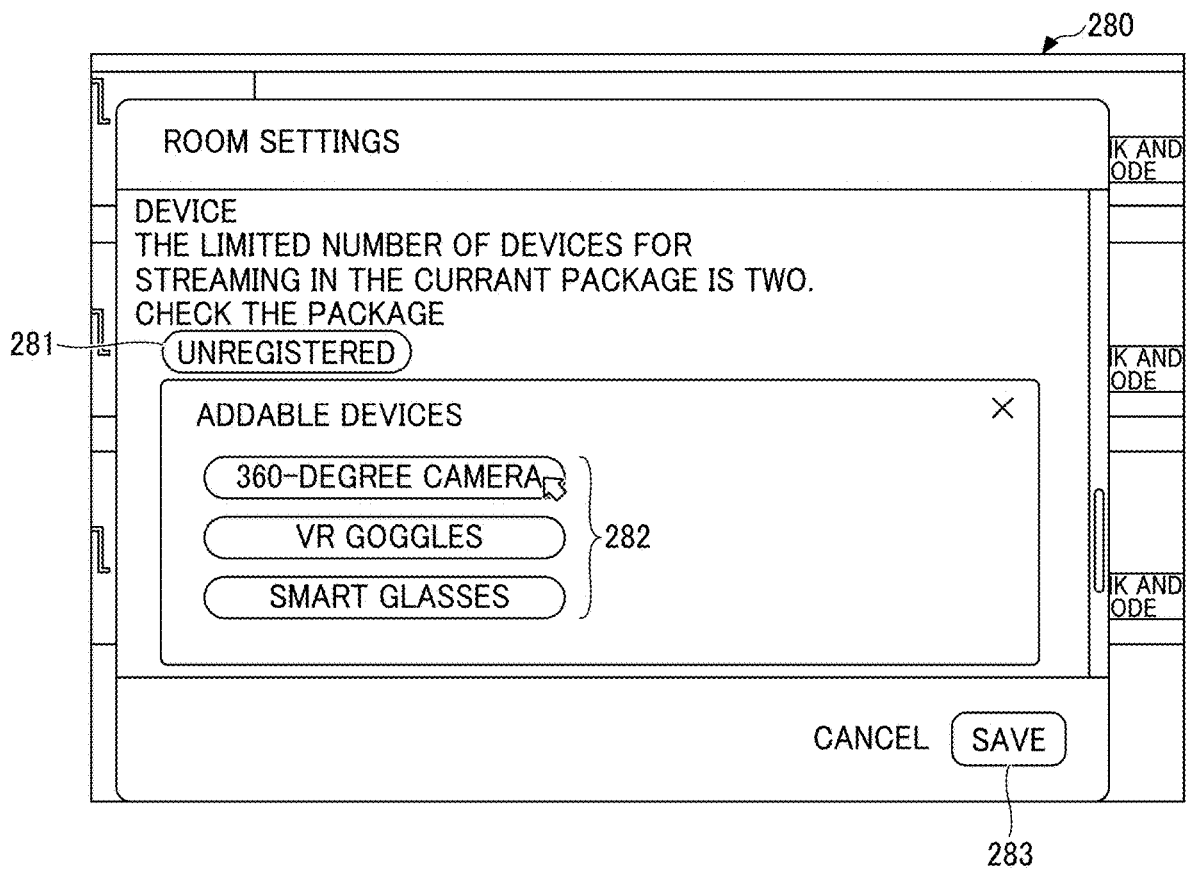
FIG. 24 is a diagram illustrating an example of a third virtual room association screen, according to the exemplary embodiment of the disclosure.

FIG. 24 is a diagram illustrating an example of a third virtual room association screen 280. The third virtual room association screen 280 includes a name 281 of the image capturing device 10 currently (already) associated with the virtual room, an addable device list 282, and a save button 283. The user a selects a device to be additionally associated with the virtual room from the addable device list 282, and presses the save button 283. Accordingly, the device is associated with the virtual room (the device ID such as the image capturing device ID is registered in the virtual room information storage unit 5002). As illustrated in FIG. 24, the number of image capturing devices to be associated with the virtual room may be limited, and for example, when the upper limit is two, the remaining number of devices that can be additionally registered may be displayed on the third virtual room association screen by referring to the number of image capturing device IDs already registered in the virtual room information storage unit 5002.

Transmission Start Processing of Wide-Angle View Image to Image Capturing Device As described above, the device such as the image capturing device 10 is associated with the virtual room. Then, the user a operates the device to start transmission of an image.

With respect to each of the VR goggles 89 and the smart glasses 88, transmission of the image is turned off or on according to a user operation of the user a with respect to the device body. This is because no application dedicated to the communication system 1a is currently running on the VR goggles 89 or the smart glasses 88.

When an application dedicated to the communication system 1a operates in the VR goggles 89 or the smart glasses 88, the user a can remotely turn on or off image transmission.

In the case of the image capturing device 10, when the application is activated, the user a can enter the virtual room and turn on or off the transmission of the wide-angle view image via the menu.

FIGS. 25A and 25B are diagrams each illustrating an example of a wide-angle view image transmission control dialog 290 displayed by the communication terminal 30A. The wide-angle view image transmission control dialog 290 is displayed in a pop-up manner on the image viewing screen 210. In the example, the user a operates the communication terminal 30A and enters the virtual room associated with the image capturing device 10. The wide-angle view image transmission control dialog 290 displays a name 292 of the image capturing device 10 associated with the virtual room. A toggle button 291 is displayed near the name 292, and the user a can operate the toggle button 291 to set transmission of the wide-angle view image by the image capturing device 10 to ON (start transmission) or OFF (stop transmission). The method of setting ON or OFF by the toggle button is merely an example, and the setting may be performed in a different way according to an input of a user operation. For example, the setting may be performed by selecting a radio button or a predetermined icon or by operating the menu. Further, the transmission of the wide-angle view image may be automatically started after the image capturing device 10 enters the virtual room without requiring a user operation. In addition, a predetermined condition such as a date and time, the number of users who enter the virtual room, or participation of a specific user may be determined in advance, and the transmission of the wide-angle view image may be started when a determination indicating the condition is satisfied is made.

The communication terminal 30A transmits setting information of transmission control by operation performed with respect to the toggle button 291 to the information processing system 50. The information processing system 50 transmits to the image capturing device 10 a transmission start request or a transmission stop request according to the setting information of the transmission control.

In the example of FIG. 25A, a state in which the toggle button 291 is set to OFF is illustrated. Because the toggle button 291 is set to OFF, the wide-angle view image is not displayed in FIG. 25A. On the other hand, in the example of FIG. 25A, at the time when the communication terminal 30A enters the virtual room, the standard-angle view image captured by the camera 9 of the communication terminal 30A is already shared and displayed on the image viewing screen 210.

In the example of FIG. 25B, a state in which the toggle button 291 is set to ON is illustrated. When the toggle button 291 is turned on, the information processing system 50 transmits the transmission start request to the image capturing device 10, and the image capturing device 10 starts transmission of the wide-angle view image, accordingly. In this case, since the two images are shared in the virtual room, which is a single room, the image viewing screen 210 is divided into two. When the setting is changed from ON to OFF, the communication terminal 30A transmits the setting information indicating OFF, the information processing system 50 transmits a transmission stop request to the image capturing device 10 in response to reception of the setting information indicating OFF, and the image capturing device 10 stops transmission of the wide-angle view image.

As described with reference to FIG. 20B, even when the user is at the site, the image capturing device 10 can be associated with the virtual room by a simple operation of capturing an image of the code information by the image capturing device 10. The association processing can be performed at the site as long as the code information issued in advance and the image capturing device 10 are provided. This is particularly useful for a case where the user at the site does not have a PC. In addition, when the association processing is performed in advance, the user can connect the image capturing device 10 to a particular virtual room without selecting the virtual room, and can also instruct to start or stop transmission from a remote site. Accordingly, the burden on the user who desires to concentrate on the work at the site can be reduced. Accordingly, a system that can efficiently perform communication between a site and another remote site for the preparation processing.

Process for Registering Image Capturing Device for Virtual Room

Figure 26:
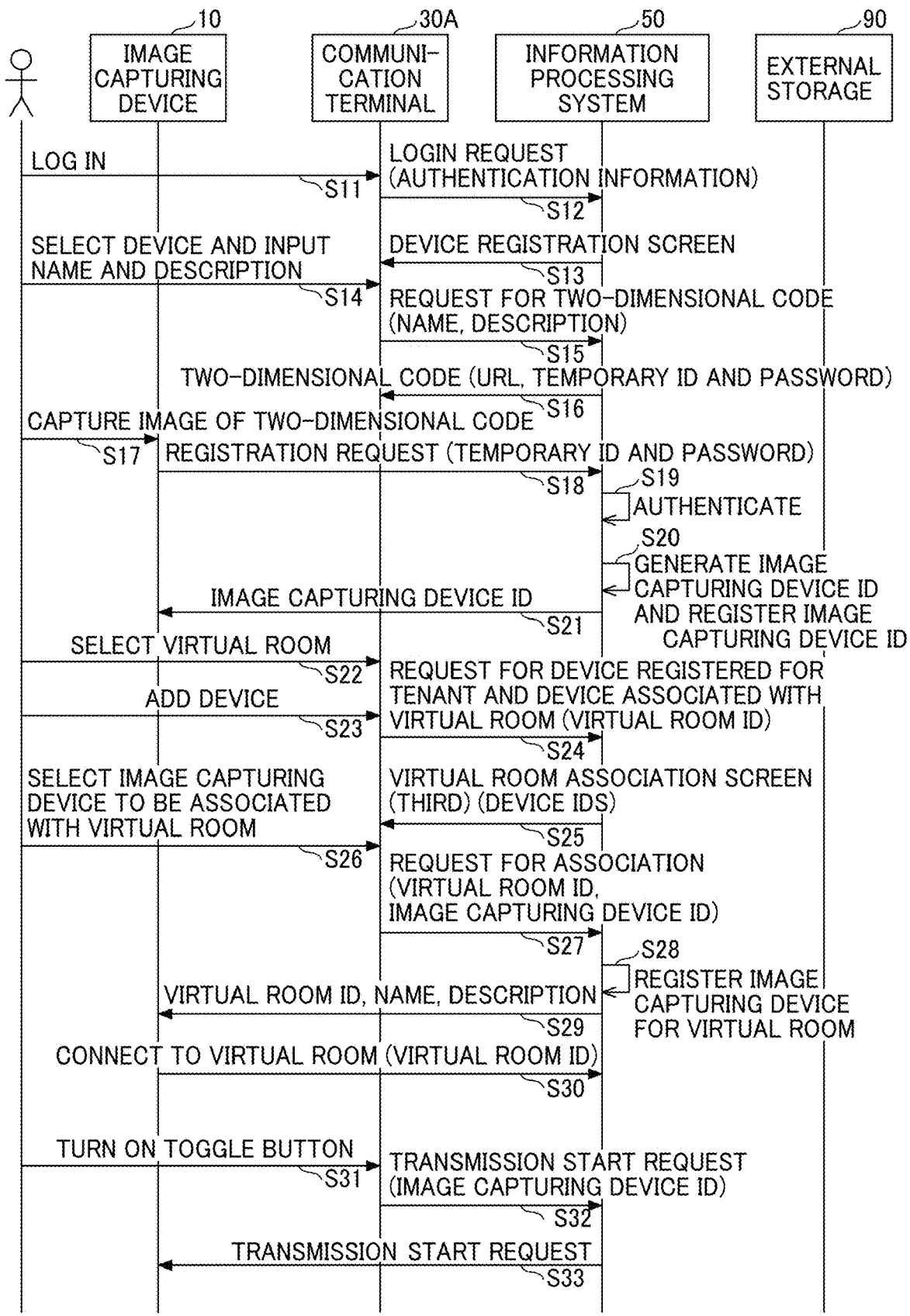
FIG. 26 is a sequence diagram illustrating an example of a process for registering the image capturing device for a virtual room according to a user operation, according to the exemplary embodiment of the disclosure.

Referring to FIG. 26, a process for registering the image capturing device 10 for the virtual room described with respect to the series of screen transitions of FIGS. 19 to 25 (FIGS. 25A and 25B) is described. FIG. 26 is a sequence diagram illustrating an example of a process for registering the image capturing device 10 for the virtual room according to a user operation of the user a.

S11: First, the user a connects the communication terminal 30A to the information processing system 50, inputs authentication information (user ID, password, etc.), and requests log-in. The reception unit 32 of the communication terminal 30A receives the operation.

S12: The communication unit 31 of the communication terminal 30A designates the authentication information and transmits a login request to the information processing system 50. The communication unit 51 of the information processing system 50 receives the login request, and the authentication unit 55 performs authentication based on the designated authentication information. The following description of the present embodiment is given on the assumption that the authentication is successful. At this time, the information processing system 50 can identify the tenant ID associated with the authenticated user ID by referring to the tenant information storage unit 5003.

S13: In response to a user operation, the screen generation unit 52 of the information processing system 50 generates the device registration screen 220, and the communication unit 51 transmits screen information of the device registration screen 220 to the communication terminal 30A.

S14: The communication unit 31 of the communication terminal 30A receives the screen information of the device registration screen 220, and the display control unit 33 displays the device registration screen 220 illustrated in FIG. 19. The user a selects the type of device (in the example, the image capturing device 10 (for example, an omnidirectional camera) is selected), and then inputs the name and the description of the image capturing device 10 as illustrated in FIG. 20A. The reception unit 32 receives the input.

S15: The communication unit 31 of the communication terminal 30A designates the name and the description input by the user a and transmits a request for code information (for example, a two-dimensional code) to the information processing system 50.

S16: The communication unit 51 of the information processing system 50 receives the request for code information (for example, the two-dimensional code). The communication group management unit 56 generates a URL (connection destination for registration) in association with the name and the description, and generates code information (for example, the two-dimensional code) including the URL, a temporary ID, and a password. The communication unit 51 of the information processing system 50 transmits the code information (for example, the two-dimensional code) to the communication terminal 30A. The communication unit 31 of the communication terminal 30A receives the code information (for example; the two-dimensional code), and the display control unit 33 displays the code information (for example, the two-dimensional code) as illustrated in FIG. 20B.

S17: The user a operates the image capturing device 10 to be associated with a virtual room to capture an image of the code information (for example, the two-dimensional code). The reception unit 12 of the image capturing device 10 receives the operation.

S18: The imaging processing unit 13 of the image capturing device 10 generates an image data by performing image capturing processing on a targeted image including the code information (for example, a two-dimensional code), and the analysis unit 14 analyzes the image data to extract the URL, the temporary ID, and the password. As a result, the registration request unit 15 connects to the URL via the connection unit 16, identifies the temporary ID and the password, and transmits a registration request of the image capturing device 10 to the information processing system 50. In a case where the registration is performed by a method using the registration screen described with reference to FIG. 21, since the image of the code information is not captured, the image capturing device 10 is replaced with communication terminals such as the VR goggles 89 or the smart glasses 88; and Steps S15 to S17 can be skipped.

S19: The communication unit 51 of the information processing system 50 receives the temporary ID and the password, and the authentication unit 55 determines whether the received temporary ID and the received password match the temporary ID and password associated with the connected URL. In the following description of the present embodiment, the received temporary ID and the received password match the temporary ID and password associated with the connected URL.

S20: Since the registration of the image capturing device 10 is requested, the communication group management unit 56 of the information processing system 50 generates an image capturing device ID as an example of the device ID and registers the image capturing device ID for the tenant corresponding to the tenant ID identified when the user a logs in. The image capturing device ID is associated with the name and the description. Specifically, the communication group management unit 56 refers to the tenant information storage unit 5003 and adds and registers the image capturing device ID as a tenant registration device associated with the identified tenant ID. Although the communication group management unit 56 generates and registers the image capturing device ID in the example, the communication group management unit 56 may register the image capturing device ID received from the image capturing device 10. When a communication terminal such as the VR goggles 89 or the smart glasses 88 is registered for the tenant in alternative to the image capturing device 10, a device ID corresponding to each device can be registered in the tenant information storage unit 5003 in the substantially same manner as described above.

S21: The communication unit 51 of the information processing system 50 transmits the image capturing device ID to the image capturing device 10. The connection unit 16 of the image capturing device 10 receives the image capturing device ID and stores the image capturing device ID in the storage unit 1000.

S22: The communication terminal 30A is notified of registration completion from the communication unit 51 of the information processing system 50, and this allows the user a to start associating the image capturing device 10 with the virtual room. The first virtual room association screen 260 is displayed on the communication terminal 30A according to a user operation of the user a, and the user a selects the virtual room to be associated with the image capturing device 10 registered for the tenant. The reception unit 32 of the communication terminal 30A receives an input operation indicating the selection. Specifically, when the reception unit 32 of the communication terminal 30A receives the input operation performed by the user a, the display control unit 33 displays the first virtual room association screen 260. At this time, the communication unit 31 may transmit a screen update request to the communication unit 51 of the information processing system 50. In response to receiving the update request, the information processing system 50 refers to the tenant information storage unit 5003 and identifies the virtual room ID registered for the tenant associated with the authenticated user ID. Subsequently, the virtual room name associated with the identified virtual room ID is acquired by referring to the virtual room information storage unit 5002. The communication unit 51 of the information processing system 50 transmits to the communication terminal 30A information on the virtual room ID and the corresponding virtual room name identified as describe above. In addition to, or in alternative to the virtual room ID and the corresponding virtual room name, the communication unit 51 of the information processing system 50 may transmit to the communication terminal 30A information on a screen generated by the screen generation unit 52 based on the information the virtual room ID and the corresponding virtual room name. The communication unit 31 of the communication terminal 30A receives the information on the virtual room ID and the virtual room name, and based on the received information, the display control unit 33 updates and displays the first virtual room association screen 260. Since such information can be identified based on the user ID, the information may be received in Step S13 after the authentication. When the reception unit 32 receives the input operation indicating the selection performed by the user a on the first virtual room association screen 260 displayed in this manner, the virtual room ID in which the communication terminal 30A is selected can be specified.

S23: The user a causes the communication terminal 30A to display the second virtual room association screen 270, and presses the connection button 272 to additionally associate the device with the virtual room. The reception unit 32 of the communication terminal 30A receives the input operation of pressing. Specifically, the display control unit 33 of the communication terminal 30A displays the second virtual room association screen 270 corresponding to the selected virtual room ID identified in Step S22. Furthermore, the reception unit 32 receives an instruction to additionally associate the device with the virtual room according to the user operation performed by the user a (pressing of the connection button 272).

S24: In response to the input operation in Step S23, the communication unit 31 of the communication terminal 30A requests the information processing system 50 to transmit information on the devices registered as the candidates for a device to be associated with the virtual room and the devices already associated with the virtual room ID selected in Step S22.

S25: The communication unit 51 of the information processing system 50 receives a request for the information on the devices registered for the tenant and the device associated with the selected virtual room ID, and the screen generation unit 52 generates the third virtual room association screen 280 including the devices registered for the tenant and the device ID of the device associated with the selected virtual room ID.

The communication unit 51 of the information processing system 50 transmits the screen information of the third virtual room association screen 280 to the communication terminal 30A.

S26: The communication unit 31 of the communication terminal 30A receives the screen information of the third virtual room association screen 280, and the display control unit 33 displays the third virtual room association screen 280.

The user a selects the device (in the example, the image capturing device 10) to be associated with the virtual room. The reception unit 32 of the communication terminal 30A receives the selection, and the image capturing device ID is identified as the device ID of the selected device.

S27: The communication unit 31 of the communication terminal. 30A designates the virtual room ID selected in Step S22 and the device ID (for example, the image capturing device ID) selected in Step S26, and transmits an association request to the information processing system 50.

S28: The communication unit 51 of the information processing system 50 receives the association request, and the communication group management unit 56 registers the device (for example, the image capturing device 10) for the virtual room. In other words, the communication group management unit 56 refers to the virtual room information storage unit 5002 and registers the device ID (for example, the image capturing device ID) in association with the virtual room ID designated by the request of Step S27.

S29: Since the device ID (for example, the image capturing device ID) is associated with the virtual room, the communication unit 51 of the information processing system 50 transmits the virtual room ID, the name, and the description to the image capturing device 10. The information processing system 50 may use a push notification, or may use polling by the image capturing device 10 to perform transmission. The connection unit 16 of the image capturing device 10 receives the virtual room ID, the name, and the description and stores the virtual room ID, the name, and the description in the storage unit 1000. Accordingly, when the image capturing device 10 transmits the wide-angle view image, the image capturing device ID, the virtual room ID, the name, the description, and the like can be added. Devices other than the image capturing device 10 can also be associated with the virtual room in the substantially same manner as described above. Subsequently, the communication unit 51 of the information processing system 50 may transmit to the communication terminal 30A a notification indicating completion of association. After this step, the device (image capturing device 10) registered for the virtual room can be connected to the associated virtual room. In the following description of the present embodiment, the image capturing device 10 is connected to the virtual room by transmitting to the information processing system 50 a connection request with respect to the virtual room by designating the virtual room ID received in Step S29. However, in some embodiments, a timing at which the image capturing device 10 connects to the virtual room can be changed according to a user operation.

S30: The communication terminal 30A and the information processing system 50 enter the virtual room with which the communication terminal 30A has associated the device (the image capturing device 10) by performing the process for entering the virtual room described with reference to FIG. 18.

S31: After entering the virtual room, the user a turns on the toggle button 291 of the image capturing device 10 associated with the virtual room on the image viewing screen 210. The reception unit 32 of the communication terminal 30A receives the user operation of turning on.

S32: The communication unit 31 of the communication terminal 30A designates the device ID (image capturing device ID) and transmits a request to start transmission of a wide-angle view image to the information processing system 50. The user a may directly operate a button of the image capturing device 10 to start transmission of the wide-angle view image. Note that the communication unit 31 of the communication terminal 30A may transmit a transmission stop request to the information processing system 50 in response to an operation of the user a.

S33: The communication unit 51 of the information processing system 50 receives the transmission start request and requests the image capturing device 10 identified by the device ID (image capturing device ID) to start transmission. The information processing system 50 may use a push notification or polling performed by the image capturing device 10. The connection unit 16 of the image capturing device 10 receives the transmission start, and the imaging processing unit 13 starts imaging.

The image transmission control unit 18 repeats the transmission of the wide-angle view image at a determined frames per second (FPS) or an FPS corresponding to the band via the connection unit 16. Accordingly, the communication terminal 30 entering the virtual room can display a state of the site A on the image viewing screen 210 in real time.

Streaming of Wide-Angle View Image

Figure 27:
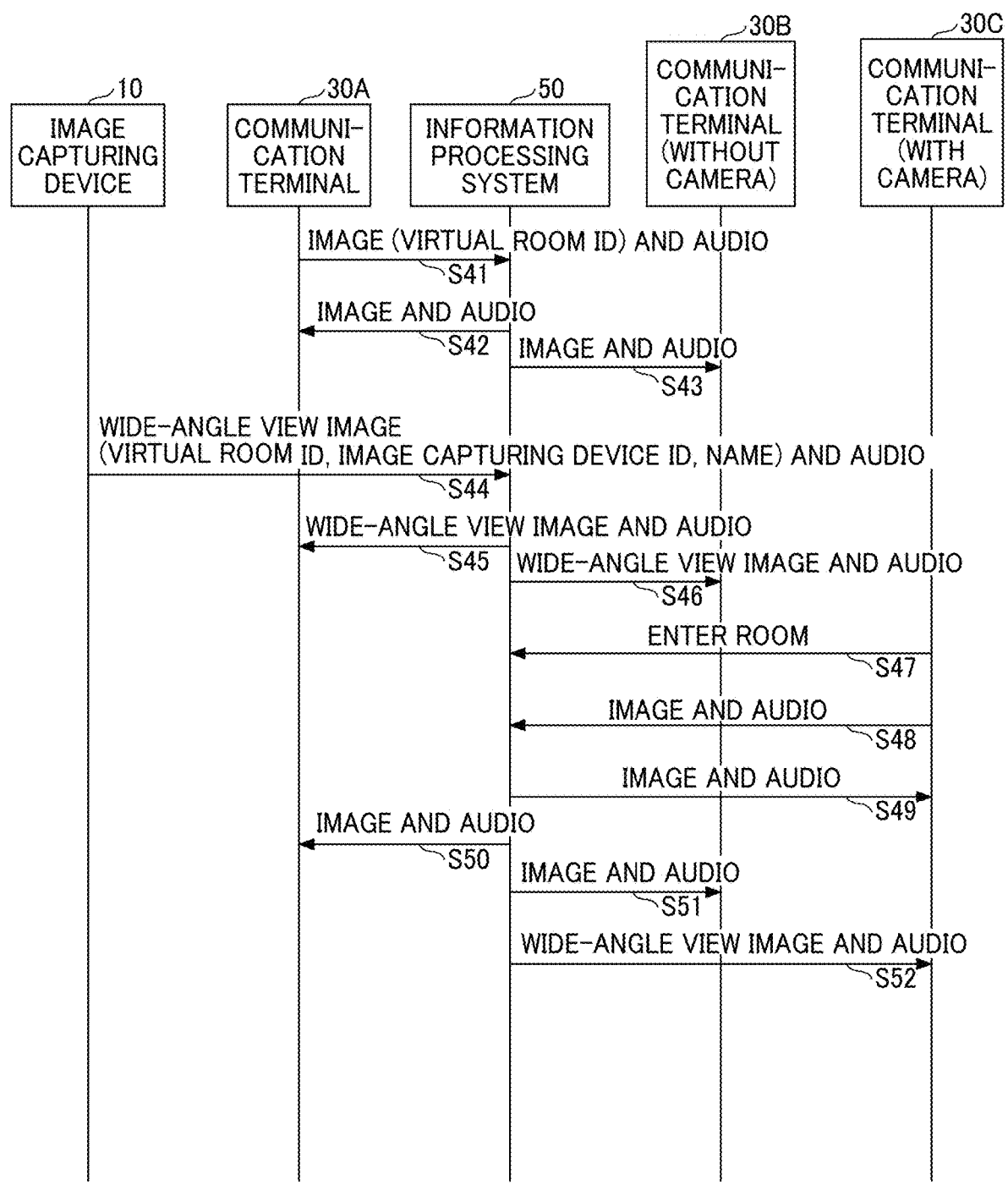
FIG. 27 is a sequence diagram illustrating an example of a process for sharing a wide-angle view image, according to the exemplary embodiment of the disclosure.

With reference to FIG. 27, a process for sharing a wide-angle view image or a standard-angle view image is described. FIG. 27 is a sequence diagram illustrating an example of a process for sharing a wide-angle view image. In FIG. 27, the communication terminals 30A and 30B have executed the entry process described with reference to FIG. 18 and entered the virtual room. The communication terminal 30A has the camera 9 with a normal angle of view, and an image captured by the camera 9 is shared with the communication terminal 30B. An image captured by the smart glasses 88 associated with the virtual room may be shared in alternative to the image captured by the cameras 9 of the communication terminals 30A. In the example of FIG. 27, the image capturing device 10 has already been connected to the same virtual room by the registration process described in FIG. 26.

S41: The image capturing unit 34 of the communication terminal 30A captures an image of the surroundings, and the communication unit 31 specifies the virtual room ID of the virtual room in which the user enters and transmits video and audio including the captured image to the information processing system 50.

S42, S43: When the communication unit 51 of the information processing system 50 receives the video and audio including the image, the image streaming unit 54 acquires the IF addresses of the communication terminals 30A and 30B that currently enter the same virtual room from the virtual room information storage unit 5002, and transmits the video and audio including the image via the communication unit 51. In the example of FIG. 27, the communication unit 31 of the communication terminal 30A receives a standard-angle view image from the information processing system 50 and displays the image, but the standard-angle of view image captured by the image capturing unit 34 may not be received and displayed.

S44: In response to a transmission start request based on the transmission start setting of the image capturing device 10, the imaging processing unit 13 captures a wide-angle view image, and the image transmission control unit 18 specifies the virtual room ID for which the image capturing device 10 is registered, the image capturing device ID, the name, and the description and transmits a video and audio including a wide-angle view image to the information processing system 50 via the connection unit 16.

S45, S46: When the communication unit 51 of the information processing system 50 receives the video and audio including the wide-angle view image, the image streaming unit 54 acquires the IP addresses of the communication terminals 30A and 30B that currently enter the same virtual room from the virtual room information storage unit 5002, and transmits the video and audio including the wide-angle view image via the communication unit 51.

S47: The communication terminal 30C provided with the camera 8 newly enters the virtual room by executing the process for entering the virtual room described with reference to FIG. 18.

S48: The communication unit 31 of the communication terminal. 30C transmits video and audio including a standard-angle view image to the information processing system 50.

S49 to S51: The communication unit 51 of the information processing system 50 receives the video and audio including a standard-angle view image from the communication terminal 30C, acquires the IP addresses of the communication terminals 30A to 30C that currently enter the same virtual room from the virtual room information storage unit 5002, and the image streaming unit 54 transmits the video and audio including the standard-angle view image.

S52: The communication unit 51 of the information processing system 50 also transmits the video and audio including the wide-angle view image to the communication terminals 30C that has entered the same virtual room.

As described above, the users a and b who enter the same virtual room can share the video including the wide-angle view image captured by the image capturing device 10 associated with the virtual room in real time. The transmission order of the images illustrated in FIG. 27 is an example, and the wide-angle view image may be shared first, or the standard-angle view image may be shared first.

An additional description of the smart glasses 88 and the VR goggles 89 is given below. The smart glasses 88 have a camera with a normal angle of view and a display function. A standard-angle view image obtained by imaging by the camera of the smart glasses 88 is streamed in substantially the same manner as the cameras 8 and 9. Since the display function of the smart glasses 88 has a flat display similar to a normal display, a part of the wide-angle view image is displayed at a viewpoint designated by the user. The VR goggles 89 have a display function (may further include a camera having a normal angle of view). Since the display function of the VR goggles 89 projects a wide-angle view image at a viewpoint determined by the direction of the head of the user, the predetermined-area image Q of the predetermined area T in the wide-angle view image is displayed at the viewpoint corresponding to the direction of the head of the user. While a wide-angle view image is being viewed by a user with the smart glasses 88 or the VR goggles 89, an image capturing request specifying viewpoint information for viewing can be transmitted to the information processing system 50 according to a user operation.

Recording According to Request Input with Communication Terminal

Referring to FIGS. 29 to 34, a process in relation to recording by any one of the communication terminals 30 is described.

First, a screen on which recording of a wide-angle view image is requested according to a user operation performed on the communication terminal 30 while the wide-angle view image is being shared is described. Although any one of the users can instruct recording, in the example, user b instructs recording. Since the wide-angle view image is being shared, the image capturing device 10 has already performed "image capturing" in real time, in a precise sense. The recording request at the time of sharing the wide-angle view image refers to recording the wide-angle view image for storage. In a state where the wide-angle view image is simply streamed in real time, the wide-angle view image is not stored and is not available to be checked later (a particular scene is not arbitrarily stored).

Figure 29:
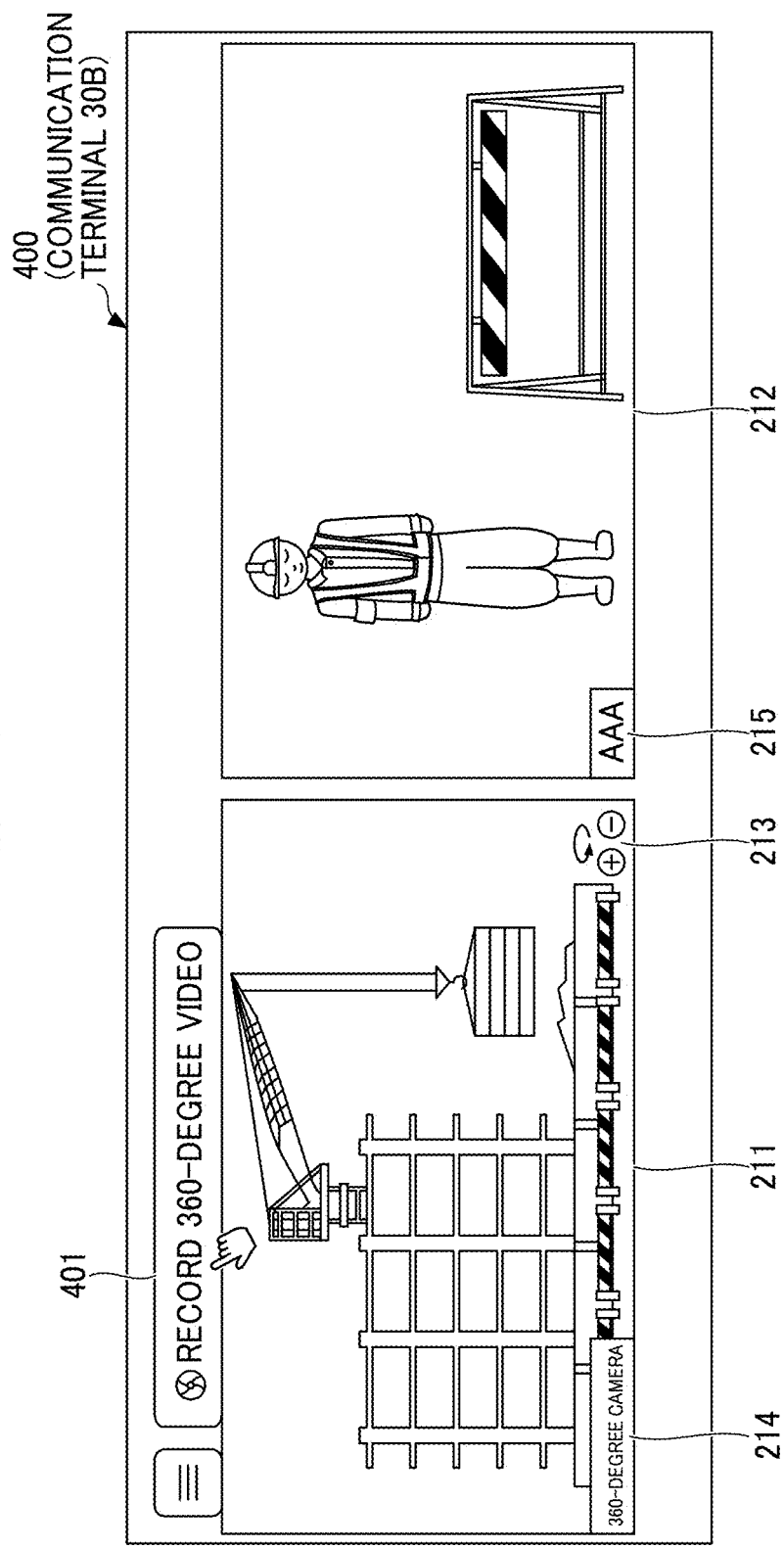
FIG. 29 is a diagram illustrating an example of an image viewing screen displayed by the communication terminal according to the exemplary embodiment of the disclosure.

FIG. 29 is a diagram illustrating an example of an image viewing screen 400 displayed by the communication terminal 30B. In the following description of FIG. 29, differences from FIG. 25B are described. The communication terminals 30A and 30B individually display a video including a wide-angle view image streamed in real time, and the communication terminals 30A and 30B also display a video including a standard-angle view image captured by the camera 9 of the communication terminals 30A. Regarding the video of the wide-angle view image, the predetermined area T (see FIGS. 9 and 10 (FIGS. 10A to 10D) of the displayed wide-angle view image can be changed by changing the virtual viewpoint (see FIG. 11) according to a user operation of the user at each site. Accordingly, a state of the site of a range which hardly checked with a normal angle of view can be checked.

As illustrated in FIG. 29, a record button 401 is displayed in the first image section 211 in which the wide-angle view image is displayed. The record button 401 is a button for a recording request to record using viewpoint information for specifying a predetermined area of the video including the wide-angle view image currently displayed in the first image section 211. In the example of FIG. 29, a description such as "RECORD 360-DEGREE VIDEO" is described on the record button 401, but this is an example of a button in the case where video of a spherical image, which is an example of a wide-angle view image, is recorded, and a button on which another description is given or a button represented by an image such as an icon on which no description is given may be used. Alternatively, the button may be a button for instructing recording a wide-angle view image other than the spherical image. The recording button 401 is not limited to the example of FIG. 29 as long as being a component of Graphical User Interface (GUI) with which recording can be instructed.

Figure 30:
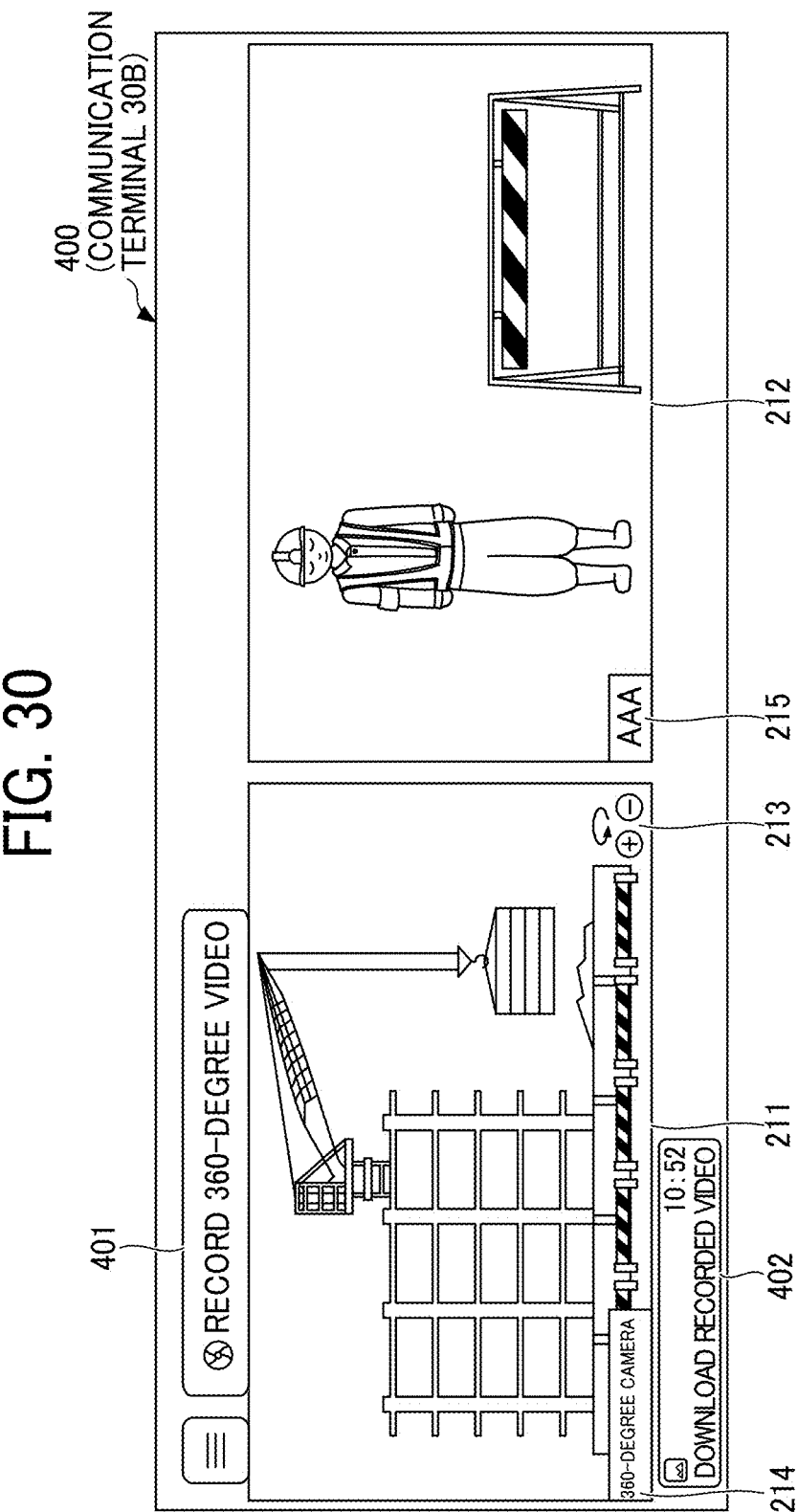
FIG. 30 is a diagram illustrating an example of an image viewing screen on which a download button is displayed in response to a record button being pressed on the communication terminal according to the exemplary embodiment of the disclosure.

FIG. 30 is a diagram illustrating an example of the image viewing screen 400 on which a download button 402 is displayed in response to the record button 401 being pressed on the communication terminal 30B. In FIG. 30, the download button 402 (an example of a display component) is displayed below the first image section 211. A message "DOWNLOAD RECORDED VIDEO" is displayed on the download button 402. The download button 402 is embedded with storage location information (for example, a URL) to which the wide-angle view image recorded in response to the recording request transmitted by pressing the recording button 401 is uploaded. When the user b presses the download button 402, the communication terminal 30B connects to the URL and downloads the recorded wide-angle view image. Since the wide-angle view image is associated with the viewpoint information, when the communication terminal 30B displays the downloaded wide-angle view image, a virtual viewpoint is set in a manner that a predetermined area of the wide-angle view image specified by the viewpoint information fits in the center of the first image section 211. In a case where viewpoint information of a plurality of sites is associated with the downloaded wide-angle view image, a plurality of options corresponding to the plurality of sites may be displayed on the screen so that which viewpoint information of site is to be used to display the image is selectable. When a user input operation of selecting one of the plurality of options is received, the image may be displayed based on the viewpoint information. The viewpoint does not necessarily coincide with the center, and the viewpoint may be set to be included in a range near the center of the first image section 211 for displaying. In the present embodiment described above, the downloaded wide-angle view image is displayed on the first image section 211 in which the video including the wide-angle view image streamed in real time is displayed. In some embodiments, while the video including the wide-angle view image streamed in real time may be continuously displayed in the first image section 211, and a new image section may be added to the image viewing screen 400 to display the downloaded wide-angle view image. In this way, a change in the state of the site can be checked by using the video of the wide-angle view image streamed in real time and the wide-angle view image obtained by cutting out a specific state of the site can be simultaneously checked.

The mode of the download button 402 is an example, and the download button 402 may display text such as "spherical image URL." In alternative to the button, a link corresponding to storage location information (for example, a URL) may be displayed. The user can download by clicking the link as well.

Alternatively, the communication terminal 30B may automatically receive and display the stored wide-angle view image and the associated viewpoint information without displaying the download button 402.

In the example of FIG. 30, the image viewing screen 400 is displayed by the communication terminal 30B that has requested recording. In addition, the download button 402 may also be displayed on the image viewing screen 400 displayed by the communication terminal 30A displaying the video including the wide-angle view image streamed in real time. In some embodiments, the download button 402 may be displayed on the communication terminal 30A of the participant who is in the same virtual room in response a user operation performed by the user b for instructing sharing of the wide-angle view image captured by the recording request. In this way, the imaging request user (user b) who has instructed recording can confirm a recorded image before the image is shared with other participants. Accordingly, sharing a wide-angle view image that is erroneously recorded or a wide-angle view image that does not need to be shared can be prevented. However, all the communication terminals 30 entering the virtual room may automatically display the download button 402 in response to the storage of the wide-angle view image.

Referring to FIGS. 31A and 31B, a case where the communication terminal 30A displays the download button 402 is described below FIG. 31A is a diagram illustrating an example of an image viewing screen 410 displayed before receiving a user operation of pressing the download button 402. Before the user a presses the download button 402, the communication terminal 30A displays, in the first image section 211, a wide-angle view image at an angle of view including, for example, a work machine including a drill as an arbitrary virtual viewpoint designated by the user a. In this state, the user a presses the download button 402.

FIG. 31B is a diagram illustrating an example of the image viewing screen 420 viewable by the user a and displayed after the user b presses the download button 402. Since the viewpoint information at the time when the user b presses the record button 401 is the first image section 211 illustrated in FIG. 29, the wide-angle view image downloaded and recorded at the same viewpoint as the first image section 211 illustrated in FIG. 29 is displayed in the first image section 211 of the communication terminal 30A as illustrated in FIG. 31B. Accordingly, the recorded wide-angle view image having an angle of view with which a scene in which building materials are being lifted by a crane from the roof of a building can be checked, is displayed, in alternative to the work machine including the drill. In addition, the user a can change, as desired, the virtual viewpoint with respect to the downloaded wide-angle view image displayed in the first image section 211 illustrated in FIG. 31B, in substantially the same manner as the video of the wide-angle view image streamed in real time. Accordingly, the viewpoint of the user who has requested recording can be reflected as an initial value even on a wide-angle view image obtained by cutting out a specific scene, and the specific scene of the scene can be checked up to a range that is hardly checked at a normal angle of view.

In this way, users at different sites can later share a virtual viewpoint of a recorded wide-angle view image in a particular scene. The wide-angle view image stored in response to the storage request may be displayed in a pop-up manner in alternative to the first image section 211 illustrated in FIG. 31B, or may be displayed in another window. In this way, the efficiency of mutual communication by using the wide-angle view image obtained by cutting out a certain specific scene recorded can be improved, while the state of the site changing with time is being checked by the video of the wide-angle view image streamed in real time.

As illustrated in FIG. 31B, the record button 401 is not displayed while the wide-angle view image downloaded by the communication terminal 30A is being displayed. This is because a real-time wide-angle view image is not displayed in the first image section 211. In addition, as the device name 214 of the first image section 211, the name of the image capturing device 10 and indication that the image is shared are displayed. The device name 214 can be identified based on the information on the tenant registration device stored in the tenant information storage unit 5003. In alternative to the device name 214, the corresponding device ID may be used.

Further, with the communication terminals 30A and 30B on each of which the download button 402 is displayed, the users a and b can delete, or hide, the download button 402, as desired.

Figure 32:
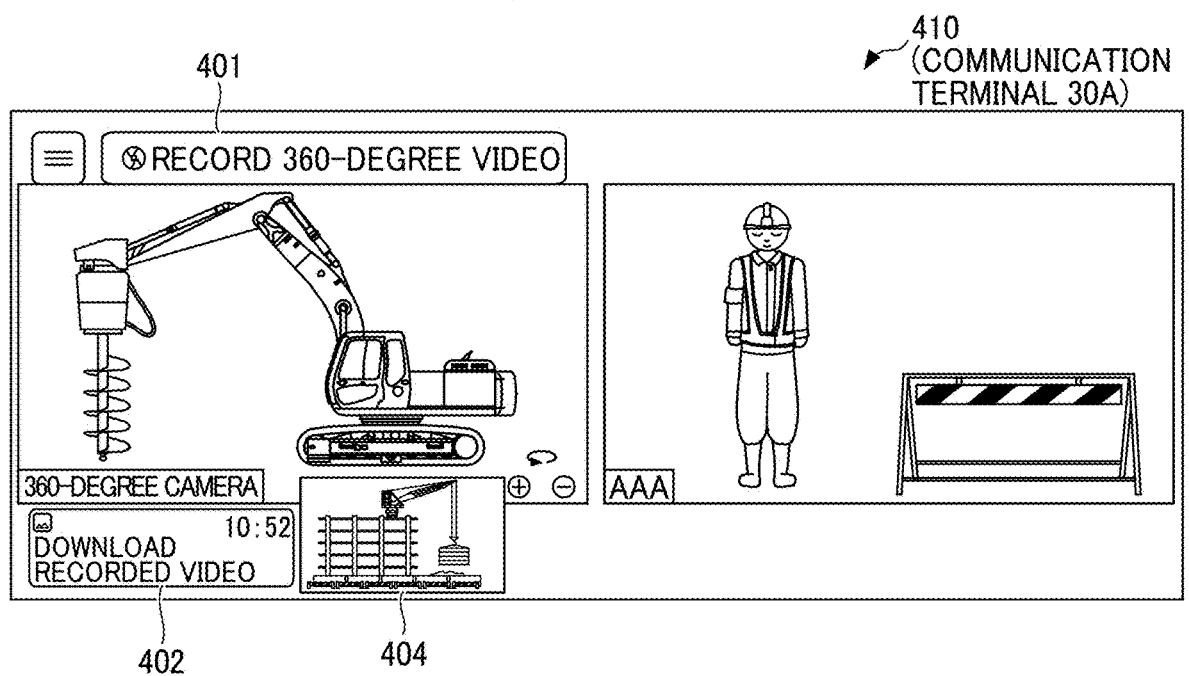
FIG. 32 is a diagram illustrating an example of an image viewing screen on which a thumbnail image is displayed, according to the exemplary embodiment of the disclosure.

Further, as illustrated in FIG. 32, the communication terminals 30A and 30B may display a thumbnail image 404 of the wide-angle view image along with the download button 402. Alternatively, the thumbnail image 404 may be displayed as an image including the download button 402. The thumbnail image 404 may be generated by the information processing system 50 or by the communication terminal 30. The viewpoint in the thumbnail image 404 is determined by the viewpoint information.

In addition, it is preferable that each of the users a and b can set a data name (to be registered in the image management information storage unit 3001 of each communication terminal 30) to the wide-angle view image recorded by the recording request.

Figure 33:
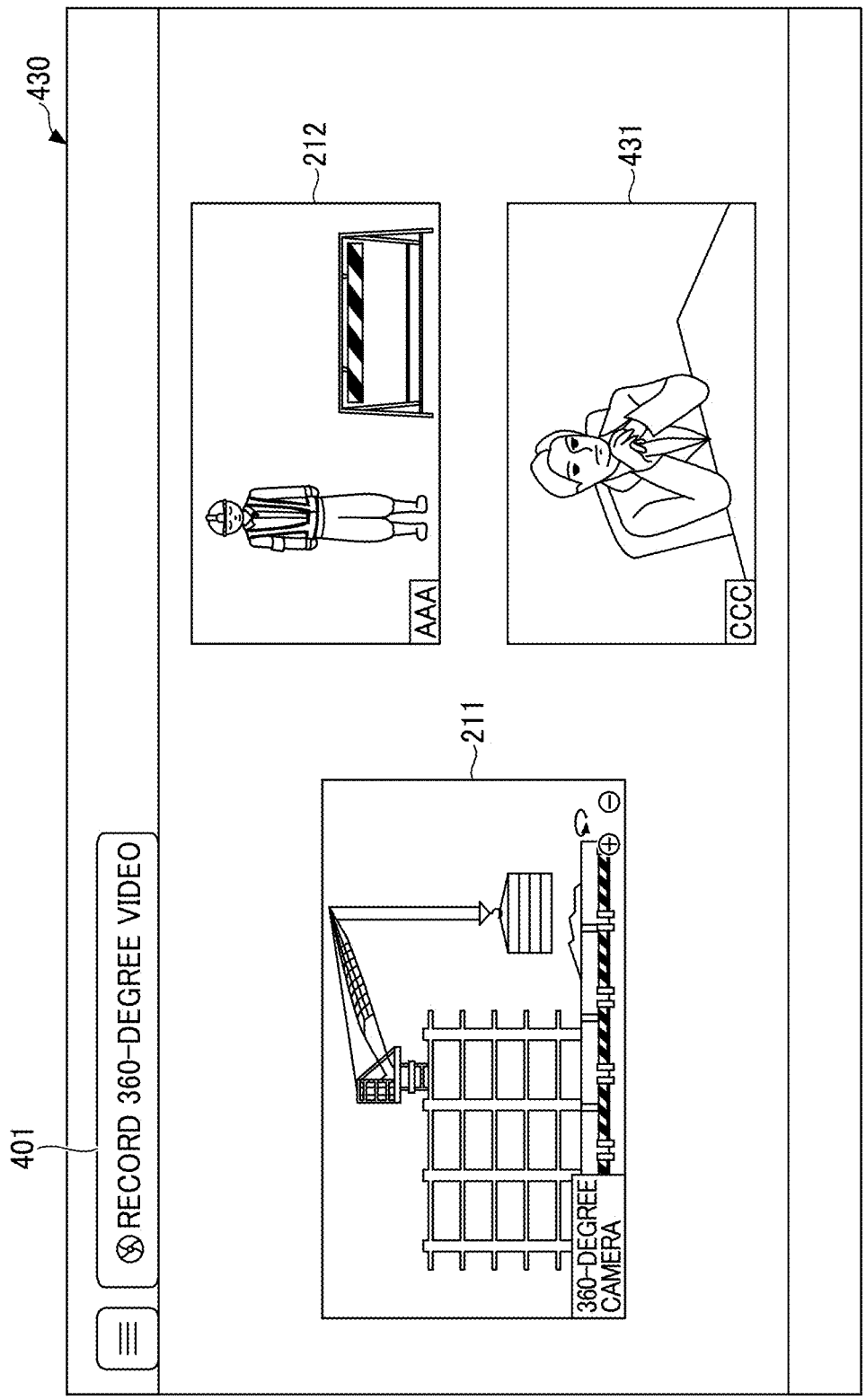
FIG. 33 is a diagram illustrating an example of an image viewing screen that has three image sections, according to the exemplary embodiment of the disclosure.

FIG. 33 is a diagram illustrating an example of an image viewing screen 430 that has three image sections. The image viewing screen 430 illustrated in FIG. 33 includes, for example, the first image section 211 in which the wide-angle view image captured by the image capturing device 10 is displayed, the second image section 212 in which a standard-angle view image captured by the camera 9 of the communication terminal 30A is displayed, and a third image section 431 in which a standard-angle view image captured by the camera 8 of the communication terminal 30C is displayed. Any one of the users a, b, and c can press a recording button, and the users a, b, and c at respective sites can share the wide-angle view image from the same viewpoint.

Figure 28:
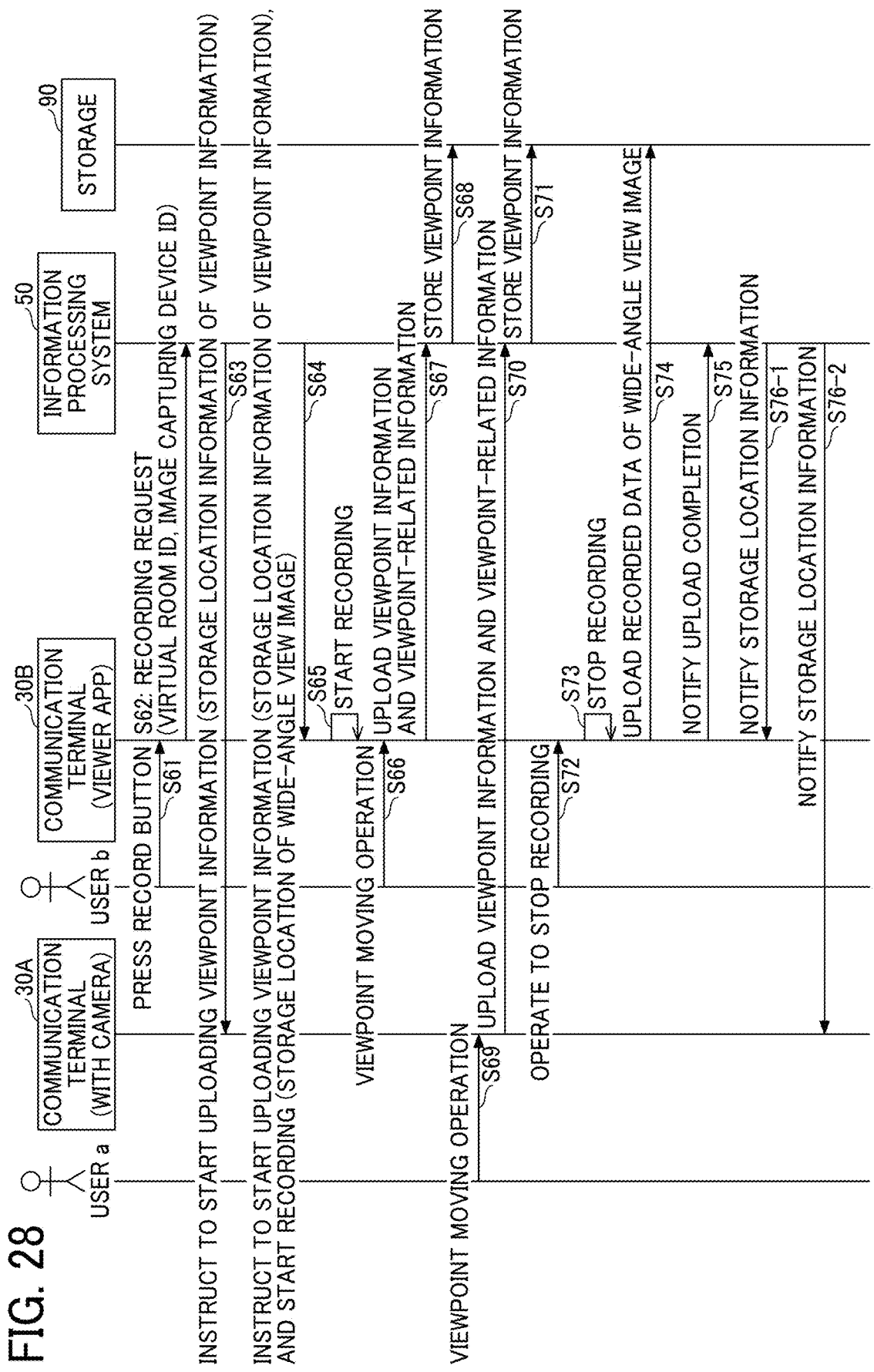
FIG. 28 is a sequence diagram illustrating a process in relation to recording requested according to a user operation with the communication terminal while a wide-angle view image is being shared, according to the exemplary embodiment of the disclosure.

Operation or Process in Response to Recording Request while Wide-Angle View Image is being Shared Referring to FIG. 28, operation or a process performed in response to a recording request in the communication system 1a while a wide-angle view image is being shared is described. FIG. 28 is a sequence diagram illustrating a process in which the user b performs a user operation with the communication terminal 30B for requesting recording while the wide-angle view image is being shared. In the following description of the example of FIG. 28, the communication terminals 30A and 30B have entered the virtual room by the entry process described with reference to FIG. 18. In addition, in the following description of the example of FIG. 28, the user b presses the record button 401 to share the viewpoint information with the user a. However, the user a can also press the record button 401 to share the viewpoint information with the user b. In the example of FIG. 28, the image capturing device 10 has already been connected to the same virtual room by the registration process described with reference to FIG. 26. In the example of FIG. 28, as an example of the embodiment, a viewer application (viewer app) having a function related to displaying a predetermined-area image and transmitting viewpoint information is installed on each communication terminal 30. Note that the viewer app does not need to be installed in advance, and the communication terminal may be provided with an equivalent function in advance, or the communication terminal may receive a program having an equivalent function to the viewer app from an information processing system or another server when entering the virtual room, and the communication terminal can execute operation performed by the communication terminal illustrated in FIG. 28, accordingly. Further, the viewer app of the communication terminal may be implemented by a web browser.

S61: The user b inputs an operation of pressing the record button 401 illustrated in FIG. 29. The reception unit 32 of the communication terminal 30B receives the input of the input operation of pressing. Pressing the recording button 401 is an example of the input operation method for transmitting a recording request, and a recording request may be transmitted in response to an input to another user interface. The user interface includes not only a GUI but also an interface with respect to voice or gesture.

S62: In response to reception of the input operation for transmitting the recording request, the communication unit 31 of the communication terminal 30B transmits the recording request to the information processing system 50. The recording request includes the virtual room ID for identifying the virtual room currently being used and the image capturing device ID for identifying the image capturing device that is a source of streaming of a video. Accordingly, the communication unit 51 of the information processing system 50 receives the recording request. Audio recording is also performed with image recording, however, in the following description, the image recording is described for simplicity. However, in the present embodiment, audio data is also communicated and recording in relation to the audio data is also performed for audio as well as the image.

S63: when the communication unit 51 of the information processing system 50 receives the recording request, the association processing unit 53 refers to the virtual room information storage unit 5002 and generates storage location information (for example, URL) for the recorded wide-angle view image based on the virtual room ID. In addition, the communication terminal 30A in the virtual room is identified, and storage location information (for example, URL) of viewpoint information that is set to the storage 90 in the same virtual room is generated. Then, the communication unit 51 transmits an instruction to start uploading the viewpoint information to the communication terminal 30A. The instruction to start uploading may be referred to as a start instruction or an upload start instruction. The start instruction includes the storage URL of viewpoint information dedicated to communication terminal 30A. As a result, the communication unit 31 of the communication terminal 30A receives the start instruction. In response to this, the display control unit 33 displays the download button 402.

S64: The communication unit 51 of the information processing system 50 transmits an instruction to start uploading the viewpoint information (including the storage location information of the viewpoint information) to the communication terminal 30B, which is the recording request source, in substantially the same manner as the transmission to the communication terminal 30A, and transmits a recording start instruction as a response to the recording request source. The recording start instruction includes storage location information of the recorded wide-angle view image.

S65: The recording unit 35 of the communication terminal 30B starts recording the wide-angle view image and audio related to the moving image streamed from the image capturing device 10 (see Step S46). The recorded data is temporarily stored in the storage unit 3000 from the recording unit 35 via the storing/reading unit 19. When audio data is included in the image data, the recording unit 35 also records the audio.

S66: The user b inputs a user operation of moving (changing) the virtual viewpoint with respect to a predetermined-area image, which is set as a default, displayed by the communication terminal 30B by using, for example, the pointing device 312 or an external mouse. Accordingly, the reception unit 32 receives an operation of moving the viewpoint, and the display control unit 33 displays the predetermined-area image corresponding to the viewpoint that has been changed on the display 306 of the communication terminal 30B. The operation of moving a viewpoint may be also referred to as a moving operation for the viewpoint, or a viewpoint moving operation. For example, in FIGS. 10A to 10D, when the predetermined-area image displayed as a default is illustrated in FIG. 10B, the viewpoint of the virtual camera IC is moved as illustrated in FIG. 10C by a user operation of the user b, and in response to the user operation, the predetermined-area image as illustrated in FIG. 10D is displayed on the display 306. The virtual viewpoint may be moved by not only performing an input operation with a user interface such as the pointing device 312, but also by performing an input operation by voice or a gesture.

S67: The communication unit 31 of the communication terminal 30A uploads the viewpoint information and the viewpoint-related information to the information processing system 50 in response to the viewpoint moving operation. The viewpoint information is information for specifying a predetermined area in the wide-angle view image after the virtual viewpoint is moved. As illustrated in FIG. 16, the viewpoint-related information includes the wide-angle view image data ID to be recorded, the user ID of the user b who is a participant, the viewing start date and time information indicating the date and time at which viewing of a new predetermined-area image is started by moving the virtual viewpoint, and the storage location information of the viewpoint information acquired in Step S64. Accordingly, the communication unit 51 of the information processing system 50 receives the viewpoint-related information, and the storing/reading unit 59 stores the viewpoint-related information as one record in the viewpoint-related information storage unit 5004.

S68: The communication unit 51 of the information processing system 50 stores the viewpoint information received in Step S67 in the storage location (URL) related to the storage location information of the viewpoint information received in Step S67. In alternative to storing the viewpoint information in the storage 90, the information processing system 50 may store in the own system the viewpoint-related information of FIG. 16 in a manner that the "storage location information of the viewpoint information" is replaced with the viewpoint information.

S69: The user a operates in substantially the same manner as the user b in Step S66.

S70: The communication unit 31 of the communication terminal 30A uploads the viewpoint information and the viewpoint-related information to the information processing system 50 in substantially the same manner as Step S67.

S71: In substantially the same manner as Step S68, the communication unit 51 of the information processing system 50 stores the viewpoint information received in Step S70 in a storage location (URL) related to the storage location information of the viewpoint information received in Step S70.

S72: When the user b inputs an operation of stopping the recording, or a recording stopping operation with, for example, a mouse, the reception unit 32 receives the recording stopping operation.

S73: In response to the reception of the input of the recording stopping operation, the recording unit 35 stops the recording.

S74: In the communication terminal. 30B, the storing/reading unit 39 reads the recorded data stored in the storage unit 3000, and the communication unit 31 uploads and stores the recorded data of the wide-angle view image related to the moving image to the storage location of the storage 90 related to the storage location information of the wide-angle view image acquired in Step S64. In addition, in Step S74, the recorded data may be uploaded and stored in the storage location of the storage 90 via the information processing system 50.

S75: When the upload is completed in Step S74, the communication unit 31 of the communication terminal 30B notifies the information processing system 50 that the upload is completed.

S76-1 and S76-2: When receiving the notification that the upload is completed, the communication unit 51 of the information processing system 50 notifies the communication terminal 30A and the communication terminal 30B, which are in the virtual room, of the storage location information (URL) of the wide-angle view image. In response to receiving the notification, the display control unit 33 of each of the communication terminal 30A and the communication terminal 30B can display the download button 402 described with reference to FIGS. 30 and 31A. In response to receiving the input operation corresponding to the pressing of the download button 402 by the reception unit 32 of each of the communication terminal 30A and the communication terminal 30B, the communication unit 31 of each of the communication terminal 30A and the communication terminal 30B requests the storage 90 for the recorded data stored in the storage location of the storage 90 corresponding to the storage location information, and download the recorded data from the storage 90 to share the recorded data. The request may be made via the information processing system 50, or the recorded data may be downloaded via the information processing system 50.

Then, the process illustrated in FIG. 28 ends.

When the smart glasses 88 or the VR goggles 89 is the communication terminal 30, the process illustrated in FIG. 28 is executed in substantially the same manner.

Figure 34:
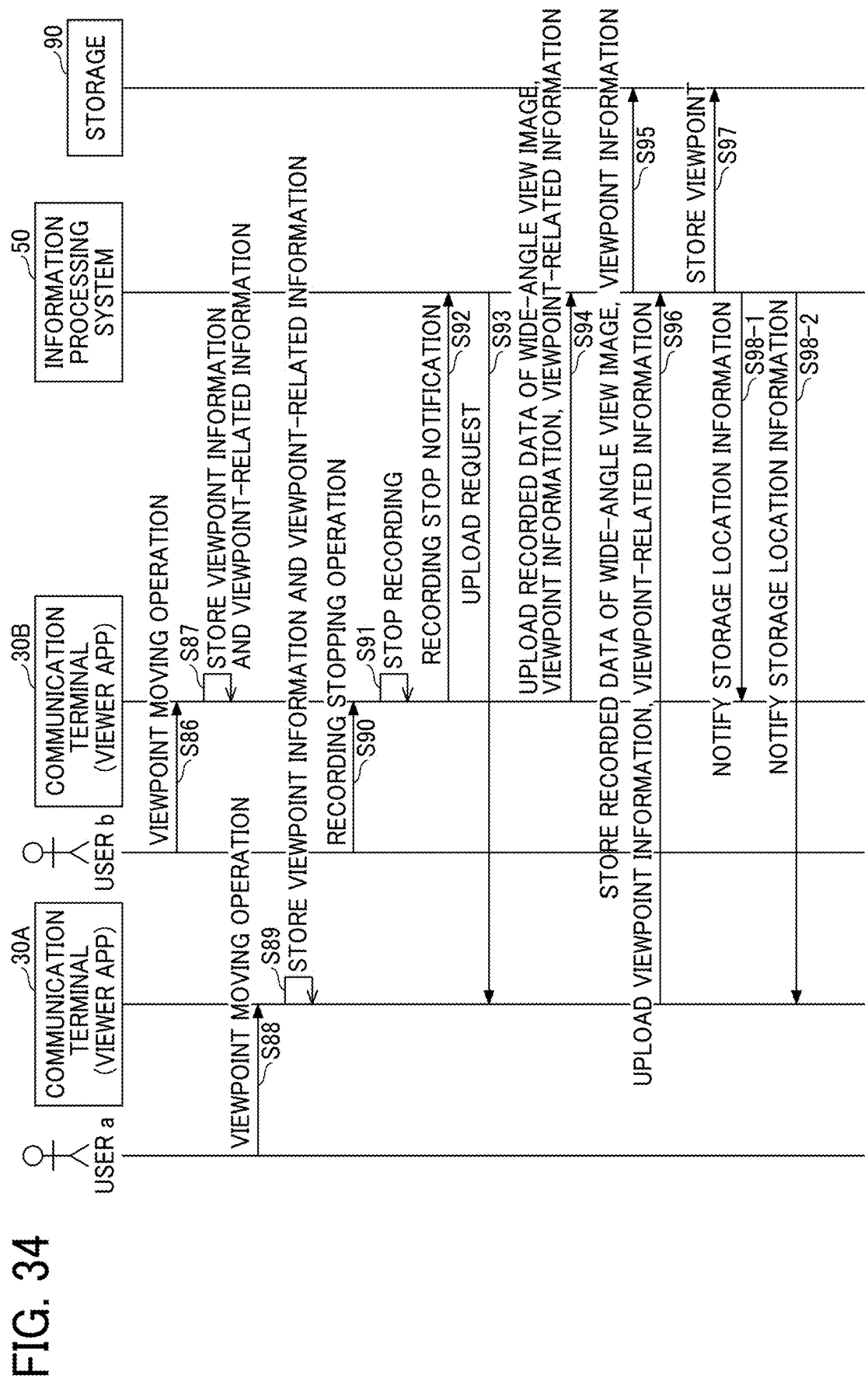
FIG. 34 is a sequence diagram illustrating an example of a variation of the process of FIG. 28 for uploading viewpoint information and a wide-angle view image in relation to recording, according to the exemplary embodiment of the disclosure.

FIG. 34 is a sequence diagram illustrating an example of a variation of the process illustrated in FIG. 28. FIG. 34 is a sequence diagram illustrating an example of a process for uploading viewpoint information and a wide-angle view image. In the example of variation, since the same processing as Steps S61 to S65 in FIG. 28 is performed, the description thereof is omitted. The following starts describing Step S86 to describe a process performed after recording is started with the communication terminal 30B.

S86: In substantially the same manner as Step S66 described above, the user b inputs a user operation of moving (changing) the virtual viewpoint with respect to a predetermined-area image, which is set as a default, displayed by the communication terminal 30B by using, for example, the pointing device 312 or an external mouse. Accordingly, the reception unit 32 of the communication terminal 30B receives the input operation of moving the viewpoint, or a moving operation for the viewpoint, and the display control unit 33 displays the predetermined-area image corresponding to the viewpoint that has been changed on the display 306 of the communication terminal 30B.

S87: In the communication terminal 30B, the storing/reading unit 39 stores the viewpoint information for specifying the predetermined area after the virtual viewpoint is moved in Step S86 and the viewpoint-related information related to the viewpoint information in the storage unit 3000.

S88: In substantially the same manner as Step S86 described above, the user a inputs a user operation of moving (changing) the virtual viewpoint with respect to a predetermined-area image, which is set as a default, displayed by the communication terminal 30A by using, for example, the pointing device 312 or an external mouse. Accordingly, the reception unit 32 of the communication terminal 30A receives the input operation of moving the viewpoint, or a moving operation for the viewpoint, and the display control unit 33 displays the predetermined-area image corresponding to the viewpoint that has been changed on the display 306 of the communication terminal 30A.

S89: In the communication terminal. 30B, in substantially the same manner as Step S87, the storing/reading unit 39 stores the viewpoint information for specifying the predetermined area after the virtual viewpoint is moved in Step S88 and the viewpoint-related information related to the viewpoint information in the storage unit 3000.

S90: When the user b inputs an operation of stopping the recording, or a recording stopping operation with, for example, a mouse, the reception unit 32 receives the recording stopping operation in substantially the same manner as Step S72.

S91: The recording unit 35 stops the recording.

S92: The communication unit 92 of the communication terminal 30B transmits, to the information processing system 50, a recording stop notification indicating that the recording has been stopped. Accordingly, the communication unit 51 of the information processing system 50 receives the recording stop notification.

S93: The communication unit 51 of the information processing system 50 transmits an upload request for the viewpoint information and the viewpoint-related information to the communication terminal 30A that is not performing recording operation. Accordingly, the communication unit 31 of the communication terminal 30A receives the upload request.

S94: In the communication terminal 30B, the storing/reading unit 39 reads the recorded data of the wide-angle view image, the viewpoint information, and the viewpoint-related information that have been stored in the storage unit 3000, and the communication unit 31 uploads the recorded data of the wide-angle view image, the viewpoint information, and the viewpoint-related information to the information processing system 50. As described above, the viewpoint-related information includes the storage location information of the viewpoint information. Accordingly, the communication unit 51 of the information processing system 50 receives the recorded data of the wide-angle view image, the viewpoint information, and the viewpoint-related information.

S95: The communication unit 51 of the information processing system 50 stores the viewpoint information received in Step S94 in the storage location (URL) related to the storage location information of the viewpoint information received in Step S94. In addition, the communication unit 51 of the information processing system 50 stores the recorded wide-angle view image received in Step S94 in the storage location (URL) of the storage 90 indicated by the storage location information of the wide-angle view image stored in the image management information storage unit 5001 (see FIGS. 14A and 14B). As long as the communication terminal 30B identifies the storage location, the recorded data of the wide-angle view image and the viewpoint information may be stored in the storage 90 without using the information processing system 50.

S96: In the communication terminal 30A, the storing/reading unit 39 reads the viewpoint information and the viewpoint-related information that have been stored in the storage unit 3000, and the communication unit 31 transmits the viewpoint information and the viewpoint-related information to the information processing system 50. As described above, the viewpoint-related information includes the storage location information of the viewpoint information. Accordingly, the communication unit 51 of the information processing system 50 receives the viewpoint information and the viewpoint-related information.

S97: The communication unit 51 of the information processing system 50 stores the viewpoint information received in Step S96 in the storage location (URL) of the storage 90 related to the storage location information of the viewpoint information received in Step S96. In addition, the communication unit 51 of the information processing system 50 stores the recorded wide-angle view image received in Step S96 in the storage location (URL) of the storage 90 indicated by the storage location information of the wide-angle view image stored in the image management information storage unit 5001 (see FIGS. 14A and 14B). As long as the communication terminal 30A identifies the storage location, the viewpoint information may be stored in the storage 90 without using the information processing system 50.

S98-1 and S98-2: When the processing of Steps S95 and S97 is executed and the storage of the recorded data and the viewpoint information in the storage 90 is completed, the communication unit 51 of the information processing system 50 notifies each of the communication terminal 30A and the communication terminal 30B, which are in the virtual room, of the storage location information (URL) of the wide-angle view image. In response to receiving the notification, the display control unit 33 of each of the communication terminal 30A and the communication terminal 30B can display the download button 402 described with reference to FIGS. 30 and 31A. In response to receiving the input operation corresponding to the pressing of the download button 402 by the reception unit 32 of each of the communication terminal 30A and the communication terminal 30B, the communication unit 31 of each of the communication terminal 30A and the communication terminal 30B requests the storage 90 for the recorded data stored in the storage location of the storage 90 corresponding to the storage location information, and download the recorded data from the storage 90 to share the recorded data. The request may be made via the information processing system 50, or the recorded data may be downloaded via the information processing system 50.

Then, the process illustrated in FIG. 34 ends.

In the examples of FIGS. 28 and 34, recording is started and stopped with the communication terminal 30, but as described in FIG. 27, since the information processing system 50 also receives the wide-angle view image captured by the image capturing device 10 similarly to the communication terminal 30, the recording unit 35 included in the communication terminal 30 may be included in the information processing system 50, and recording of the wide-angle view image may be started and stopped by the recording unit 35 of the information processing system 50. In such a case, since recording is performed by a server such as a cloud, a processing load related to recording is not applied to the communication terminal 30 operated by the user. In such a case of variation, the processing of Step S74 in which the communication terminal 30 uploads the recorded data, has a different configuration in which the information processing system 50 stores the recorded data in the storage 90.

Similarly, in a case where the image capturing device 10 has the function of the recording unit 35, recording of the wide-angle view image may be executed with the image capturing device 10. In such a case, a processing load related to recording is not applied to the information processing system 50 and the communication terminal 30. In the case of such a variation, in response to the information processing system 50 receiving the recording request in Step S62, the information processing system 50 transmits the recording request to the image capturing device 10 corresponding to the image capturing device ID, so that the image capturing device 10 can start recording. In addition, in response to the input of the recording stopping operation in Step S72, the communication terminal 30 transmits a recording stopping request to the information processing system 50, and the information processing system 50 further transmits the recording stopping request including the storage location information to the image capturing device 10, so that the image capturing device 10 can stop recording. After the recording is stopped, in substantially the same manner as Step S74, in alternative to the communication terminal 30, the image capturing device 10 may upload the recorded date to the storage 90 (or via the information processing system 50) based on the storage location information.

Although the communication terminal 30 that has transmitted a recording request is the one that performs recording among the communication terminals 30 in the examples of FIGS. 28 and 34, all the communication terminals 30 entering the virtual room may perform control, start or stop, of recording the wide-angle view image being streamed, and upload the recorded data of the wide-angle view image as well as the communication terminal 30 that has transmitted the recording request, in response to receiving an upload start instruction for the viewpoint information.

Further, in the examples of FIGS. 28 and 34, when the viewpoint information is transmitted to the information processing system 50 or the storage 90, in the case of a data format in which the viewpoint information is embedded in the recorded data, the viewpoint information may be transmitted by transmitting the recorded data including the viewpoint information.

Viewing Wide-Angle View Image Registered in Storage

Figure 35:
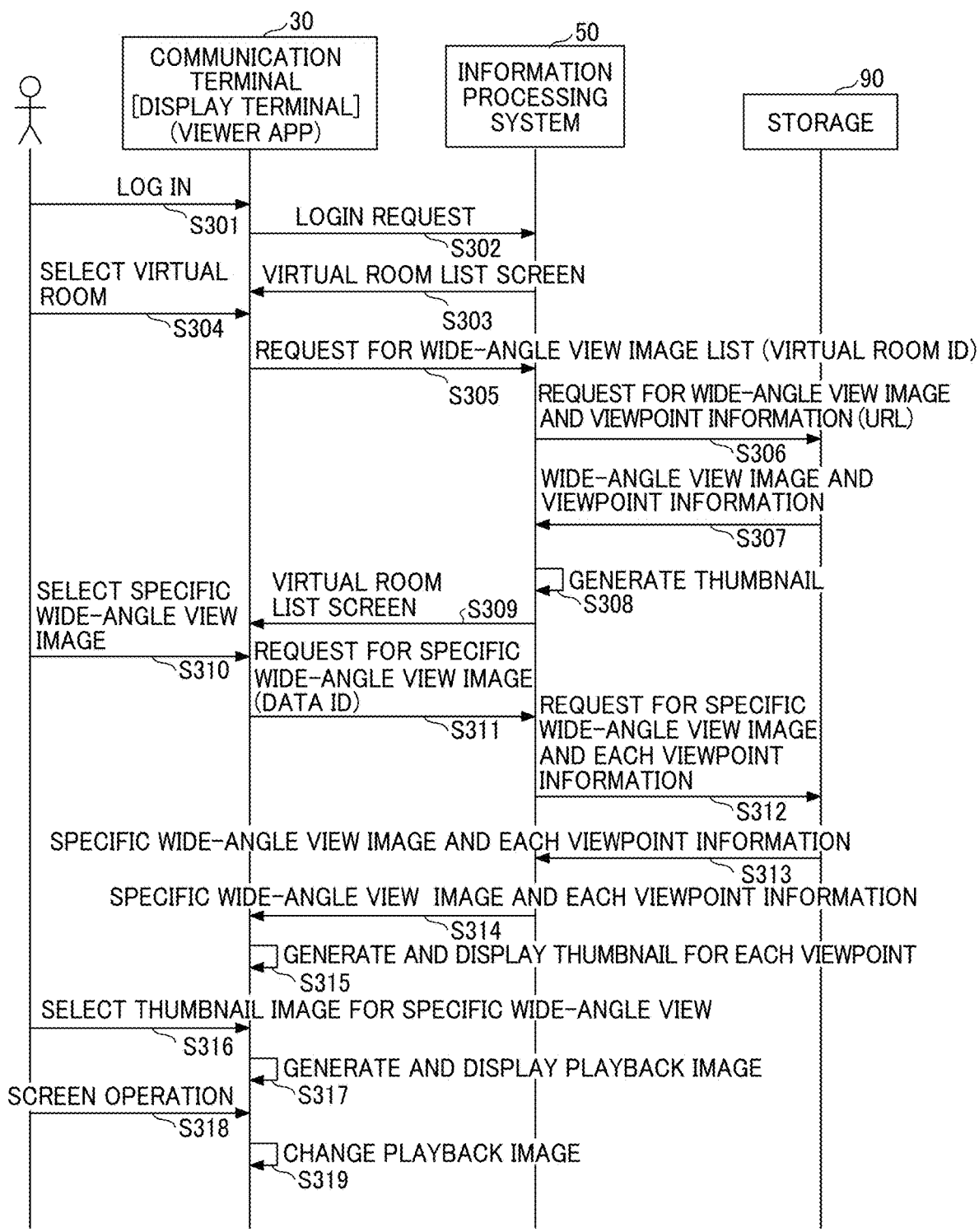
FIG. 35 is a sequence diagram illustrating an example of a process for viewing a wide-angle view image stored in the storage according to a user operation, according to the exemplary embodiment of the disclosure.
Figure 36:
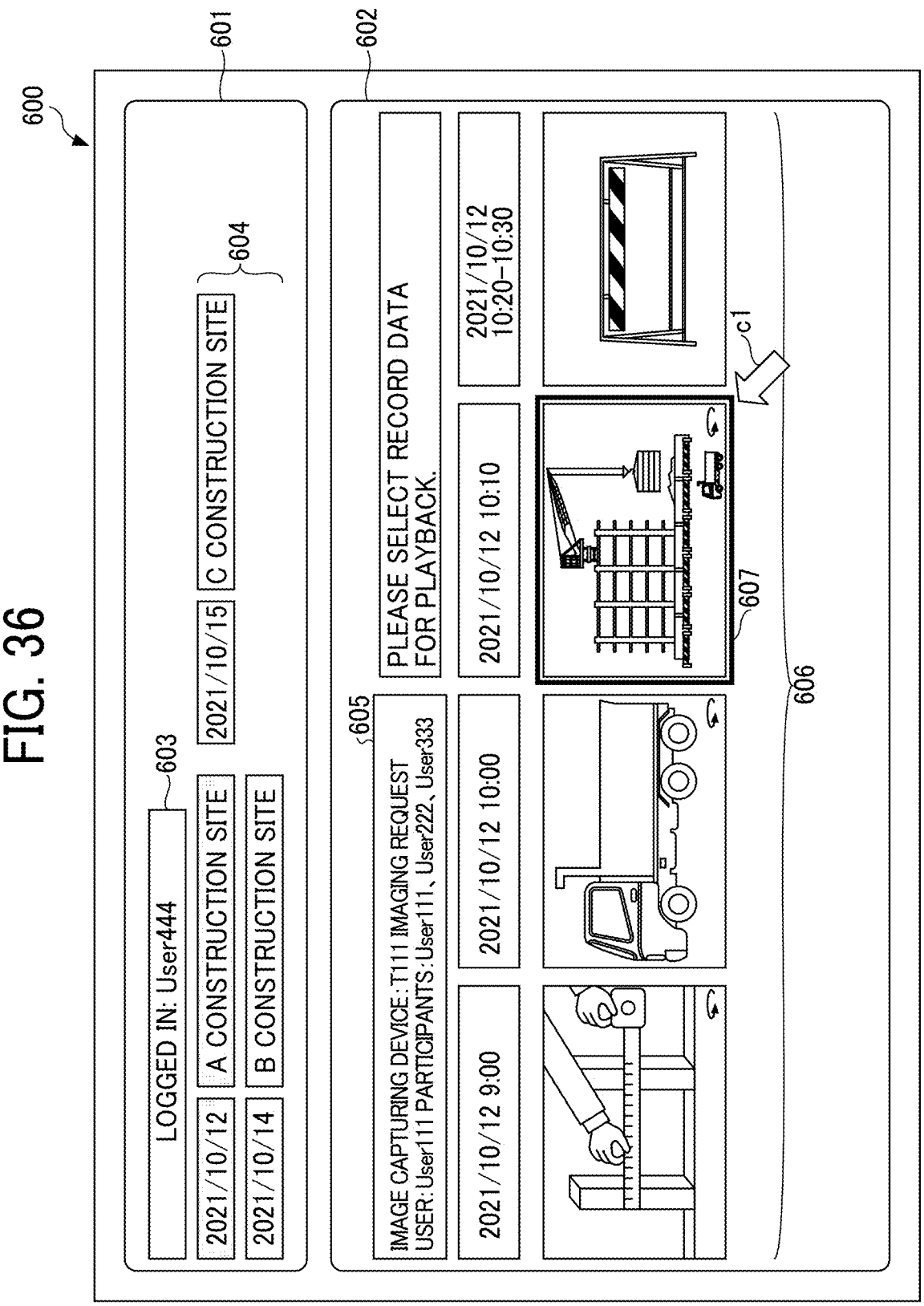
FIG. 36 is a diagram illustrating an example of a virtual room list screen displayed by connecting the communication terminal to storage according to a user operation, according to the exemplary embodiment of the disclosure.
Figure 37:
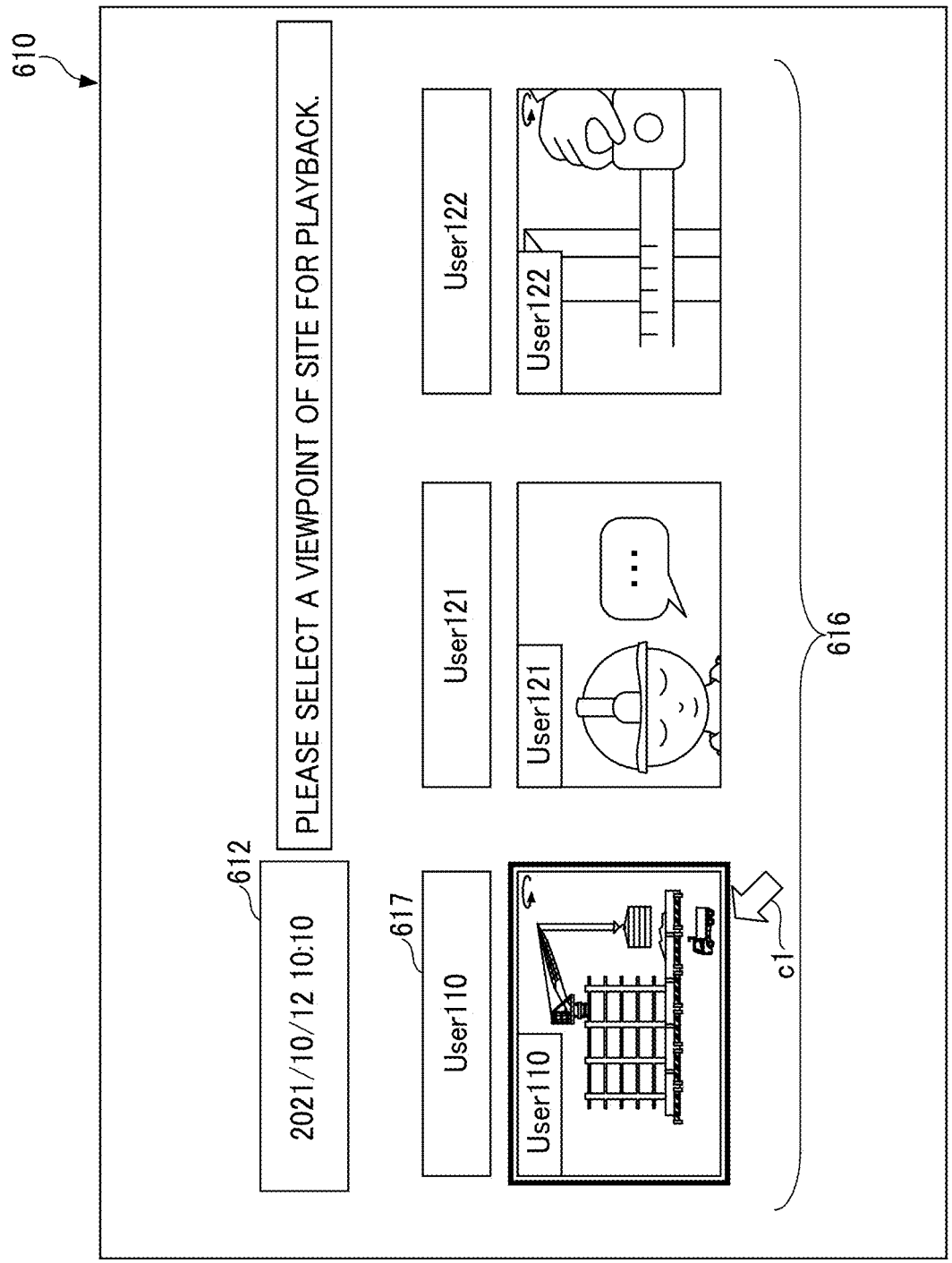
FIG. 37 is a diagram illustrating an example of a site selection screen for selecting a thumbnail related to each site for a display image, according to the exemplary embodiment of the disclosure.

Viewing information stored in the storage 90 including the recorded aide-angle view image is described below with reference to FIGS. 35 to 43. FIG. 35 is a sequence diagram illustrating an example of a process for viewing a wide-angle view image stored in the storage 90 according to a user operation. FIG. 36 is a diagram illustrating an example of a virtual room list screen 600 displayed by connecting the communication terminal 30 to the information processing system 50 according to a user operation. FIG. 37 is a diagram illustrating an example of a site selection screen for selecting a thumbnail related to each site for a display image.

S301: In a state in which a user has made the communication terminal 30 (an example of a display terminal) to access the information processing system 50, the communication terminal 30 receives an input of authentication information (a user ID, a password) from the user, and the communication terminal 30 receives an input operation for a request for login to a tenant to which the user belongs. The reception unit 32 of the communication terminal 30 receives the input operations.

S302: The communication unit 31 of the communication terminal 30 transmits a login request to the information processing system 50 by specifying authentication information. The communication unit 51 of the information processing system 50 receives the login request, and the authentication unit 55 performs authentication based on the authentication information. The following description of the present embodiment is given on the assumption that the authentication is successful.

S303: The screen generation unit 52 of the information processing system 50 generates the virtual room list screen 600 in which the wide-angle view images are sorted by a predetermined category, and the communication unit 51 transmits screen information of the generated virtual room list screen 600 to the communication terminal 30. Specifically, the virtual room list screen 600 is generated in order to display a list of sorted items as selectable candidates that are sorted based on the image management information stored in the image management information storage unit 5001 in FIG. 14A and FIG. 14B and the information registered in the virtual room information storage unit 5002 in FIG. 15A, and the tenant information storage unit 5003 in FIG. 15B. In the example of FIG. 36, a category of virtual room is used as an example to generate the virtual room list screen 600 including a list (sorted item list 604) in which data including a wide-angle view image stored in the storage 90 is sorted according to which virtual room the data is associated with.

S304: The communication unit 31 of the communication terminal 30 receives the screen information of the virtual room list screen 600, and the display control unit 33 displays the virtual room list screen 600 on the display 306 of the communication terminal 30. Specifically, selectable sorted items (virtual rooms associated with dates in the example) are displayed in a header field 601 of FIG. 36. The communication terminal 30 receives a user input operation of selecting a sorted item (in this example, a virtual room associated with a specific date) associated with a wide-angle view image desired to be viewed by the user. The reception unit 32 receives the input operation.

The virtual room list screen 600 is described in detail below.

The virtual room list screen 600 is generated based on the image management information stored in the image management information storage unit 5001 in FIGS. 14A and 14B and the information stored in the virtual room information storage unit 5002 in FIG. 1.5A, the tenant information storage unit 5003 in FIG. 15B, and the viewpoint-related information storage unit 5004. When a user logs in to a tenant, a selection screen for selecting a sorted item from selectable sorted items sorted by information associated with the tenant is displayed. The user may not have to log in to a tenant, and the user may log in using a user account that is not associated with a tenant. In such a case, a selection screen classified based on data to which the login user has access authority among pieces of image management information stored in the image management information storage unit 5001 may be displayed. The access authority of the user to the image management information may be updated by connecting a predetermined communication terminal 30 to the information processing system 50 and transmitting an update instruction of the access authority from the communication terminal 30 to the information processing system 50. Various sort for obtaining selectable sorted items can be possible by applying one or more categories for sorting. In the description of the example of FIG. 36, a selection screen including the sorted items sorted based on the virtual room ID at the time of image capturing stored in the image management information storage unit 5001 as an example of category for sorting is described.

The virtual room list screen 600 includes the header field 601 and an image selection field 602.

In the header field 601, a login user name 603 and a sorted item list 604 are displayed. The login user name 603 is information for identifying a user who has logged in to the tenant, and includes a user name and a user ID. The sorted item list 604 is a list of items sorted based on information stored in the image management information storage unit 5001. In the description of the present embodiment, as an example of sorting, sorting can be performed based on which virtual room is the data stored in the storage 90 and including recorded data of a recorded wide-angle view image associated with. For example, in which virtual room is each wide-angle view image included in the recorded data captured during the remote communication can be identified by the virtual room ID at the time of image capturing stored in the image management information storage unit 5001.

"At the time of capturing" can also be rephrased with "at the time of recording," because recording is also performed in parallel. In the sorted item list 604 of FIG. 36, in addition to the virtual room name in relation to which the remote communication has been performed, the date on which the remote communication has been performed (corresponding to the date and time information on which the image is captured) is displayed in association with the virtual room name. In the example of FIG. 36, the remote communication is performed in a virtual room having the virtual room name of "A CONSTRUCTION SITE" on the date of "2021/10/12" and the images captured during the remote communication are stored in the category of the virtual room name of "A CONSTRUCTION SITE" on the date of "2021/10/12."

In a case where information of an image captured on a date other than the date "2021/10/12" in the virtual room having the virtual room name of "A CONSTRUCTION SITE" is stored in the image management information storage unit 5001, a sorted selection items in relation which the date other than the date "2021/10/12" (for example, 2021/10/13) and the virtual room name of "A CONSTRUCTION SITE" are combined can be displayed in the sorted item list 604.

The user can edit the virtual room name by accessing the virtual room information storage unit 5002 of the information processing system 50 using the communication terminal 30, and the virtual room name is set when the virtual room is set and stored in the virtual room information storage unit 5002. By referring to the virtual room information storage unit 5002 based on the virtual room ID at the time of image capturing stored in the image management information storage unit 50001, the corresponding virtual room name can be specified. The date can be specified from the imaging date and time of the image management information stored in the image management information storage unit 5001 (the first date and time if there are a plurality of imaging dates and times). Although the example of FIG. 36 is sorted based on the category of virtual room, sorting may be performed based on the category of date, date and time, imaging request user information, image capturing device information, or data name. In addition, sorting may be performed based on a combination of two or more of the categories.

The image selection field 602 includes image management information 605 and thumbnail images 606. When the user selects a sorted item (virtual room in the example) from the sorted item list 604, the thumbnail images 606 are displayed in the image selection field 602 as information of wide-angle view image recorded during the remote communication in the selected virtual room. In the example of FIG. 36, the sorted item of the date "2021/10/12" and the virtual room name "A CONSTRUCTION SITE" indicates in a state of being selected. In the example of FIG. 36, sorting is performed based on a combination of the categories of virtual room and date in relation to the remote communication that is performed in the virtual room, but the sorted item list 604 may be generated by performing sorting based on the category of virtual room regardless of the date, or the sorted item list 604 may be generated by performing sorting based on the category of date alone. The thumbnail images 606 may be wide-angle view images shot at any timing from the start of recording to the end of recording.

The thumbnail image 606 is displayed such that the viewpoint in the wide-angle view image specified by the viewpoint information coincides with the center of the thumbnail image. Accordingly, the user who is viewing the virtual room list screen 600 can view the thumbnail image with the viewpoint information that the imaging request user desires to share. The viewpoint does not necessarily coincide with the center, and display may be based on the viewpoint included in a range near the center.

The virtual room list screen is generated by a process described below.

A tenant ID of the tenant to which the user ID authenticated in Step S302 belongs is identified by referring to the tenant information storage unit 5003 illustrated in FIG. 15B. In the tenant information storage unit 5003, a virtual room is registered for each tenant. The wide-angle view image captured by the image capturing device associated with the virtual room and stored, in response to a request from a participant during remote communication performed in the virtual room is stored in the image management information storage unit 5001 in association with the virtual room ID of the virtual room in which the remote communication is performed, the imaging request user (participant) who has requested recording, the imaging date and time, the image capturing device, the viewpoint information, and the storage location.

The "imaging request user" in the description of the present embodiment can also be referred to as a "recording request user," because recording is also performed in parallel with imaging. Accordingly, the screen generation unit 52 identifies the virtual room TD associated with the tenant ID of the tenant to which the logged-in user belongs and the corresponding virtual room name, by referring to the tenant information storage unit 5003. As described above, the virtual room name to be displayed in the sorted item list 604 illustrated in FIG. 36 can be specified.

In addition, when the date of image capturing is displayed so as to be combined with the sorted virtual room associated with the stored data as illustrated in FIG. 36, the screen generation unit 52 can specify the data ID associated with each specified virtual room ID by referring to the image management information storage unit 5001.

Further, the screen generation unit 52 can specify the information of the imaging date and time associated with the specified data ID by referring to the image management information storage unit 5001. Since the screen generation unit 52 can specify the date from the information of the imaging date and time specified as described above, the screen generation unit 52 can generate the virtual room list screen 600 in which the specified date is displayed in association with the virtual room displayed in the sorted item list 604 as illustrated in FIG. 36. For example, when multiple wide-angle view images captured in the virtual room having the name of "A CONSTRUCTION SITE" is stored and the imaging dates are different from each other, the wide-angle view images can be displayed as different sorted items in the sorted item list by combining the category of date for sorting. For example, there is a case where works performed at a site where a wide-angle view image is captured may vary in day units depending on a schedule. In such a case, this is useful to narrow down the selectable candidates of wide-angle view image based on a day when each work is performed.

Similarly, with respect to the category of virtual room, information of imaging request user, image capturing device, or storage location may be combined and displayed, in alternative to the information of date, by referring to the image management information storage unit 5001.

Displaying as described above is useful to narrow down selectable candidates of wide-angle view image based on a condition such as an imaging request user, an image capturing device, or a storage location even if the wide-angle view images are captured at the same site. In addition, regarding such a condition for sorting, a single condition, or a single category, may be used for sorting to generate the sorted item list 604, or two or more conditions, or categories, combined together may be used for sorting to generate the sorted item list 604 as illustrated in FIG. 36. Although the screen generation unit 52 generates the virtual room list screen 600 (sorted item list 604) in the example, the screen generation unit 52 may transmit sorting information to be used for displaying the sorted item list 604 (in the example, virtual room names and dates that matches the sorting conditions) to the communication terminal 30 via the communication unit 51 to cause the communication terminal 30 to generate the virtual room list screen 600 in which the sorted item list 604 based on the sorting information is arranged.

Accordingly, the screen information transmitted in Step S303 may include the virtual room list screen 600 generated by the screen generation unit 52, or may include the sorting information to be to be used for displaying the sorted item list 604 in alternative to the generated screen. Further, both the generated virtual room list screen 600 and the sorting information to be used for displaying the sorted item list 604 may be included in screen information.

The process from Step S305 of FIG. 35 is described below.

S305: The communication unit 31 of the communication terminal 30 designates identification information for specifying a category selected by the user (in the example, virtual room ID of the selected virtual room and date information) as a condition, and transmits a wide-angle view image list request, which is a request for a list of wide-angle view images, to the information processing system 50. The conditions such as the virtual room ID and the date are not necessarily specified at the same time, but may be specified separately and the request may be transmitted.

S306, S307: The communication unit 51 of the information processing system 50 receives the wide-angle view image list request. The screen generation unit 52 specifies the data ID associated with the virtual room ID included in the condition designated in the request, in the image management information storage unit 5001. Further, since the date is also designated as a condition in the received request in the example, a data ID associated with the date of the imaging date and time that matches the date specified in the image management information storage unit 5001 is specified from among the specified data IDs. With respect to the data ID that matches the condition designated as described above, information on the storage location of the associated data in the image management information storage unit 5001 is obtained. The screen generation unit 52 accesses each storage location of the storage 90 using the obtained information on the storage location via the communication unit 51, and acquires the wide-angle view image and the viewpoint information from the storage 90. The screen generation unit 52 may acquire and use the viewpoint information stored in the image management information storage unit 5001.

S308: The screen generation unit 52 of the information processing system 50 generates a thumbnail image using each of the wide-angle view images and the viewpoint information acquired in Steps S306 and S307. Further, image information (for example, information on an image capturing device, an imaging request user, and a participant in the virtual room) associated with the date ID that matches the condition designated in Step S305 is acquired from the image management information storage unit 5001. Then, the virtual room list screen 600 on which the thumbnail images and image information are arranged is generated based on the acquired image information and the generated thumbnail images. In the example, the virtual room list screen 600 is generated by the screen generation unit 52. However, in some embodiments, the screen generation unit 52 transmits the thumbnail images and the image information to the communication terminal 30 via the communication unit 51, and then the virtual room list screen 600 may be generated based on the thumbnail images and the image information by communication terminal 30.

S309: The communication unit 51 transmits screen information of the virtual room list screen 600 to the communication terminal 30. The screen information may be virtual room list screen 600 generated in Step S308, or may be information to be used by the communication terminal 30 to generate the virtual room list screen 600, such as the thumbnail images or the image information generated or acquired in Steps S306 to S308. The screen information also includes identification information (in the example, the date ID) for identifying the data corresponding to each of the generated thumbnail images specified in Steps S306 and S307.

S310: The communication unit 31 of the communication terminal 30 receives the screen information of the virtual room list screen 600, and the display control unit 33 displays the updated virtual room list screen 600 based on the received screen information. When the received screen information is information to be used by the communication terminal 30 to generate the virtual room list screen 600, the communication terminal 30 executes screen update processing for updating the virtual room list screen 600 displayed by the communication terminal 30 based on the received screen information. Specifically, the image selection field 602 illustrated in FIG. 36 is updated based on the image information and thumbnail images associated with the selected sorted item. The communication terminal 30 receives a user input operation for selecting a thumbnail image of a specific wide-angle view image desired to be viewed by playback and display, from the updated image selection field 602. The reception unit 32 receives the input operation.

S311: The communication unit 31 of the communication terminal 30 specifies a wide-angle view image data ID corresponding to the thumbnail image of the specific wide-angle view image selected by the user based on the input operation received in Step S310, designates the data ID of the specified wide-angle view image, and transmits a request for the wide-angle view image to the information processing system 50.

S312, S313: The communication unit 51 of the information processing system 50 receives the request for the wide-angle view image. The screen generation unit 52 acquires, from the image management information storage unit 5001, information (for example, a URL) of a storage location of data associated with the wide-angle view image data ID designated in the request, and acquires the viewing start date and time and the participant ID. Further, based on the wide-angle view image data ID, the viewing start date and time, and the participant ID, the screen generation unit 52 acquires a storage location information of each viewpoint information, which is associated with the above-described dataset, from the viewpoint-related information storage unit 5004. Then, the screen generation unit 52 acquires the wide-angle view image and the viewpoint information from the storage 90 using the information of the storage location via the communication unit 51.

S314: The communication unit 51 transmits the specific wide-angle view image and the viewpoint information acquired in Step S313 to the communication terminal 30.

S315: In the communication terminal 30, the screen generation unit 37 generates (creates) a thumbnail image of a predetermined area specified by each viewpoint information in a range of the specific wide-angle view image, thereby generating a site display image selection screen 610 as illustrated in FIG. 37. Then, the display control unit 33 displays the site display image selection screen 610 on the display 306 of the communication terminal 30. The thumbnail image of the predetermined area may be generated not by the communication terminal 30 but by the information processing system 50 and transmitted to the communication terminal 30 in Step S314.

The site display image selection screen 610 includes a recorded (streamed) wide-angle view image, date and time information 612, and thumbnail images 616 related to predetermined-area images displayed at each site. Furthermore, above each thumbnail image 616, a corresponding user ID 617 of a user who viewed at the time of recording at each site is indicated. Accordingly, the user who views the site display image selection screen 610 at the time of playback can specify the user who has displayed the predetermined-area image which is the original of each thumbnail image. Each thumbnail image may be an image in which a virtual viewpoint can be moved (changed).

S316: When the user performs an input operation of selecting a thumbnail image based on specific viewpoint information using a cursor c1 in FIG. 37, the reception unit 32 receives the input operation of selecting the thumbnail image.

Figure 39:
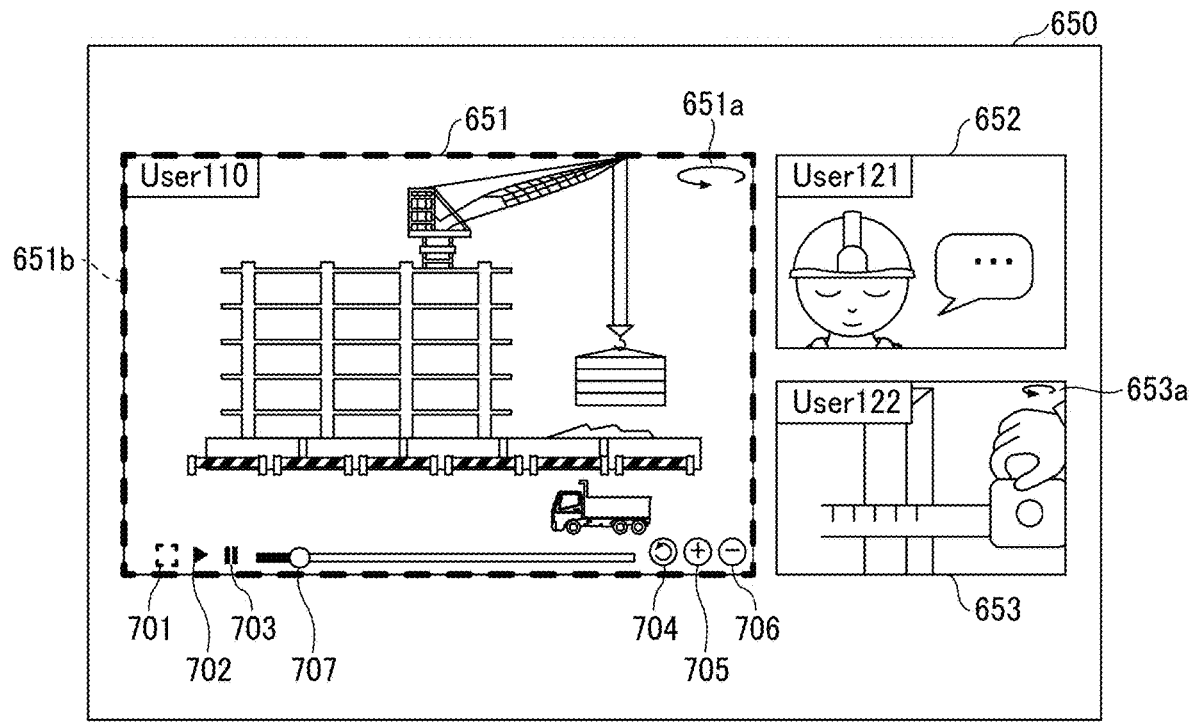
FIG. 39 is a diagram illustrating an example of a playback screen including a display area (display frame) indicating a predetermined area at the time of recording, according to the exemplary embodiment of the disclosure.

S317: The screen generation unit 37 generates a playback screen 650 as illustrated in FIG. 39. FIG. 39 is a diagram illustrating an example of a playback screen including a display area (display frame) 651*b* indicating a predetermined area at the time of recording. The playback screen 650 includes predetermined-area images 651 and 653 of the specific wide-angle view image and a planar image 652 based on all the thumbnail images selected in Step S316.

Both the predetermined-area images 651 and 653 and the planar image 652 are played back and displayed on the playback screen 650 that is a single screen. The predetermined-area images 651 and 653 and the planar image 652 being displayed have the same playback elapsed times. Since the imaging start date and time information is managed in the image management information illustrated in FIG. 14A and FIG. 14B and the viewing start date and time information is managed in the viewpoint-related information illustrated in FIG. 16, the screen generation unit 37 can generate a generated screen on which the images having the same playback elapsed times are displayed.

In the following, a case where three thumbnail images are selected on the site display image selection screen 610 of FIG. 37 is described. The thumbnail images of User 110 and User 122 in FIG. 37 and the predetermined-area images 651 and 653 in FIG. 39 are images from which the virtual viewpoint can be changed.

As illustrated in FIG. 39, on the playback screen 650, a predetermined-area image 651 of User 110 is displayed as a main display image; and a planar image of User 121 and a predetermined-area image 653 of User 122 are displayed as sub display images. The main display image and the sub display images are displayed on the same screen in a display manner that the main display image is larger than each of sub display images. Among the display images related to the thumbnail images selected in FIG. 37, an image displayed as the main display image in FIG. 39 may be determined at random, or may be a display image related to the thumbnail image selected first in FIG. 37. In the case of the predetermined-area image, display change icons 651a and 653a indicating that the predetermined-area image can be changed and displayed by moving the virtual viewpoint are displayed.

In addition, below the main display image (the predetermined-area image 651 in FIG. 39), a full-screen display icon 701 for switching to full-screen display, a playback display icon 702 for collectively playing back and displaying all the images (the predetermined-area image 651, the planar image 652, and the predetermined-area image 653 in FIG. 39) on the playback screen 650, and a pause icon 703 for collectively pausing all the images on the playback screen 650 are displayed. Further, on the lower side of the main display image in the case where the main display image is the predetermined-area image, a viewpoint reset icon 704 for resetting the predetermined-area image after the virtual viewpoint is moved to the original predetermined-area image represented based on the viewpoint information is displayed. Below the main display image, a zoom in icon 705 for enlarging and displaying the main display image with reference to the center of the main display image and a zoom out icon 706 for reducing and displaying the main display image with reference to the center of the main display image are displayed. In the case of zoom in, or enlarging, or zoom out, or reducing, that is not performed based on the center of the display screen, the cursor c1 is used to zoom in or zoom out. Further, on the lower side of the main display image, a playback bar (seek bar) 707 for collectively displaying all the images having the same predetermined playback elapsed times on the playback screen 650 is displayed. When the reception unit 32 receives a user operation of pressing of any of the icons 701 to 706 or a user operation of moving the playback bar 707, the display control unit 33 executes the corresponding display processing.

In addition, around the main display image, a display area (display frame) 651b indicating a predetermined area related to the viewpoint information is also displayed based on the viewpoint information for specifying the predetermined area viewed at the time of recording.

S318: When the user performs an input operation with respect to screen operation of the playback screen 650 illustrated in FIG. 39 with a mouse, the reception unit 32 receives the input operation with respect to the screen operation.

S319: The display control unit 33 changes the display of the playback screen based on the input operation with respect to the screen operation received by the reception unit 32.

Figure 38:
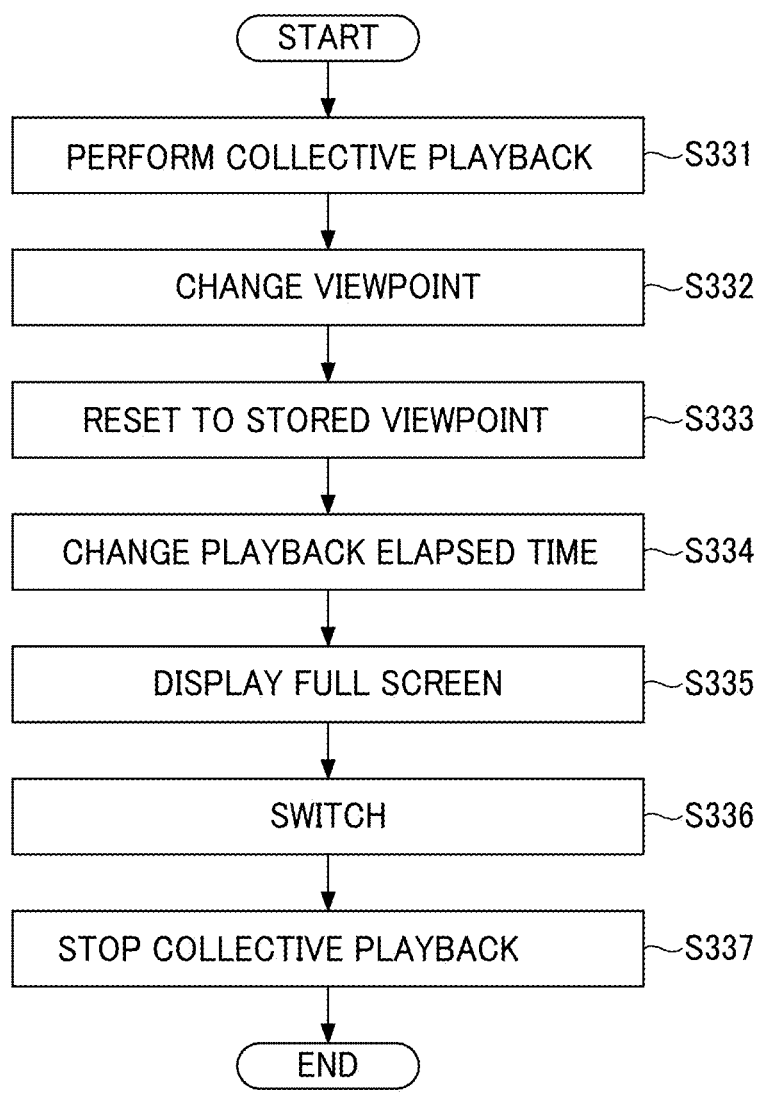
FIG. 38 is a flowchart illustrating an example of a process of changing a playback screen, according to the exemplary embodiment of the disclosure.

An example of the screen operation is described in detail with reference to FIGS. 38 to 43. FIG. 38 is a flowchart illustrating an example of a process of changing the playback screen. The processing steps of the process of the flowchart of FIG. 38 may be performed in a different order.

S331: For example, when the user inputs an operation for collective playback by pressing the playback display icon 702 on the playback screen 650 illustrated in FIG. 39, the reception unit 32 receives the input operation input for collective playback Then, in response to the received input operation, the display control unit 33 displays playbacks of the predetermined-area image 651 and 653 and the planar image 652, which are images for playback, simultaneously and collectively based on the recorded image. Each of the predetermined-area images 651 and 653 is an image based on the viewpoint information for specifying the predetermined area in the wide-angle view image displayed by a specific communication terminal at the time of recording in streaming of the image. In this case, the display area (display frame) 651b indicating the predetermined area related to the viewpoint information is also displayed around the main display image on the basis of the viewpoint information for specifying the predetermined area viewed at the time of streaming of the image and recording. Each of the predetermined-area images 651 and 653 may not be an image based on the viewpoint information but may be an image of an arbitrary predetermined area in the corresponding wide-angle view image.

Figure 40:
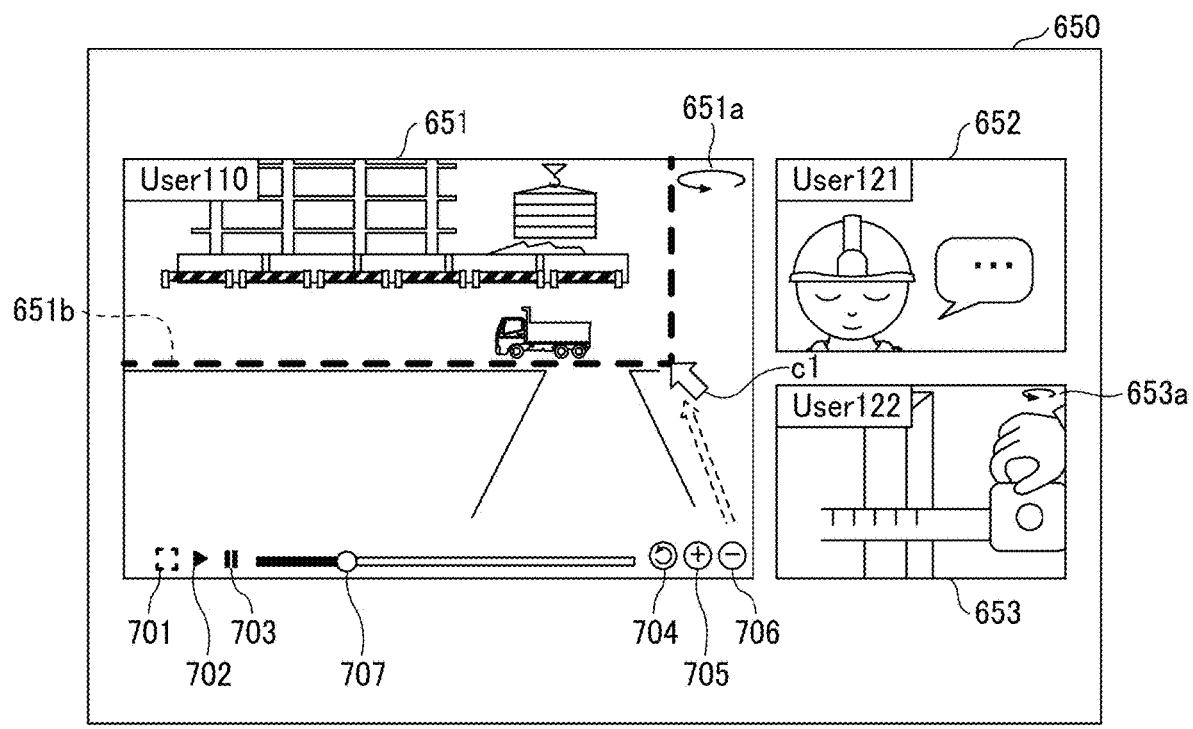
FIG. 40 is a diagram illustrating an example of a play back screen on which a position of a display area (display frame) is changed accordance to a change of a virtual viewpoint, according to the exemplary embodiment of the disclosure.

S332: When the user performs an input operation of moving the cursor c1 diagonally to the upper left as illustrated in FIG. 40, by using, for example, a mouse with respect to the predetermined-area image 651 of FIG. 39, during the playback display according to the processing of Step S331, the reception unit 32 receives the input operation of moving the virtual viewpoint, and the display control unit 33 displays the predetermined-area image 651 as illustrated in FIG. 40 according to the received input operation. In this case, the display control unit 33 also moves the display area (display frame) 651b indicating the predetermined area related to the viewpoint information on the basis of the viewpoint information for specifying the predetermined area viewed at the time of recording. Accordingly, even when the user moves the virtual viewpoint, the predetermined area to which the viewer paid attention at the time of recording can be figured.

S333: For example, when the user performs an input operation of pressing the viewpoint reset icon 704 on the playback screen 650 illustrated in FIG. 40, the reception unit 32 receives the input operation of resetting to the recorded viewpoint information, and the display control unit 33 returns to the display of the predetermined-area image 651 illustrated in FIG. 39 according to the received input operation. At this time, when another virtual viewpoint in another predetermined-area image (in the example, the predetermined-area image 653) also has been moved, the display control unit 33 may simultaneously and collectively reset the current predetermined-area images to the original predetermined-area images for displaying.

Figure 41:
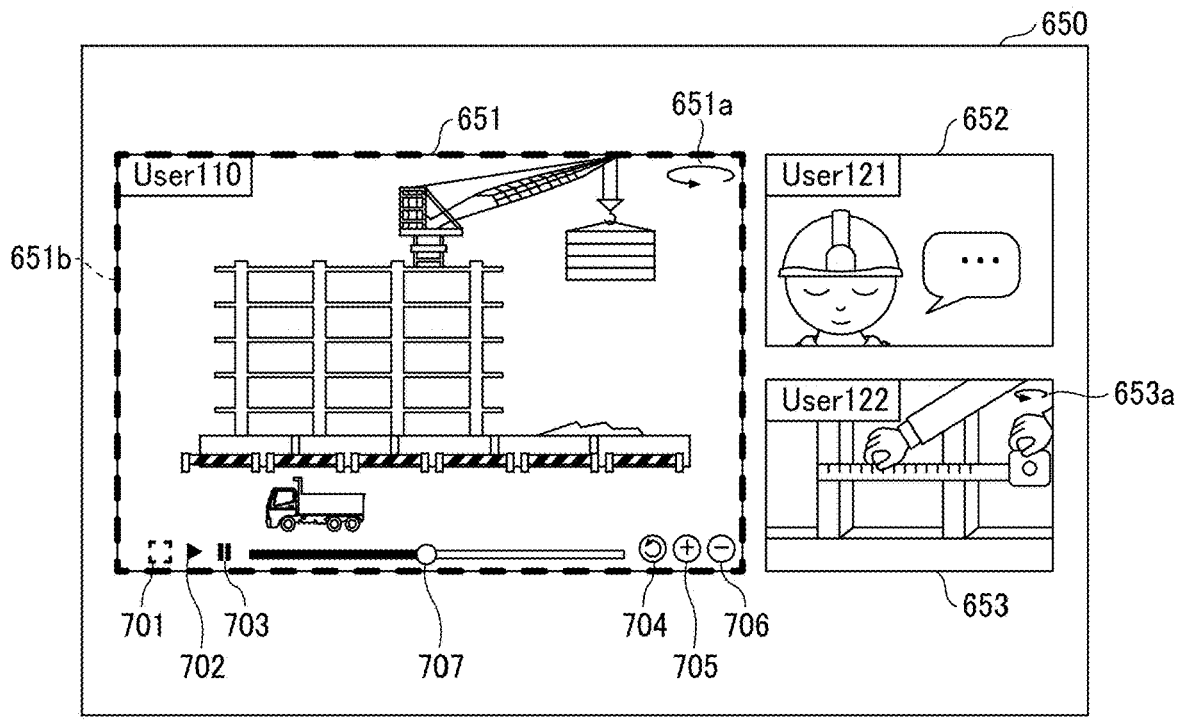
FIG. 41 is a diagram illustrating an example of a playback screen on which a video after a playback elapsed time is changed is displayed according to the change, according to the exemplary embodiment of the disclosure.

S334: For example, when the user performs an input operation of moving the playback bar 707 with the cursor c1 as illustrated in FIG. 41, the reception unit 32 receives the input operation of collective change of the playback elapsed times, and in response to the received input operation, the display control unit 33 displays playbacks of all the images having the playback elapsed times corresponding to the moved playback bar 707 simultaneously and collectively. In the example, all the images are the predetermined-area images 651 and 653 and the planar image 652 on the playback screen 650 as illustrated in FIG. 41.

Figure 42:
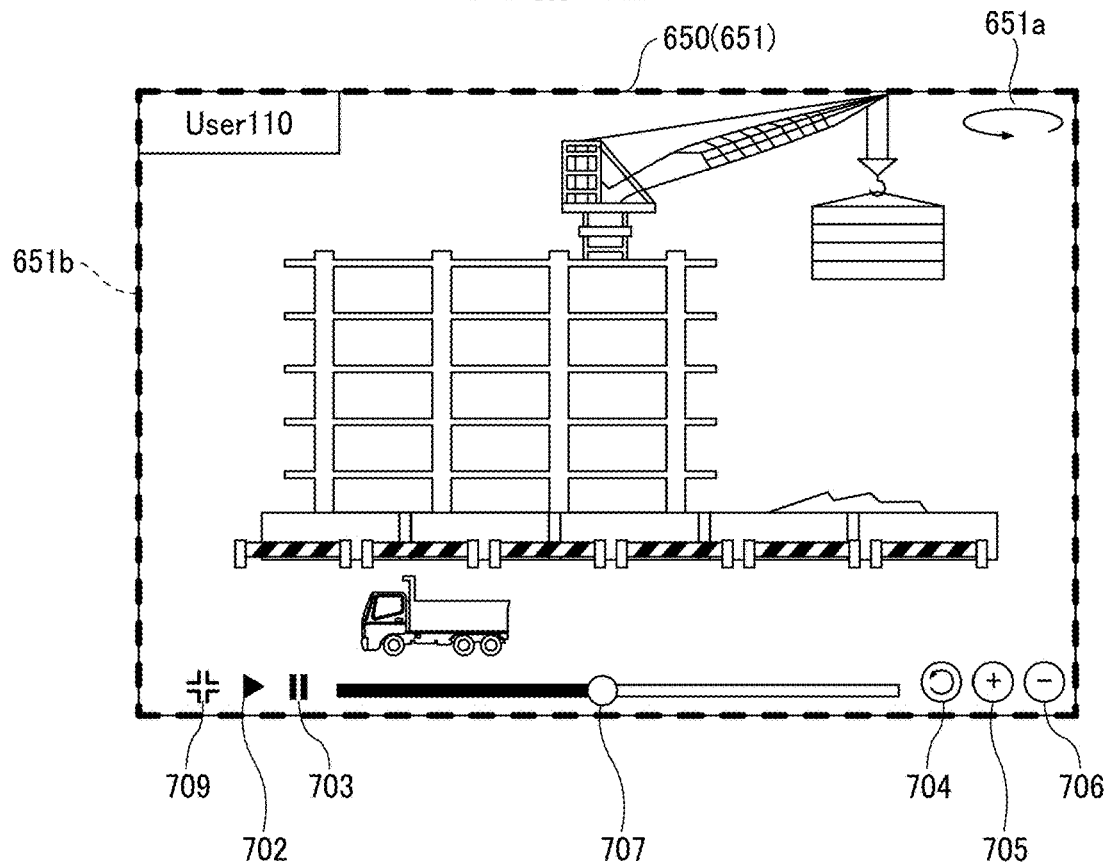
FIG. 42 is a diagram illustrating an example of a playback screen that is displayed as full-screen display, according to the exemplary embodiment of the disclosure.

S335: For example, when the user performs an input operation of pressing the full-screen display icon 701 on the playback screen 650 illustrated in FIG. 41, the reception unit 32 receives the input operation indicating full-screen display, and in response to the received input operation, the display control unit 33 displays the predetermined-area image 651, which is the main display screen, on the entire playback screen 650 as illustrated in FIG. 42.

Figure 43:
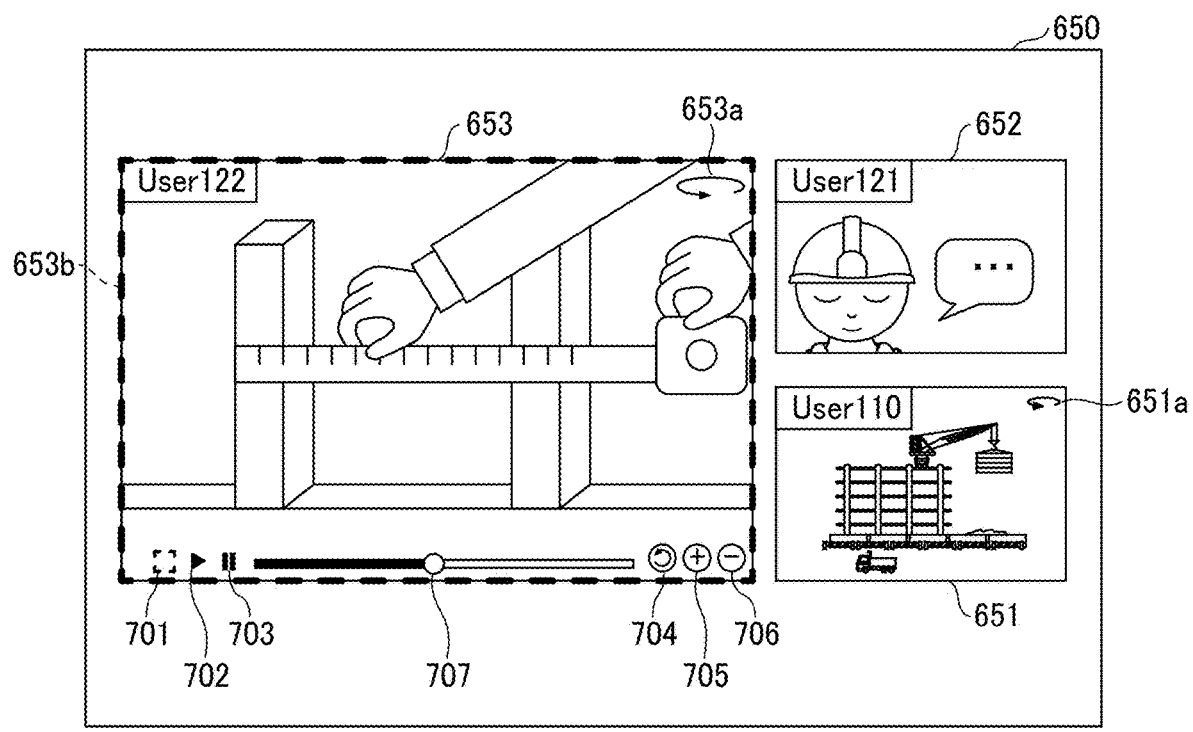
FIG. 43 is a diagram illustrating an example of a playback screen on which display positions of sites are changed, according to the exemplary embodiment of the disclosure.

S336: For example, when the user performs an input operation of selecting one of the sub-display screens (in the example, the predetermined-area image 653) with the cursor c1 on the playback screen 650 illustrated in FIG. 41, the reception unit 32 receives the input operation indicating switching display of the main display and display of the sub-display, and in response to the received input operation, the display control unit 33 displays the predetermined-area image 653 as the main display image and the predetermined-area image 651 as the sub-display image as illustrated in FIG. 43. In this case, a display area (display frame) 653b indicating the predetermined area related to the viewpoint information is also displayed around the new main display image, based on the viewpoint information for specifying the predetermined area viewed at the time of recording. The display area (display frame) 653b can be moved similarly to the display area (display frame) 651b as illustrated in FIG. 40.

S337: For example, when the user performs an input operation of pressing the pause icon 703 with the cursor c1 on the playback screen 650 illustrated in FIG. 43, the reception unit 32 receives the input operation indicating the pause of the collective playback, and the display control unit 33 temporarily stops displaying the playback of all the images (in the example, the predetermined-area images 651 and 653 and the planar image 652) on the playback screen 650 simultaneously and collectively according to the received input operation.

As described above, the process illustrated in FIG. 38 is performed.

Application Example of Communication System in Relation to Remote Medical Care

Figure 44:
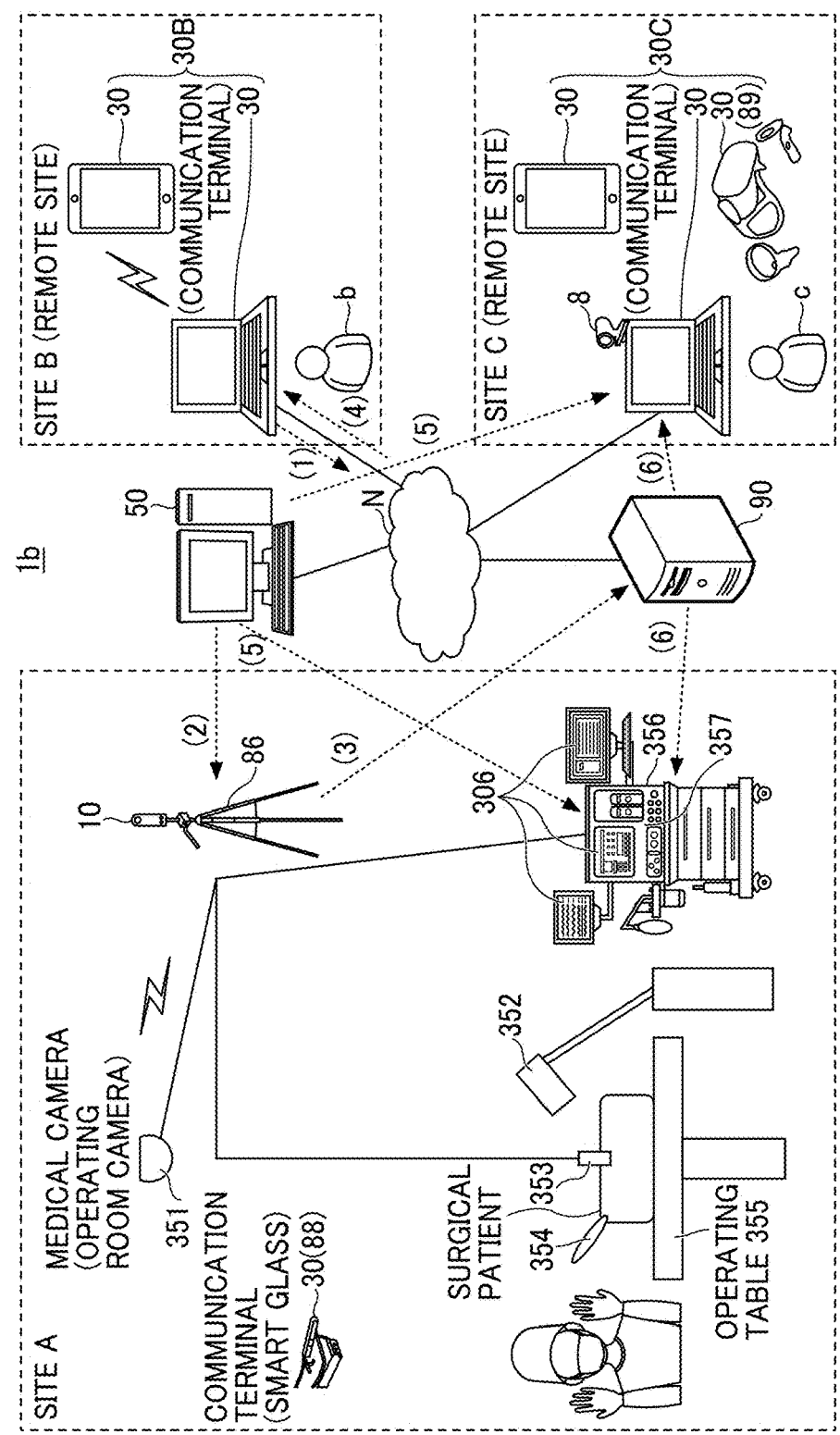
FIG. 44 is a diagram illustrating an example of remote communication in which the communication system is applied to remote medical care, according to the exemplary embodiment of the disclosure.
Figure 45:
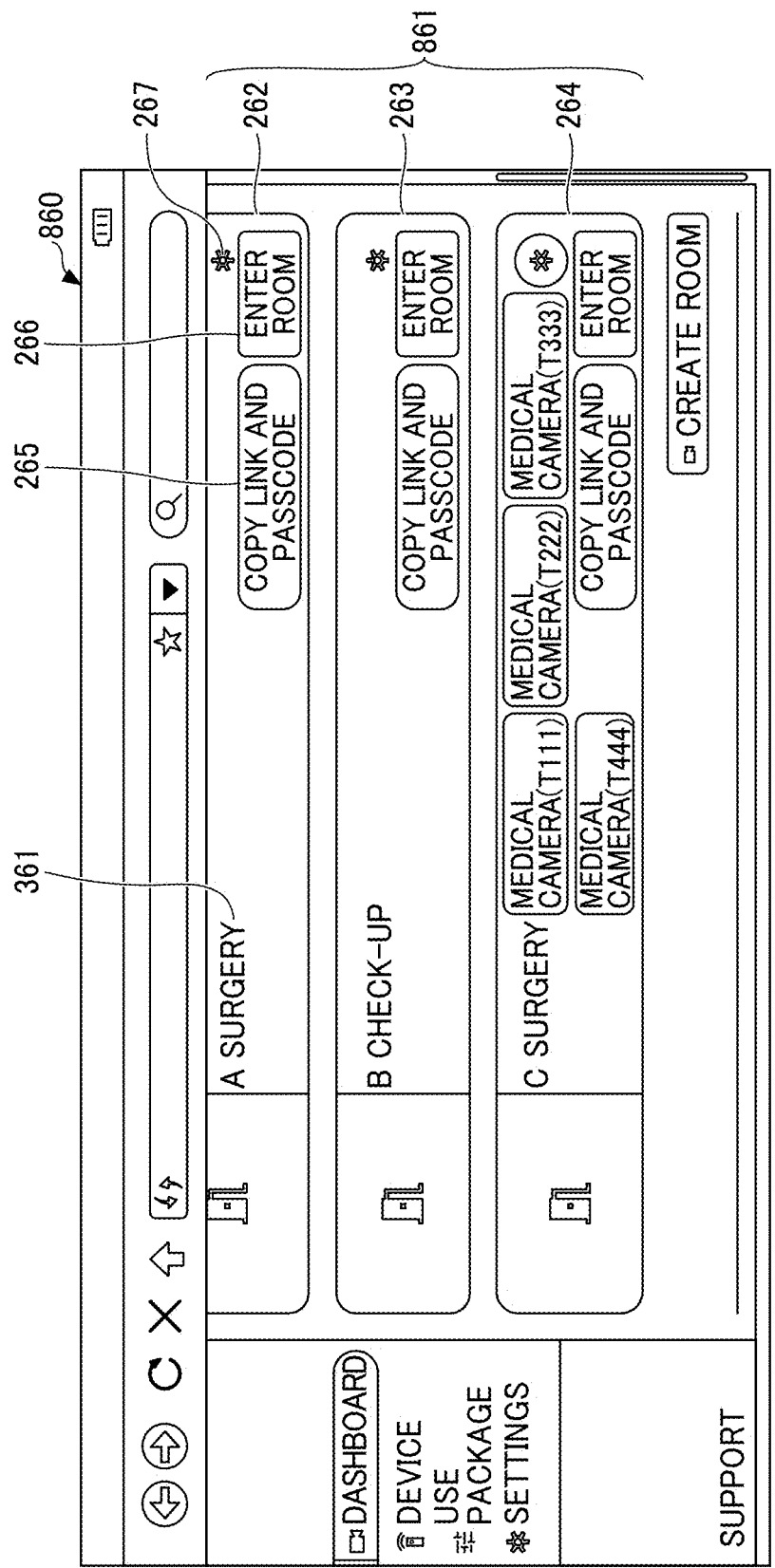
FIG. 45 is a diagram illustrating an example of a virtual room association screen, which is a screen for associating an image capturing device with a virtual room in the case of remote medical care, according to the exemplary embodiment of the disclosure.
Figure 46:
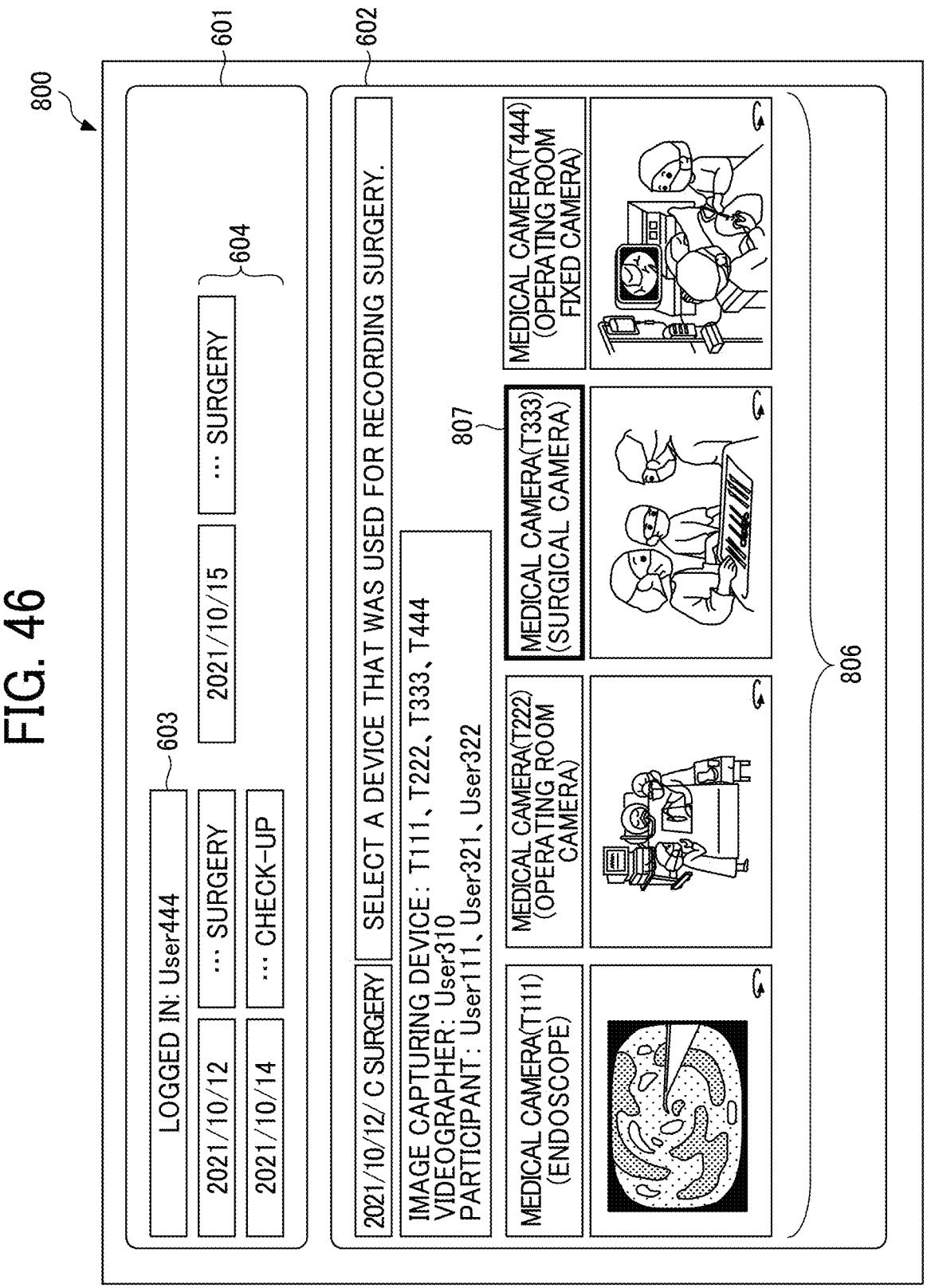
FIG. 46 is a diagram illustrating an example of a virtual room list screen displayed by connecting the communication terminal to the storage according to a user operation, according to the exemplary embodiment of the disclosure.
Figure 47:
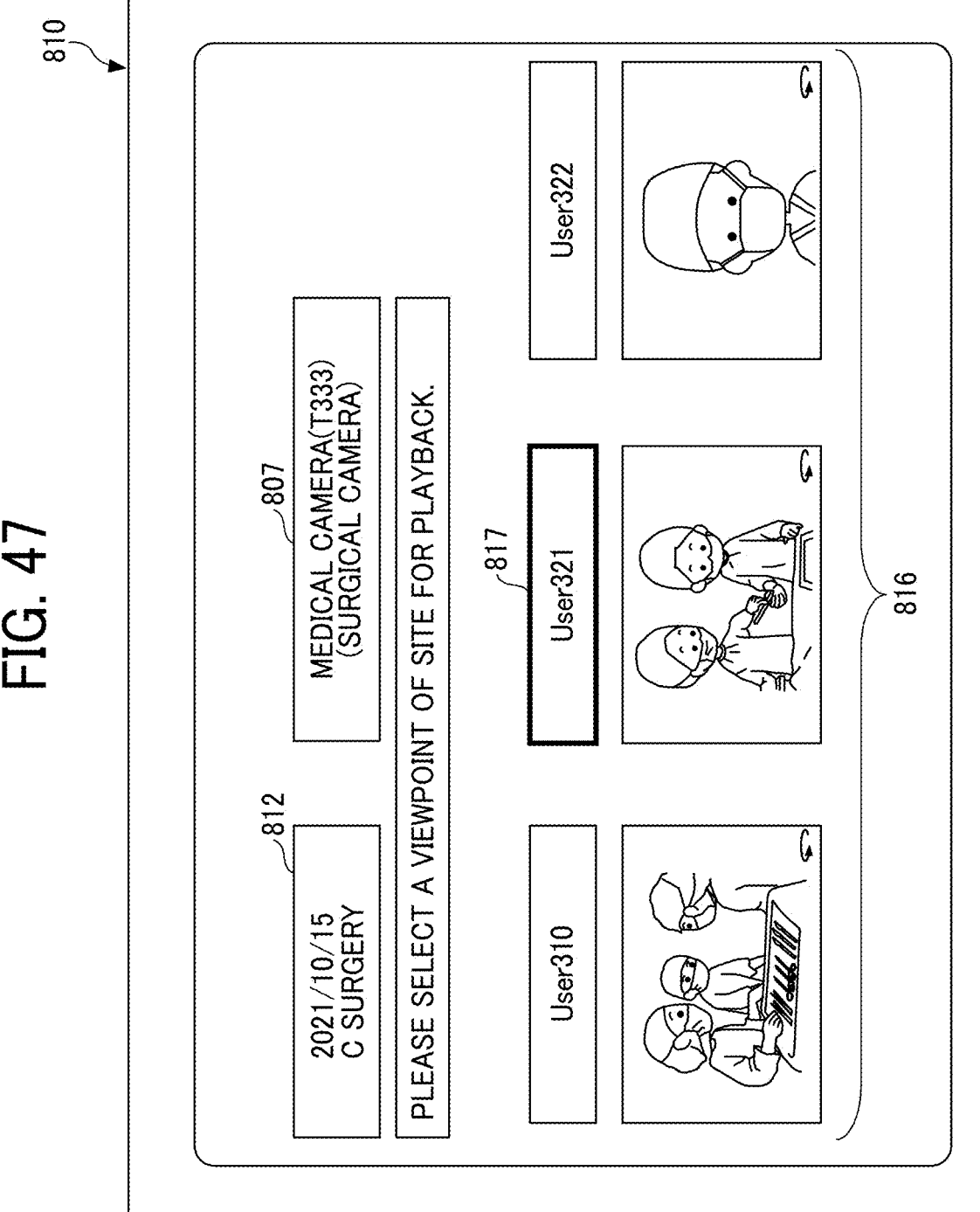
FIG. 47 is a diagram illustrating an example of a site selection screen for selecting a thumbnail related to each site for a display image, according to the exemplary embodiment of the disclosure.

FIG. 44 is a diagram illustrating an example of remote communication in which the communication system is applied to remote medical care. FIG. 45 is a diagram illustrating an example of a virtual room association screen, which is a screen for associating an image capturing device with a virtual room in the case of remote medical care. FIG. 46 is a diagram illustrating an example of a virtual room list screen displayed when a user connects a communication terminal to a storage. FIG. 47 is a diagram illustrating an example of a site display image selection screen for selecting a thumbnail related to each site for a display image.

In the description of a communication system 1b, difference between FIG. 44 and FIG. 1 is described. In the example of FIG. 44, a site A is an operating room, processing of (1) to (6) may be substantially the same as that in FIG. 1. In FIG. 44, a patient is placed on an operating table 355 and undergoes an operation by a medical person such as a doctor. The medical person (corresponding to a user) performs surgery on the patient using various surgical tools 354 such as forceps and a scalpel. In addition, the medical person can wear the smart glasses 88 that can transmit an image of a surgical field of the medical person to the communication network N. In the operating room, various cameras such as an operating room camera 351, a surgical camera 352, and an endoscope 353 are arranged as image capturing devices each of which is substantially the same as the image capturing device 10. Further, each of such the image capturing devices may have an image capturing function of capturing an image for generating a wide-angle view image. Each of the image capturing devices and the smart glasses 88 in the operating room are described as an example to be associated with the virtual room.

In the operating room, a main unit 356 for monitoring vital signs of a patient, operation statuses of medical devices, and the like is arranged. The main unit 356 corresponds to the communication terminal 30 according to the present embodiment. The communication terminal 30 (main unit 356) in the operating room may also have a function of receiving images from the endoscope 353 and the surgical camera 352 in addition to the functions described in relation to FIG. 1. The communication terminal 30 can display a received video including a wide-angle view image on the display 306, and transmit the video to the information processing system 50 as the video of the site of the communication terminal 30. An operation panel 357 is an input interface that receives various operations, and the medical person may operate a device in the operating room via the operation panel 357. The endoscope 353, the operating room camera 351, and the surgical camera 352 may directly communicate with the information processing system 50 without going through the communication terminal 30. As described above, since the plurality of image capturing devices 10 can be associated with the same virtual room, a user at the remote site can request recording of a wide-angle view image obtained by cutting out various scenes of the site of the site A. For example, when a video obtained by imaging the inside of the body of the patient is desired to be recorded, a recording request for recording a video with the image capturing device corresponding to the endoscope 353 can be transmitted, and when a state of the entire operating room is desired to be recorded, a recording request for recording a video with the image capturing device corresponding to the operating room camera 351 can be transmitted.

The communication terminal 30 may have a function of an electronic medical record system or may have a function of communicating with the electronic medical record system. The communication terminal 30 may display information of the electronic medical record on the display 306. Further, the storage 90 may be an electronic medical record system. In such a case, the recorded data of the wide-angle view image (and the associated viewpoint information) recorded in response to the recording request may be stored in association with an electronic medical record of the patient by the association processing unit 53. The folder indicated by a storage location of the storage 90 may be classified for each patient or surgery. In addition, the virtual room information storage unit 5002 may store information in which a patient and surgery details are associated with each other. In this way, the viewing screen of the communication terminal 30 can continuously display the information related to the patient and the surgery on.

FIG. 45 is a diagram illustrating an example of a virtual room association screen 860 for associating an image capturing device with a virtual room in the case of remote medical care. In the following description of FIG. 45, differences from FIG. 22 are described.

In the case of remote medical care, the virtual room association screen 860 displays, for example, a list of virtual rooms 861 associated with surgery or medical check-up performed remotely. A medical camera including the image capturing device 10 which is an omnidirectional camera is associated with the site A. The medical camera includes an endoscope (T111), an operating camera used for imaging a surgery field in an operation room, and a camera for imaging a microscope image.

As described above, in the case of a medical site, since a plurality of cameras are used, as illustrated in FIG. 45, in addition to buttons for selecting any one of a plurality of surgeries, buttons for selecting a specific camera among the plurality of cameras (T111, T222, T333, T444) used in each surgery are displayed.

On the virtual room list screen 800 of FIG. 46, which is corresponding to FIG. 36, thumbnail images 806 each of which is for a corresponding camera is displayed. In addition, on a site display image selection screen 810 illustrated in FIG. 47, which is corresponding to FIG. 37, in addition to information on a date and time of recording and identifying a surgery (for example, surgery name) 812, information for specifying a selected camera (camera name) 807 is also displayed. In addition, similarly to FIG. 37, thumbnail images 816 each of which is related to a predetermined-area image displayed at a corresponding site are displayed, and information, such as a user ID 817, on a corresponding user who was viewing at the time of recording at the corresponding site is displayed above each of the thumbnail images 816.

As described above, since the communication system according to the present embodiment stores viewpoint information in association with a wide-angle view image related to a moving image at the time of recording, when the wide-angle view image is played back and displayed after recording, a predetermined area in the wide-angle view image displayed on a specific communication terminal at the time of recording can be played back and displayed. In the above-described embodiment, the display areas (display frames) 651b and 653b based on the viewpoint information are displayed. In other words, the user who views at the time of playback can specify the predetermined area of the wide-angle view image viewed by the different user at the time of recording afterword. As described above, if the user who views the wide-angle view image that has been recorded can grasp which predetermined area of the wide-angle view image has been displayed on a specific communication terminal at a specific site at the time of recording, the user can grasp which predetermined area is watched carefully at the specific site. This may be useful for the user for his or her follow-up thinking or action.

In addition, even when the predetermined-area image to be displayed is changed and displayed by moving the virtual viewpoint by the user who views at the time of playback, the display areas (display frames) 651b and 653b based on the viewpoint information are displayed, and the user can know the predetermined area of the wide-angle view image displayed on the communication terminal at the time of recording, accordingly.

Variation

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, the functional configuration illustrated in FIG. 13 is divided according to main functions in order to facilitate understanding of processing performed by the information processing system 50, the image capturing device 10, and the communication terminal 30. No limitation to a scope of the present disclosure is intended by how the processes are divided or by the name of the processes. The processing of the information processing system 50, the image capturing device 10, and the communication terminal 30 may be divided into more processing units according to the processing content. Also, one processing unit can be divided so as to include more processing units.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The group of apparatuses or devices described above is one example of plural computing environments that implement the embodiments disclosed in this specification. In some embodiments, the information processing system 50 includes multiple computing devices, such as a server cluster. The multiple computing devices are configured to communicate with one another through any type of communication link, including a network, a shared memory, etc., and perform the processes disclosed herein.

The information processing system 50 may share the processing steps described above, for example, Steps in FIGS. 26, 27, 28, and 34, in various combinations. For example, a process performed by a predetermined unit may be performed by a plurality of information processing apparatuses included in the information processing system 50. The information processing system 50 may be integrated into one server device or may be divided into a plurality of devices.

Each of the above-described embodiments can be expressed as the following.

Aspect 1

An information processing system for streaming a moving image includes a streaming unit that performs streaming of a moving image to a communication terminal.

The information processing system further includes a reception unit that receives viewpoint information for specifying a predetermined area transmitted by the communication terminal, in response to the communication terminal displaying a predetermined-area image that is an image of the predetermined area in the wide-angle view image having a wide viewing angle related to a moving image recorded at the time of streaming of the moving image from the information processing system.

The information processing system further includes a transmission unit that transmits the wide-angle view image related to the moving image and the viewpoint information to a display terminal that display, on a display, a playback of a predetermined-area image that is the image of the predetermined area in the wide-angle view image displayed by the communication terminal at the time of streaming of the moving image, based on the viewpoint information.

Aspect 2

An information processing method executed by an information processing system that performs streaming of a moving image includes performing streaming of the moving image to a communication terminal.

The information processing method further includes a reception unit that receives viewpoint information for specifying a predetermined area transmitted by the communication terminal, in response to the communication terminal displaying a predetermined-area image that is an image of the predetermined area in the wide-angle view image having a wide viewing angle related to a moving image recorded at the time of streaming of the moving image from the information processing system.

The information processing method further includes a transmission unit that transmits the wide-angle view image related to the moving image and the viewpoint information to a display terminal that display, on a display, a playback of a predetermined-area image that is the image of the predetermined area in the wide-angle view image displayed by the communication terminal at the time of streaming of the moving image, based on the viewpoint information.

In related art, when a playback of a wide-angle view image related to a moving image is displayed according to a user operation after the wide-angle view image is recorded, which predetermined area of the wide-angle view image is displayed on a specific communication terminal at the time of recording is failed to be grasped.

According to an embodiment of the present disclosure, when a playback of a wide-angle view image is displayed after the wide-angle view image is recorded, a predetermined area of the wide-angle view image displayed on a specific communication terminal at the time of recording is recognizably displayed.

The invention claimed is:

1. A display terminal, comprising circuitry configured to:
receive an operation for displaying a playback of a wide-angle view image related to a moving image recorded at a time of streaming of the moving image, the wide-angle view image having a wide viewing angle; and
display, on a display, a display area representing a predetermined area of the wide-angle view image based on viewpoint information for specifying the predetermined area, in response to receiving the operation, the predetermined area being displayed by a communication terminal at the time of streaming of the moving image,
wherein the circuitry is further configured to display a first playback of a first predetermined-area image of the wide-angle view image and a second playback of a second predetermined-area image of the wide-angle view image, the first predetermined-area image being an image of a first predetermined area of the wide-angle view image and displayed by a first communication terminal, the second predetermined-area image being another image of a second predetermined area of the wide-angle view image and displayed by a second communication terminal, and
wherein the first playback of the first predetermined-area image being displayed and the second playback of the second predetermined-area image being displayed have same playback elapsed times in the wide-angle view image related to the moving image.

2. The display terminal of claim 1, wherein the circuitry is further configured to:
receive a screen operation performed with respect to at least one of the first playback of the first predetermined-area image and the second playback of the second predetermined-area image being displayed;
move a virtual viewpoint with respect to the wide-angle view image in response to the screen operation; and
change the corresponding one of the first predetermined-area image and the second predetermined-area image based on the viewpoint information after the virtual viewpoint is moved, to display the changed predetermined-area image.

3. The display terminal of claim 2, wherein;
the circuitry is further configured to display, on a same screen, the first playback of the first predetermined-area image of the wide-angle view image and the second playback of the second predetermined-area image of the wide-angle view image.

4. The display terminal of claim 3, wherein;
the circuitry is further configured to display the first predetermined-area image and the second predetermined-area image in a display manner that one of the first predetermined-area image and the second predetermined-area image is larger than another one of the first predetermined-area image and the second predetermined-area image.

5. The display terminal of claim 3, wherein, according to a content of another screen operation received, the circuitry is further configured to perform one of:
collectively displaying the first playback of the first predetermined-area image and the second playback of the second predetermined-area image;
collectively resetting the first predetermined-area image and the second predetermined-area image to original predetermined-area images based on the viewpoint information to display playbacks corresponding to the original predetermined-area images; and
collectively pausing the first playback of the first predetermined-area image and the second playback of the second predetermined-area image.

6. The display terminal of claim 1, wherein:
according to a content of a screen operation received, the circuitry is configured to adjust a playback position of the first playback and the second playback according to a change in a playback elapsed time.

7. The display terminal of claim 4, wherein:
according to a content of another screen operation received, the circuitry is configured to cause the one of the first predetermined-area image and the second predetermined-area image to be displayed by full-screen display.

8. The display terminal of claim 4, wherein:
according to a content of another screen operation received, the circuitry is configured to switch, on the same screen, the first predetermined-area image and the second predetermined-area image to change the display manner to another display manner that the another one of the first predetermined-area image and the second predetermined-area image is larger than the one of the first predetermined-area image and the second predetermined-area image.

9. The display terminal of claim 1, wherein;
the wide-angle view image having the wide viewing angle has a range that is wider than a display range displayed on the display at a time.

10. The display terminal of claim 9, wherein;
the wide-angle view image is one of a spherical image, an omnidirectional image, a hemispherical image, a three-dimensional panoramic image, a two-dimensional panoramic image, and a virtual reality (VR) image that are in equirectangular formats.

11. A communication system, comprising:
an information processing system;
a communication terminal; and
a display terminal,
the communication terminal being configured to;
display a predetermined-area image representing a predetermined area of a wide-angle view image having a wide viewing angle related to a moving image recorded at a time of streaming of the moving image performed by the information processing system, and transmit, to the information processing system, viewpoint information for specifying the predetermined area, the information processing system being configured to;

transmit the viewpoint information to the display terminal, the display terminal including circuitry configured to:

display, on a display, a display area representing the predetermined area of the wide-angle view image displayed by the communication terminal at the time of streaming, based on the viewpoint information, wherein the circuitry is further configured to display a first playback of a first predetermined-area image of the wide-angle view image and a second playback of a second predetermined-area image of the wide-angle view image, the first predetermined-area image being an image of a first predetermined area of the wide-angle view image and displayed by a first communication terminal, the second predetermined-area image being another image of a second predetermined area of the wide-angle view image and displayed by a second communication terminal, and wherein the first playback of the first predetermined-area image being displayed and the second playback of the second predetermined-area image being displayed have same playback elapsed times in the wide-angle view image related to the moving image.

12. A display method, comprising:

receiving an operation for displaying a playback of a wide-angle view image related to a moving image recorded at a time of streaming of the moving image, the wide-angle view image having a wide viewing angle;

displaying, on a display, a display area representing a predetermined area of the wide-angle view image based on viewpoint information for specifying the predetermined area in response to receiving the operation, the predetermined area being displayed by a communication terminal at the time of streaming of the moving image; and displaying a first playback of a first predetermined-area image of the wide-angle view image and a second playback of a second predetermined-area image of the wide-angle view image, the first predetermined-area image being an image of a first predetermined area of the wide-angle view image and displayed by a first communication terminal, the second predetermined-area image being another image of a second predetermined area of the wide-angle view image and displayed by a second communication terminal, wherein the first playback of the first predetermined-area image being displayed and the second playback of the second predetermined-area image being displayed have same playback elapsed times in the wide-angle view image related to the moving image.

13. A communication method performed by a communication system including an information processing system that performs streaming of a moving image, a communication terminal that receives and displays the moving image streamed, and a display terminal that display a playback of the moving image recorded at a time of streaming of the moving image, the communication method comprising:

displaying a predetermined-area image representing a predetermined area of a wide-angle view image having a wide viewing angle related to the moving image recorded at the time of streaming performed by the information processing system, performed by the communication terminal;

transmitting, to the information processing system, viewpoint information for specifying the predetermined area, performed by the communication terminal;

transmitting the viewpoint information to the display terminal, performed by the information processing system; and displaying, on a display, a display area representing the predetermined area of the wide-angle view image displayed by the communication terminal at the time of streaming based on the viewpoint information, performed by the display terminal; and displaying a first playback of a first predetermined-area image of the wide-angle view image and a second playback of a second predetermined-area image of the wide-angle view image, the first predetermined-area image being an image of a first predetermined area of the wide-angle view image and displayed by a first communication terminal, the second predetermined-area image being another image of a second predetermined area of the wide-angle view image and displayed by a second communication terminal, wherein the first playback of the first predetermined-area image being displayed and the second playback of the second predetermined-area image being displayed have same playback elapsed times in the wide-angle view image related to the moving image.

* * * * *